US012319220B2

(12) United States Patent
Wakesu et al.

(10) Patent No.: US 12,319,220 B2
(45) Date of Patent: Jun. 3, 2025

(54) VEHICLE SEAT

(71) Applicants: TS TECH CO., LTD., Asaka (JP); HONDA MOTOR CO., LTD., Tokyo (JP)

(72) Inventors: Keita Wakesu, Tochigi (JP); Toru Amino, Tochigi (JP); Katsuya Isomura, Tochigi (JP); Kenji Matsuoka, Tochigi (JP); Kenta Ebara, Tochigi (JP); Eiichi Kishimoto, Tokyo (JP); Masaaki Yamaguchi, Tokyo (JP); Yasuhiro Tsuji, Tokyo (JP); Kohei Fukuoka, Tokyo (JP); Hikaru Arai, Tokyo (JP)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/711,214

(22) PCT Filed: Nov. 10, 2022

(86) PCT No.: PCT/JP2022/041940
§ 371 (c)(1),
(2) Date: May 17, 2024

(87) PCT Pub. No.: WO2023/095634
PCT Pub. Date: Jun. 1, 2023

(65) Prior Publication Data
US 2025/0001965 A1    Jan. 2, 2025

(30) Foreign Application Priority Data

Nov. 25, 2021   (JP) ................................ 2021-191389
Nov. 25, 2021   (JP) ................................ 2021-191391
Nov. 25, 2021   (JP) ................................ 2021-191401

(51) Int. Cl.
*B60R 21/207* (2006.01)
*B60N 2/68* (2006.01)

(52) U.S. Cl.
CPC .............. *B60R 21/207* (2013.01); *B60N 2/68* (2013.01)

(58) Field of Classification Search
CPC .................................. B60R 21/207; B60N 2/68
See application file for complete search history.

(56) References Cited

U.S. PATENT DOCUMENTS

| 5,893,579 A | * | 4/1999 | Kimura | ................ | B60N 2/5825 |
| | | | | | 280/730.2 |
| 6,578,911 B2 | * | 6/2003 | Harada | ................ | B60R 21/207 |
| | | | | | 280/730.2 |

(Continued)

FOREIGN PATENT DOCUMENTS

| JP | H09150706 A | 6/1997 |
| JP | 2011006003 A | 1/2011 |

(Continued)

OTHER PUBLICATIONS

Written Opinion for PCT Patent Application No. PCT/JP2022/041940 mailed Jan. 31, 2023; 8 pp.

*Primary Examiner* — Drew J Brown
(74) *Attorney, Agent, or Firm* — Armstrong Teasdale LLP

(57) ABSTRACT

A vehicle seat comprises an outer frame of a seatback frame for forming a framework of a seatback, a frame bracket coupled to one side of the outer frame, a module bracket fastened to the frame bracket at fastening points and configured to support an airbag module, and a pan frame coupled to the rear side of the outer frame. The pan frame includes a protrusion section protruding from an upper portion of the pan frame on the one side such that the fastening points are located below the protrusion section, (Continued)

and at least part of the airbag module is positioned frontward of the protrusion section.

15 Claims, 40 Drawing Sheets

(56) References Cited

U.S. PATENT DOCUMENTS

| | | | | |
|---|---|---|---|---|
| 7,331,601 | B2* | 2/2008 | Tracht | B60R 21/207 |
| | | | | 280/730.2 |
| 7,891,701 | B2* | 2/2011 | Tracht | B60R 21/207 |
| | | | | 280/730.2 |
| 8,075,053 | B2* | 12/2011 | Tracht | B60N 2/5841 |
| | | | | 280/730.2 |
| 9,592,789 | B2* | 3/2017 | Fujiwara | B60R 21/235 |
| 9,688,230 | B2* | 6/2017 | Makita | B60R 21/2165 |
| 9,707,917 | B2* | 7/2017 | Shiga | B60N 2/68 |
| 11,325,552 | B2* | 5/2022 | Saitou | B60R 21/207 |
| 11,491,944 | B2 | 11/2022 | Tanabe et al. | |
| 11,787,359 | B2* | 10/2023 | Tanabe | B60R 21/2165 |
| | | | | 280/728.2 |
| 2024/0001882 | A1 | 1/2024 | Tanabe et al. | |

FOREIGN PATENT DOCUMENTS

| | | | | |
|---|---|---|---|---|
| JP | 5169864 | B2 | 3/2013 | |
| JP | 2019182111 | A | 10/2019 | |
| KR | 20230126481 | A * | 8/2023 | |
| WO | WO-2018083919 | A1 * | 5/2018 | B60N 2/68 |

* cited by examiner

Fig.38
(A) 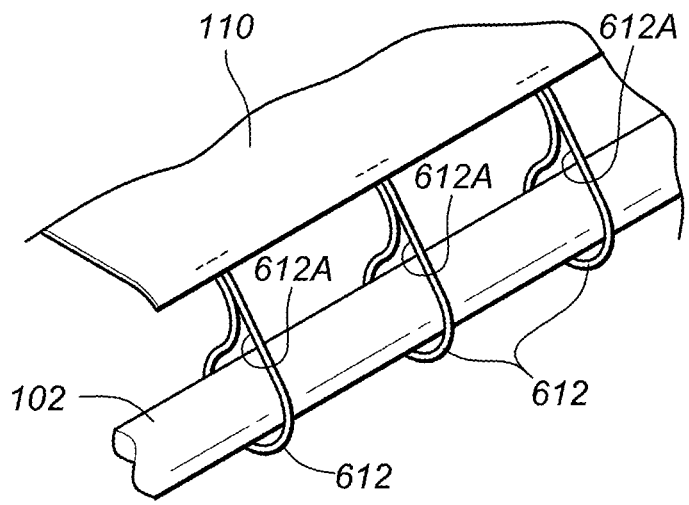
(B) 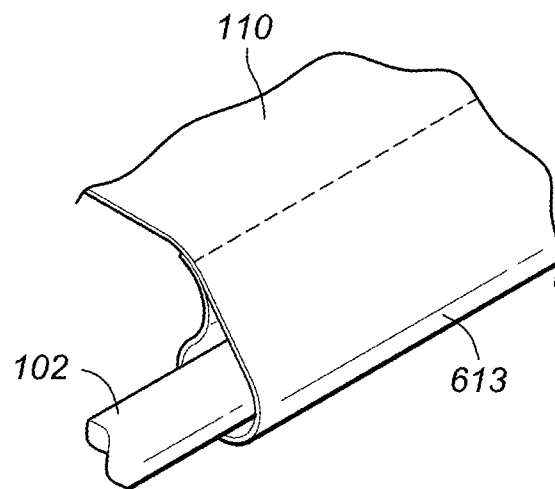

Fig.40
(A) 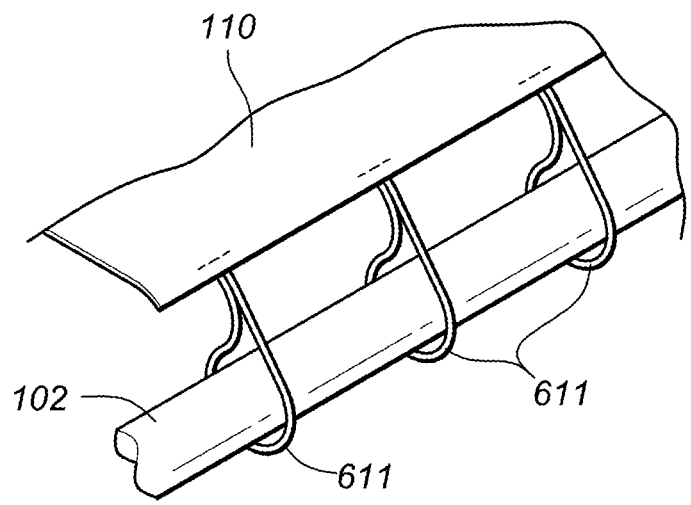
(B) 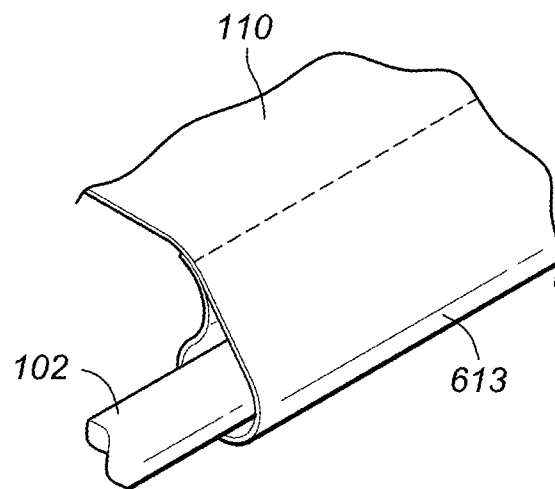

VEHICLE SEAT

CROSS-REFERENCE TO RELATED APPLICATION

This application is a U.S. National Phase Application of PCT/JP2022/041940, filed on Nov. 10, 2022, which claims the benefit of priority to Japanese Patent Application No. 2021-191391, filed Nov. 25, 2021, Japanese Patent Application No. 2021-191401 filed Nov. 25, 2021, and Japanese Patent Application No. 2021-191389 filed Nov. 25, 2021. The contents of these applications are hereby expressly incorporated by reference in their entirety.

TECHNICAL FIELD

The present invention relates to a vehicle seat equipped with an airbag.

BACKGROUND ART

Known vehicle seats include a vehicle seat of Patent Document 1, which is provided with a back frame for forming a framework of a seatback, a pan frame (back panel) for covering the rear side of the back frame and having a surface coupled to the back frame, and an airbag module (airbag device) mounted on the surface of the pan frame.

PRIOR ART DOCUMENT(S)

Patent Document(s)

Patent Document 1: JP5169864B

SUMMARY OF THE INVENTION

Task to be Accomplished by the Invention

In the vehicle seat of Patent Document 1, the airbag module is mounted on the pan frame, which causes a problem that the airbag module is likely to behave in an unstable manner for airbag development.

The present invention has been made in view of the problem of the prior art, and a primary object of the present invention is to provide a vehicle seat comprising an airbag and an inflator for discharging gas for airbag inflation, that enables a more stable behavior of an airbag module for airbag deployment.

Means to Accomplish the Task

As a solution to accomplish the above-described task, the present invention provides a vehicle seat (1) comprising: an outer frame (19) of a seatback frame, the outer frame forming a framework of a seatback of the vehicle seat; a frame bracket (34) coupled to a coupling location of the outer frame, the coupling location being located on a coupling side, which is either of the left or right side, of the outer frame; a module bracket (36) fastened to the frame bracket at one or more fastening points (P1, P2) and configured to support an airbag module (23); and a pan frame (20) coupled to the rear side of the outer frame, wherein the pan frame includes a protrusion section (32) protruding from an upper portion of the pan frame on the coupling side such that the fastening points are located below the protrusion section, and wherein at least part of the airbag module is positioned frontward of the protrusion section along the front-rear direction of the vehicle seat.

In this configuration, the airbag module is supported by the outer frame of the seatback frame, which enables a more stable behavior of the airbag module for airbag deployment. In addition, the part of the airbag module is covered by the protrusion section from the rear, which provides a protection for the airbag module from loads applied from the rear. Furthermore, the fastening points are located such that the protrusion section does not overlap the fastening points as viewed from the rear, which enables an assembling worker to easily assemble the airbag module.

The above vehicle seat may be further configured such that the protrusion section and the airbag module are arranged to be spaced apart from each other in the front-rear direction, thereby forming a gap space therebetween.

In this configuration, when a load is applied to the protrusion section from the rear, the load does not directly transfer to the airbag module. This feature prevents the orientation of the airbag module from being changed, thereby protecting an occupant in a more secure manner.

The above vehicle seat may be further configured such that the vehicle seat further comprises a shape former (80) coupled to the outer frame on the coupling side, and configured to form an outer shape of the seatback, and wherein the shape former is coupled to the protrusion section.

In this configuration, the shape former reinforces the protrusion section, which increases the stiffness of the protrusion section.

The above vehicle seat may be further configured such that the shape former is coupled to the outer frame such that the shape former is positioned frontward of the protrusion section.

In this configuration, when a load is applied to the seatback from the rear, the protrusion prevents the load from being applied to coupling points where the shape former is coupled to the outer frame.

The above vehicle seat may be further configured such that a top edge of the protrusion section is located below a top edge of the outer frame.

In this configuration, a space is formed above the protrusion section, which enables a switch or other component to be provided in the space.

The above vehicle seat may be further configured such that, when the airbag module is assembled to the vehicle seat, an outer edge of the protrusion section on the coupling side extends along an outer edge of the airbag module, as viewed from the rear.

In this configuration, the outer edge of the protrusion section on the one side extends along that of the airbag module in the rear view. This feature enables the seatback to be made with a less-stepped front surface, thereby improving the appearance of the seatback.

The above vehicle seat may be further configured such that the frame bracket and the pan frame are formed of respective sheet metal members, and wherein the sheet metal member forming the frame bracket has a greater thickness than that forming the pan frame.

This configuration enables the outer frame to support the airbag module in a more solid manner, resulting in a more stable behavior of the airbag module for airbag deployment.

The above vehicle seat may be further configured such that the outer frame comprises two side frames on the left and right sides, and an upper frame connecting the two side frames, and wherein the frame bracket is coupled to a side frame, one of the two side frames on the coupling side, at points in front and rear edges of the side frame.

This configuration provides a tighter coupling between the frame bracket to the side frame, thereby enabling a more stable behavior of the airbag module for airbag deployment.

The above vehicle seat may be further configured such that the shape former is a curved wire member having a shape former upper portion (81), a shape former lower portion (83), and a shape former center portion (82) connecting the shape former upper portion and the shape former lower portion, wherein the shape former is coupled to the side frame so that the shape former protrudes outward from the side frame, wherein the shape former center portion includes an upper half portion (82A) which extends along the outer edge of the protrusion section of the pan frame and a lower half portion (82B) which extends downward from a lower end of the upper half portion, and wherein a through-hole space (X) extending in the front-rear direction is defined by the shape former, the protrusion section, and the side frame, the through-hole space being formed rearward of the fastening points.

In this configuration, the through-hole space extends in the front-rear direction, which enables an assembling worker to easily insert a fastening tool into the through-hole space in order to fasten the frame bracket to the module bracket.

Patent Document JP4524768B discloses a passenger seat (vehicle seat) in which an airbag module for storing an airbag is wrapped in a stay cloth such that a pressure of airbag inflation can concentrate on a stitching line that serves as a tear-off line in a skin cover (trim cover), thereby enabling quick airbag inflation and deployment. In this vehicle seat, a seatback includes a side frame on one side of the seatback in a left-right direction, and the airbag module is mounted and secured to an outer surface of the side frame. The side frame has two hang holes at locations which are one frontward of and the other rearward of the airbag module. A cloth-hook member (hook member) is a curved wire member of metal having hook-shaped portions (hanging portions) at both ends, and the hook-shaped portions are latched into or hung onto the hang holes. A stay cloth is sewn to the skin cover forming a tear-off line at one end, and hung onto the cloth-hook member at the other end.

In such a vehicle seat, the cloth-hook member is located frontward of the airbag module, which may form a stepped part between the front surface of the cloth-hook member and that of the airbag module, thereby causing an occupant seated on the vehicle seat to feel uncomfortable with the stepped part of the backseat.

Thus, one task to be accomplished by the present invention is to provide a vehicle seat equipped with an airbag module, a stay cloth, and a cloth-hook member, and configured such that the stay cloth is positioned so as to be receivable an airbag inflation pressure, and that an occupant seated on the vehicle seat less feels uncomfortable with the shape of the backseat.

As a solution to accomplish the above-described task, the present invention provides a vehicle seat (1, 201) comprising: a pair of side frames which are left and right parts of an outer frame forming a framework of a seatback (5); an airbag module (23) supported by a one side frame (26, 226), i.e., one of the pair of side frames on one side in a left-right direction of the vehicle seat, such that the airbag module faces the one side frame via a cloth-hook member (102, 402), and the airbag module being equipped with an airbag (61) configured to deploy diagonally frontward to the one side; a pad member (21) supported by the one side frame and configured to cover the airbag module from the front; a skin cover (22) for covering a surface of the pad member; and a stay cloth (110) which is coupled to the skin cover at one end and the cloth-hook member at the other end so as to extend from the one end between the front surface of the airbag module and the pad member, and further extend toward the cloth-hook member, wherein the cloth-hook member is located rearward of the front edge of the airbag module.

In this configuration, when the airbag deploys diagonally frontward, expansion pressure is applied to the stay cloth located frontward of the front surface of the airbag module. Furthermore, the cloth-hook member is located rearward of the front edge of the airbag module, and thus the cloth-hook member does not protrude frontward from the airbag module, which prevents an occupant seated on the vehicle seat from feeling uncomfortable with a protruding part in the backseat.

The above vehicle seat may be further configured such that the cloth-hook member is located frontward of the rear edge of the airbag module.

This configuration prevents the cloth-hook member from protruding rearward from the rear edge of the airbag module. As a result, when an occupant touches the vehicle seat from the rear, the occupant is prevented from feeling uncomfortable with a protruding part in the backseat, which improves the comfort of the vehicle seat.

The above vehicle seat may be further configured such that the cloth-hook member is located rearward of the front outer edge (O) of the airbag module in the side view.

This configuration enables the cloth-hook member to be positioned such that the cloth-hook member does not protrude relative to the airbag module in either the front-rear direction and the vertical direction, thereby enabling the vehicle seat to be easily made compact (having a small size).

The above vehicle seat may be further configured such that the cloth-hook member has a pair of upper and lower coupling sections (104) configured to be coupled to the one side frame, and a cloth-hook section (108) vertically extending and configured such that the stay cloth is hung onto the cloth-hook section (108). The vertical length (D2) of the cloth-hook section is preferably greater than the vertical distance (D1) between the upper edge of the upper coupling section and the lower edge of the lower coupling section.

In this configuration, the stay cloth attached to the cloth-hook section has a size (width) greater than the distance between the two coupling sections, which ensures that the stay cloth receives the airbag inflation pressure.

The above vehicle seat may be further configured such that the cloth-hook section is located frontward of the one side frame.

This configuration facilitates the assembly of the stay cloth.

The above vehicle seat may be further configured such that the cloth-hook member is formed by the folding of a wiring member (rod-shaped member) and is connected to the coupling section respectively, and that the cloth-hook member has a pair of upper and lower first extending sections (106A) extending frontward, a pair of shaft sections (106B) extending in opposite directions along the vertical direction from the front ends of the first extending sections, a second pair of upper and lower extending sections (106C) each extending frontward from the ends of the shaft sections (106B), and a cloth-hook section (108) extending vertically to connect the ends of the second pair of upper and lower extending sections (106C), and that the cloth-hook section (108) preferably extends substantially parallel to the upper and lower shaft sections (106B).

In this configuration, when the stay cloth receives airbag inflation pressure, torsional deformation of the cloth-hook member can occur in the shaft sections (106B), which prevents the cloth-hook section from being deformed when the stay cloth receives pressure. This enables the stay cloth to remain in a vertically-extended state, ensuring that the stay cloth receives the airbag inflation pressure.

The above vehicle seat may be further configured such that the above vehicle seat includes a frame bracket (34) coupled to the one side frame, the frame bracket (34) comprising a bracket coupling section (44) configured to be coupled to the one side frame and extend in the left-right direction, and a plate-shaped bracket base section (42) extending frontward from the outer edge of the frame side connection section (44) and having hang holes (100) defined therein, wherein the airbag module is coupled to the frame bracket (34) via a module bracket (36), wherein the module bracket (36) includes a module coupling section (51) and a module base section (50), the module coupling section (51) extending outward from the bracket base section (42) and configured to be coupled to the one side frame or the bracket coupling section, and the module base section (50) extending frontward from the module coupling section (51) and configured to face the bracket base section (42) such that the cloth-hook member is between the module base section (50) and the bracket base section (42), and hold the airbag module on the outer side of the module base section (50), and wherein the bracket coupling section is hung into or hung onto the hang hole and the first extending sections (106A) are held between the bracket base section (42) and the module base section (50).

In this configuration, the first extending sections are held between the bracket base section and the module base section, which prevents the cloth-hook member from shifting when receiving pressure. This means that the stay cloth is also prevented from moving when receiving pressure, thereby ensuring that the stay cloth receives the airbag inflation pressure, which further increases the stability of the deployment behavior of the airbag.

The above vehicle seat may be further configured such that the cloth-hook section is located frontward of the frame bracket.

This configuration prevents occurrence of contact between the cloth-hook section and the frame bracket due to the torsional deformation of the shaft sections. This prevents occurrence of abnormal noise caused due to the contact between the cloth-hook section and the frame bracket during the deployment of the airbag.

The above vehicle seat may be further configured such that the bracket coupling section and the module coupling section each have two cutouts (44A, 51A) extending through in the front-rear direction, the respective cutouts being located rearward of coupling locations where the coupling ends of the cloth-hook member are coupled to the hang holes.

This configuration enables an assembling worker to make a visual check of a location where coupling parts are latched into or hung onto the hang holes visible from the rear, which improves the efficiency of the work of assembling the vehicle seat.

The above vehicle seat may be further configured to include a shape former (80) coupled to the one side frame and extending outward such that the shape former forms an outer shape of the seatback, and a pan frame (20) extending the rear side of the outer frame and over the rear side of the vehicle seat, wherein the shape former is formed by bar-shaped members and the both ends of the shape former are coupled to the one side frame, wherein the pan frame includes a protrusion section (32) protruding outward and is coupled to the shape former (80), and wherein a through-hole space (X) extending in a front-rear direction of the vehicle seat is defined by the shape former, the pan frame and the side frame, and coupling locations where the coupling ends of the cloth-hook member are coupled to the hang holes are frontward of the through-hole space (X).

This configuration enables an assembling worker to make a visual check of the coupling locations where the coupling ends of the cloth-hook member are latched into or hung onto the hang holes visible from the rear, which improves the efficiency of the work of assembling the vehicle seat.

The above vehicle seat may be further configured such that the side frame includes: a module coupling section (252) that includes a frame cut-and-raised section (244) cut out and bent outward, and a bracket base section (248) provided frontward of the frame cut-and-raised section (244) and having hang holes (260) extending therethrough in the left-right direction, wherein the airbag module is coupled to the side frame via a module bracket (236), the module bracket (236) being coupled to the frame cut-and-raised section (244), and a module base section (250) coupled to the module coupling section (252) and configured to extend frontward and face the bracket base section via the cloth-hook member, and hold the airbag module on the outer side of the module base section (250); and wherein the coupling ends of the cloth-hook member are latched into or hung onto the hang holes, and the first extending sections (106A) of the cloth-hook member are held between the bracket base section (42) and the module base section (50).

In this configuration, the airbag module and the stay cloth are coupled to the side frame using a single bracket, enabling the vehicle seat to be made simple.

Patent Document JP6211839B discloses a vehicle seat comprising an airbag module fixed to a seat outer surface of a seatback frame, wherein the airbag module is provided with an airbag and an inflator. In this vehicle seat, the outer surface of the seatback frame is provided with a side pad portion which is a part of a cushion pad. An opening is formed in the side pad portion, and an airbag module is accommodated in the opening. The airbag module is fastened to the seatback frame and has an outside part that is exposed to the outside of the vehicle seat and covered with a trim cover.

In the vehicle seat of JP6211839B, no cushion pad is provided between the surface of the outside part of the airbag module and the trim cover, which makes it difficult to provide sufficient elasticity to the outer surface of the seatback frame.

Thus, one task to be accomplished by the present invention is to configure a vehicle seat having an airbag module coupled to the outer side of a seatback frame outer portion (of a seatback frame), such that the vehicle seat further includes a pad member on the outer side of the airbag module.

As a solution to accomplish the above-described task, the present invention provides a vehicle seat (1, 470, 570) comprising: a seatback frame outer portion (19) (an outer frame of a seatback frame); a frame bracket (34) coupled to the outer side of the seatback frame outer portion; a module bracket (36) fastened to the frame bracket and configured to support an airbag module (23); a pad member (21) that extends over and covers the seatback frame outer portion and the airbag module, and wherein the pad member (21) comprises a front pad member (70) that covers the seatback frame outer portion and the airbag module from the front side, a side pad member (71) coupled to the outer end of the front pad member and extending rearward to cover the seatback frame outer portion and the airbag module from the outer side, and a rear pad member (72) extending inward from the rear end of the side pad member to cover the seatback frame outer portion and the airbag module from the rear side, and wherein the rear pad member has a slit (75, 475) which is a cut extending from the inner edge thereof in a left-right diction and extending therethrough in the front-rear direction to a point rearward of the airbag module.

This configuration enables the airbag module to be inserted between the seatback frame outer part and the side pad member through the slit, allowing the airbag module to be assembled to the seatback frame outer portion when the side pad member is provided on the outer side thereof. This feature increases the elasticity of an outer side of the seatback. Furthermore, the rear pad member that is provided rearward of the airbag module also increases the elasticity of the rear side of the seatback. The increase in the elasticity of the outer and rear sides of the seatback improves the comfort of the vehicle seat.

The above vehicle seat may be preferably configured such that the slit is in a form of a straight line.

In this configuration, the slit is made simple.

The above vehicle seat may be preferably configured such that the slit extends in a substantially horizontal direction.

In this configuration, an assembling worker can easily open the slit by pushing the lower end of the rear pad member outward, which enables the worker to easily assemble the airbag module.

The above vehicle seat may be preferably configured such that the rear pad member has an auxiliary slit (76, 576) extending therethrough in the front-rear diction at the upper part of the rear pad member.

In this configuration, the lower part of the rear pad member can be easily moved outward, which facilitates the opening of a gap between the pad member and the seatback frame outer portion. This feature allows an assembling worker to easily insert the airbag module into the gap between the seatback frame outer portion and the pad member, which enables the worker to easily assemble the airbag module.

The above vehicle seat may be preferably configured such that the pad member includes an upper pad member (73) that connects the upper ends of the front pad member and the rear pad member, and covers the seatback frame outer portion and the airbag module from the upper side, and an auxiliary slit (76) extending therethrough in the front-rear direction along which the rear pad member and the upper pad member joined to each other.

In this configuration, the auxiliary slit (76) is formed at a location where a load is likely to be concentrated at when the lower end of the rear pad member is pushed outward, which facilitates the opening of the lower end of the rear pad member. Thus, this feature enables an assembling worker to easily open a gap between the pad member and the seatback frame outer portion.

The above vehicle seat may be preferably configured such that the auxiliary slit (76) extends upward and outward in an inclined direction from the upper edge of the inner surface of the rear pad member.

This configuration facilitates the opening of the lower end of the rear pad member, which enables an assembling worker to easily open a gap between the pad member and the seatback frame outer portion.

The above vehicle seat may be preferably configured such that the frame bracket and the module bracket are fastened to each other at fastening points (P1, P2) located below the auxiliary slit, as viewed from the rear.

In this configuration, the outward movement of the lower end of the rear pad member deforms the pad member along a line of the auxiliary slit, thereby exposing the fastening points. This feature facilitates the fastening of the frame bracket to the module bracket.

The above vehicle seat may be preferably configured such that the slit is located below the frame bracket.

This configuration enables the airbag module to be moved upward such that the module bracket is aligned with the frame bracket, which facilitates the assembly of the airbag module.

The above vehicle seat may be preferably configured such that the slit is a deep cut extending from the inner surface of the rear pad member to a point close to the outer surface thereof.

In this configuration, the deep cut slit is opened easier than the slit that is not such a deep cut, which enables an assembling worker to easily insert the airbag module, facilitating the assembly of the airbag module.

The above vehicle seat may be preferably configured such that the side pad member has a deployment hole (77) extending through in the left-right direction located at the outer side of the airbag module and frontward of the slit.

In this configuration, the slit and the deployment hole are provided at different positions along the front-rear direction. As a result, part of the pad member near the slits and the deployment hole is less deformable compared to the cases where the slit and the deployment hole are provided at a same position along the front-rear direction, thereby enabling the shape of the pad member to be easily maintained.

The above vehicle seat may be preferably configured such that the vehicle seat comprises a skin cover (22) including a rear skin cover (93) for covering the rear side of the pad member and an outer skin cover (92) for covering the outer side of the pad member, wherein the outer edge of the rear skin cover (93) and the rear edge of the outer skin cover (92) are joined to each other by a slide fastener (97) extending vertically, wherein the side pad member has a receiving recess (98) recessed inward at a location of the slide for accommodating the slide fastener, and wherein the receiving recess is formed at a different position from the opening end (75A) of the slit.

In this configuration, the slit opening end and the receiving recess are provided at different positions, part of the rear pad member near the opening end of the slit is more rigid compared to the case where they are provided at a same position.

The above vehicle seat may be preferably configured such that the vehicle seat comprises a shape former (80) coupled to the outer part of the seatback frame outer portion, wherein the airbag module is located frontward of the shape former and the pad member is located rearward of the shape former (80).

In this configuration, even when the vehicle seat comprises a shape former, an assembling worker is enabled to open the slit and insert the airbag module into the opened slit to thereby move the airbag module at a point frontward of the shape former.

The above vehicle seat may be preferably configured such that the slit extends in the left-right direction to have a left-right width (L1) which is greater than or equal to the left-right width (L2) of the airbag module.

This configuration enables an assembling worker to easily insert the airbag module into the slit.

The above vehicle seat may be preferably configured such that the slit is located below the upper edge (Q1) of the shape former and above the lower edge (Q2) of the shape former.

This configuration enables an assembling worker to easily insert the airbag module through the slit to a point near the shape former.

The above vehicle seat may be preferably configured such that the slit and the shape former overlap in the front-rear direction, which determines the distance (L3) between the outer end (R2) of an overlap part where the slit and the shape former overlap and the outer end of the slit in the left-right direction, and that the distance (L3) is greater than or equal to the width of the airbag module in the left-right direction.

In this configuration, the slit is opened to define a hole space between the outer end part of the slit and the outer end part of the shape former, such that the width of the hole space is greater than the width of the airbag module in the left-right direction. This feature enables an assembling worker to easily insert the airbag module through the hole space toward a point frontward of the shape former.

The above vehicle seat may be preferably configured such that the shape former is joined to the upper portion of the outer side of the seatback frame outer portion, wherein the shape former (80) includes a shape former upper portion (81) extending outward in the left-right direction, a shape former center portion (82) extending downward from the outer side of the shape former upper portion (81), and a shape former lower portion (83) extending downward and inward in an inclined direction from the lower end of the shape former center portion (82), and wherein the slit is formed so as to overlap the shape former lower portion in the front-rear direction.

This configuration enables an assembling worker to easily insert the airbag module from the lower side of the slit and move it upward, without being obstructed by the shape former.

Effect of the Invention

As a solution to accomplish the above-described task, the present invention provides a vehicle seat comprising: an outer frame of a seatback frame, the outer frame forming a framework of a seatback of the vehicle seat; a frame bracket coupled to a coupling location of the outer frame, the coupling location being located on a coupling side, which is either of the left or right side, of the outer frame; a module bracket fastened to the frame bracket at one or more fastening points and configured to support an airbag module; and a pan frame coupled to the rear side of the outer frame, wherein the pan frame includes a protrusion section protruding from an upper portion of the pan frame on the coupling side such that the fastening points are located below the protrusion section, and wherein at least part of the airbag module is positioned frontward of the protrusion section along the front-rear direction of the vehicle seat. In this configuration, the airbag module is supported by the outer frame of the seatback frame, which enables a more stable behavior of the airbag module for airbag deployment. In addition, the part of the airbag module is covered by the protrusion section from the rear, which provides a protection for the airbag module from loads applied from the rear. Furthermore, the fastening points are located such that the protrusion section does not overlap the fastening points as viewed from the rear, which enables an assembling worker to easily assemble the airbag module.

The above vehicle seat may be further configured such that the protrusion section and the airbag module are arranged to be spaced apart from each other in the front-rear direction, thereby forming a gap space therebetween. In this configuration, when a load is applied to the protrusion section from the rear, the load does not directly transfer to the airbag module. This feature prevents the orientation of the airbag module from being changed, thereby protecting an occupant in a more secure manner.

The above vehicle seat may be further configured such that the vehicle seat further comprises a shape former coupled to the outer frame on the coupling side, and configured to form an outer shape of the seatback, and wherein the shape former is coupled to the protrusion section. In this configuration, the shape former reinforces the protrusion section, which increases the stiffness of the protrusion section.

The above vehicle seat may be further configured such that the shape former is coupled to the outer frame such that the shape former is positioned frontward of the protrusion section. In this configuration, when a load is applied to the seatback from the rear, the protrusion prevents the load from being applied to coupling points where the shape former is coupled to the outer frame.

The above vehicle seat may be further configured such that a top edge of the protrusion section is located below a top edge of the outer frame. In this configuration, a space is formed above the protrusion section, which enables a switch or other component to be provided in the space.

The above vehicle seat may be further configured such that, when the airbag module is assembled to the vehicle seat, an outer edge of the protrusion section on the coupling side extends along an outer edge of the airbag module, as viewed from the rear. In this configuration, the outer edge of the protrusion section on the one side extends along that of the airbag module in the rear view. This feature enables the seatback to be made with a less-stepped front surface, thereby improving the appearance of the seatback.

The above vehicle seat may be further configured such that the frame bracket and the pan frame are formed of respective sheet metal members, and wherein the sheet metal member forming the frame bracket has a greater thickness than that forming the pan frame. This configuration enables the outer frame to support the airbag module in a more solid manner, resulting in a more stable behavior of the airbag module for airbag deployment.

The above vehicle seat may be further configured such that the outer frame comprises two side frames on the left and right sides, and an upper frame connecting the two side frames, and wherein the frame bracket is coupled to a side frame, one of the two side frames on the coupling side, at points in front and rear edges of the side frame. This configuration provides a tighter coupling between the frame bracket to the side frame, thereby enabling a more stable behavior of the airbag module for airbag deployment.

The above vehicle seat may be further configured such that the shape former is a curved wire member having a shape former upper portion, a shape former lower portion, and a shape former center portion connecting the shape former upper portion and the shape former lower portion, wherein the shape former is coupled to the side frame so that the shape former protrudes outward from the side frame, wherein the shape former center portion includes an upper half portion which extends along the outer edge of the protrusion section of the pan frame and a lower half portion which extends downward from a lower end of the upper half portion, and wherein a through-hole space extending in the front-rear direction is defined by the shape former, the protrusion section, and the side frame, the through-hole space being formed rearward of the fastening points. In this configuration, the through-hole space extends in the front-rear direction, which enables an assembling worker to easily insert a fastening tool into the through-hole space in order to fasten the frame bracket to the module bracket.

As a solution to accomplish the above-described task, the present invention provides a vehicle seat comprising: a pair of side frames which are left and right parts of an outer frame forming a framework of a seatback; an airbag module supported by a one side frame, i.e., one of the pair of side frames on one side in a left-right direction of the vehicle seat, such that the airbag module faces the one side frame via a cloth-hook member, and the airbag module being equipped with an airbag configured to deploy diagonally frontward to the one side; a pad member supported by the one side frame and configured to cover the airbag module from the front; a skin cover for covering a surface of the pad member; and a stay cloth which is coupled to the skin cover at one end and the cloth-hook member at the other end so as to extend from the one end between the front surface of the airbag module and the pad member, and further extend toward the cloth-hook member, wherein the cloth-hook member is located rearward of the front edge of the airbag module. In this configuration, when the airbag deploys diagonally frontward, expansion pressure is applied to the stay cloth located frontward of the front surface of the airbag module. Furthermore, the cloth-hook member is located rearward of the front edge of the airbag module, and thus the cloth-hook member does not protrude frontward from the airbag module, which prevents an occupant seated on the vehicle seat from feeling uncomfortable with a protruding part in the backseat.

The above vehicle seat may be further configured such that the cloth-hook member is located frontward of the rear edge of the airbag module. This configuration prevents the cloth-hook member from protruding rearward from the rear edge of the airbag module. As a result, when an occupant touches the vehicle seat from the rear, the occupant is prevented from feeling uncomfortable with a protruding part in the backseat, which improves the comfort of the vehicle seat.

The above vehicle seat may be further configured such that the cloth-hook member is located rearward of the front outer edge (O) of the airbag module in the side view. This configuration enables the cloth-hook member to be positioned such that the cloth-hook member does not protrude relative to the airbag module in either the front-rear direction and the vertical direction, thereby enabling the vehicle seat to be easily made compact (having a small size).

The above vehicle seat may be further configured such that the cloth-hook member has a pair of upper and lower coupling sections configured to be coupled to the one side frame, and a cloth-hook section vertically extending and configured such that the stay cloth is hung onto the cloth-hook section. The vertical length of the cloth-hook section is preferably greater than the vertical distance between the upper edge of the upper coupling section and the lower edge of the lower coupling section. In this configuration, the stay cloth attached to the cloth-hook section has a size (width) greater than the distance between the two coupling sections, which ensures that the stay cloth receives the airbag inflation pressure.

The above vehicle seat may be further configured such that the cloth-hook section is located frontward of the one side frame. This configuration facilitates the assembly of the stay cloth.

The above vehicle seat may be further configured such that the cloth-hook member is formed by the folding of a wiring member (rod-shaped member) and is connected to the coupling section respectively, and that the cloth-hook member has a pair of upper and lower first extending sections extending frontward, a pair of shaft sections extending in opposite directions along the vertical direction from the front ends of the first extending sections, a second pair of upper and lower extending sections each extending frontward from the ends of the shaft sections, and a cloth-hook section extending vertically to connect the ends of the second pair of upper and lower extending sections, and that the cloth-hook section preferably extends substantially parallel to the upper and lower shaft sections. In this configuration, when the stay cloth receives airbag inflation pressure, torsional deformation of the cloth-hook member can occur in the shaft sections (106B), which prevents the cloth-hook section from being deformed when the stay cloth receives pressure. This enables the stay cloth to remain in a vertically-extended state, ensuring that the stay cloth receives the airbag inflation pressure.

The above vehicle seat may be further configured such that the above vehicle seat includes a frame bracket coupled to the one side frame, the frame bracket comprising a bracket coupling section configured to be coupled to the one side frame and extend in the left-right direction, and a plate-shaped bracket base section extending frontward from the outer edge of the frame side connection section and having hang holes defined therein, wherein the airbag module is coupled to the frame bracket via a module bracket, wherein the module bracket includes a module coupling section and a module base section, the module coupling section extending outward from the bracket base section and configured to be coupled to the one side frame or the bracket coupling section, and the module base section extending frontward from the module coupling section and configured to face the bracket base section such that the cloth-hook member is between the module base section and the bracket base section, and hold the airbag module on the outer side of the module base section, and wherein the bracket coupling section is hung into or hung onto the hang hole and the first extending sections are held between the bracket base section and the module base section. In this configuration, the first extending sections are held between the bracket base section and the module base section, which prevents the cloth-hook member from shifting when receiving pressure. This means that the stay cloth is also prevented from moving when receiving pressure, thereby ensuring that the stay cloth receives the airbag inflation pressure, which further increases the stability of the deployment behavior of the airbag.

The above vehicle seat may be further configured such that the cloth-hook section is located frontward of the frame bracket. This configuration prevents occurrence of contact between the cloth-hook section and the frame bracket due to the torsional deformation of the shaft sections. This prevents occurrence of abnormal noise caused due to the contact between the cloth-hook section and the frame bracket during the deployment of the airbag.

The above vehicle seat may be further configured such that the bracket coupling section and the module coupling section each have two cutouts extending through in the front-rear direction, the respective cutouts being located rearward of coupling locations where the coupling ends of the cloth-hook member are coupled to the hang holes. This configuration enables an assembling worker to make a visual check of a location where coupling parts are latched into or hung onto the hang holes visible from the rear, which improves the efficiency of the work of assembling the vehicle seat.

The above vehicle seat may be further configured to include a shape former coupled to the one side frame and extending outward such that the shape former forms an outer shape of the seatback, and a pan frame extending the rear side of the outer frame and over the rear side of the vehicle seat, wherein the shape former is formed by bar-shaped members and the both ends of the shape former are coupled to the one side frame, wherein the pan frame includes a protrusion section protruding outward and is coupled to the shape former, and wherein a through-hole space extending in a front-rear direction of the vehicle seat is defined by the shape former, the pan frame and the side frame, and coupling locations where the coupling ends of the cloth-hook member are coupled to the hang holes are frontward of the through-hole space. This configuration enables an assembling worker to make a visual check of the coupling locations where the coupling ends of the cloth-hook member are latched into or hung onto the hang holes visible from the rear, which improves the efficiency of the work of assembling the vehicle seat.

The above vehicle seat may be further configured such that the side frame includes: a module coupling section that includes a frame cut-and-raised section cut out and bent outward, and a bracket base section provided frontward of the frame cut-and-raised section and having hang holes extending therethrough in the left-right direction, wherein the airbag module is coupled to the side frame via a module bracket, the module bracket being coupled to the frame cut-and-raised section, and a module base section coupled to the module coupling section and configured to extend frontward and face the bracket base section via the cloth-hook member, and hold the airbag module on the outer side of the module base section; and wherein the coupling ends of the cloth-hook member are latched into or hung onto the hang holes, and the first extending sections of the cloth-hook member are held between the bracket base section and the module base section. In this configuration, the airbag module and the stay cloth are coupled to the side frame using a single bracket, enabling the vehicle seat to be made simple.

As a solution to accomplish the above-described task, the present invention provides a vehicle seat comprising: a seatback frame outer portion; a frame bracket coupled to the outer side of the seatback frame outer portion; a module bracket fastened to the frame bracket and configured to support an airbag module; a pad member that extends over and covers the seatback frame outer portion and the airbag module, and wherein the pad member comprises a front pad member that covers the seatback frame outer portion and the airbag module from the front side, a side pad member coupled to the outer end of the front pad member and extending rearward to cover the seatback frame outer portion and the airbag module from the outer side, and a rear pad member extending inward from the rear end of the side pad member to cover the seatback frame outer portion and the airbag module from the rear side, and wherein the rear pad member has a slit which is a cut extending from the inner edge thereof in a left-right diction and extending therethrough in the front-rear direction to a point rearward of the airbag module. This configuration enables the airbag module to be inserted between the seatback frame outer part and the side pad member through the slit, allowing the airbag module to be assembled to the seatback frame outer portion when the side pad member is provided on the outer side thereof. This feature increases the elasticity of an outer side of the seatback. Furthermore, the rear pad member that is provided rearward of the airbag module also increases the elasticity of the rear side of the seatback. The increase in the elasticity of the outer and rear sides of the seatback improves the comfort of the vehicle seat.

The above vehicle seat may be preferably configured such that the slit is in a form of a straight line. In this configuration, the slit is made simple.

The above vehicle seat may be preferably configured such that the slit extends in a substantially horizontal direction. In this configuration, an assembling worker can easily open the slit by pushing the lower end of the rear pad member outward, which enables the worker to easily assemble the airbag module.

The above vehicle seat may be preferably configured such that the rear pad member has an auxiliary slit extending therethrough in the front-rear diction at the upper part of the rear pad member. In this configuration, the lower part of the rear pad member can be easily moved outward, which facilitates the opening of a gap between the pad member and the seatback frame outer portion. This feature allows an assembling worker to easily insert the airbag module into the gap between the seatback frame outer portion and the pad member, which enables the worker to easily assemble the airbag module.

The above vehicle seat may be preferably configured such that the pad member includes an upper pad member (73) that connects the upper ends of the front pad member and the rear pad member, and covers the seatback frame outer portion and the airbag module from the upper side, and an auxiliary slit (76) extending therethrough in the front-rear direction along which the rear pad member and the upper pad member joined to each other. In this configuration, the auxiliary slit (76) is formed at a location where a load is likely to be concentrated at when the lower end of the rear pad member is pushed outward, which facilitates the opening of the lower end of the rear pad member. Thus, this feature enables an assembling worker to easily open a gap between the pad member and the seatback frame outer portion.

The above vehicle seat may be preferably configured such that the auxiliary slit (76) extends upward and outward in an inclined direction from the upper edge of the inner surface of the rear pad member. This configuration facilitates the opening of the lower end of the rear pad member, which enables an assembling worker to easily open a gap between the pad member and the seatback frame outer portion.

The above vehicle seat may be preferably configured such that the frame bracket and the module bracket are fastened to each other at fastening points (P1, P2) located below the auxiliary slit, as viewed from the rear. In this configuration, the outward movement of the lower end of the rear pad member deforms the pad member along a line of the auxiliary slit, thereby exposing the fastening points. This feature facilitates the fastening of the frame bracket to the module bracket.

The above vehicle seat may be preferably configured such that the slit is located below the frame bracket. This configuration enables the airbag module to be moved upward such that the module bracket is aligned with the frame bracket, which facilitates the assembly of the airbag module.

The above vehicle seat may be preferably configured such that the slit is a deep cut extending from the inner surface of the rear pad member to a point close to the outer surface thereof. In this configuration, the deep cut slit is opened easier than the slit that is not such a deep cut, which enables an assembling worker to easily insert the airbag module, facilitating the assembly of the airbag module.

The above vehicle seat may be preferably configured such that the side pad member has a deployment hole extending through in the left-right direction located at the outer side of the airbag module and frontward of the slit. In this configuration, the slit and the deployment hole are provided at different positions along the front-rear direction. As a result, part of the pad member near the slits and the deployment hole is less deformable compared to the cases where the slit and the deployment hole are provided at a same position along the front-rear direction, thereby enabling the shape of the pad member to be easily maintained.

The above vehicle seat may be preferably configured such that the vehicle seat comprises a skin cover including a rear skin cover for covering the rear side of the pad member and an outer skin cover for covering the outer side of the pad member, wherein the outer edge of the rear skin cover and the rear edge of the outer skin cover are joined to each other by a slide fastener extending vertically, wherein the side pad member has a receiving recess recessed inward at a location of the slide for accommodating the slide fastener, and wherein the receiving recess is formed at a different position from the opening end of the slit. In this configuration, the slit opening end and the receiving recess are provided at different positions, part of the rear pad member near the opening end of the slit is more rigid compared to the case where they are provided at a same position.

The above vehicle seat may be preferably configured such that the vehicle seat comprises a shape former coupled to the outer part of the seatback frame outer portion, wherein the airbag module is located frontward of the shape former and the pad member is located rearward of the shape former. In this configuration, even when the vehicle seat comprises a shape former, an assembling worker is enabled to open the slit and insert the airbag module into the opened slit to thereby move the airbag module at a point frontward of the shape former.

The above vehicle seat may be preferably configured such that the slit extends in the left-right direction to have a left-right width which is greater than or equal to the left-right width of the airbag module. This configuration enables an assembling worker to easily insert the airbag module into the slit.

The above vehicle seat may be preferably configured such that the slit is located below the upper edge of the shape former and above the lower edge of the shape former. This configuration enables an assembling worker to easily insert the airbag module through the slit to a point near the shape former.

The above vehicle seat may be preferably configured such that the slit and the shape former overlap in the front-rear direction, which determines the distance between the outer end of an overlap part where the slit and the shape former overlap and the outer end of the slit in the left-right direction, and that the distance is greater than or equal to the width of the airbag module in the left-right direction. In this configuration, the slit is opened to define a hole space between the outer end part of the slit and the outer end part of the shape former, such that the width of the hole space is greater than the width of the airbag module in the left-right direction. This feature enables an assembling worker to easily insert the airbag module through the hole space toward a point frontward of the shape former.

The above vehicle seat may be preferably configured such that the shape former is joined to the upper portion of the outer side of the seatback frame outer portion, wherein the shape former includes a shape former upper portion extending outward in the left-right direction, a shape former center portion extending downward from the outer side of the shape former upper portion, and a shape former lower portion extending downward and inward in an inclined direction from the lower end of the shape former center portion, and wherein the slit is formed so as to overlap the shape former lower portion in the front-rear direction. This configuration enables an assembling worker to easily insert the airbag module from the lower side of the slit and move it upward, without being obstructed by the shape former.

BRIEF DESCRIPTION OF THE DRAWINGS

FIG. 38 an explanatory diagram showing (A) a stay cloth according to a first variant of the above embodiments, and (B) a stay cloth according to a second variant of the above embodiments;

FIG. 40 an explanatory diagram showing (A) a stay cloth according to a third variant of the above embodiments, and (B) a stay cloth according to a fourth variant of the above embodiments.

DESCRIPTION OF THE PREFERRED EMBODIMENT(S)

Embodiments of a vehicle seat according to the present invention, in which the vehicle seat is used in a rearmost row of rear seats of a vehicle, will be described with reference to the appended drawings. In the following description, the front/rear, left/right, and up/down directions are defined relative to a passenger vehicle equipped with the vehicle seat.

First Embodiment

Figure 1:
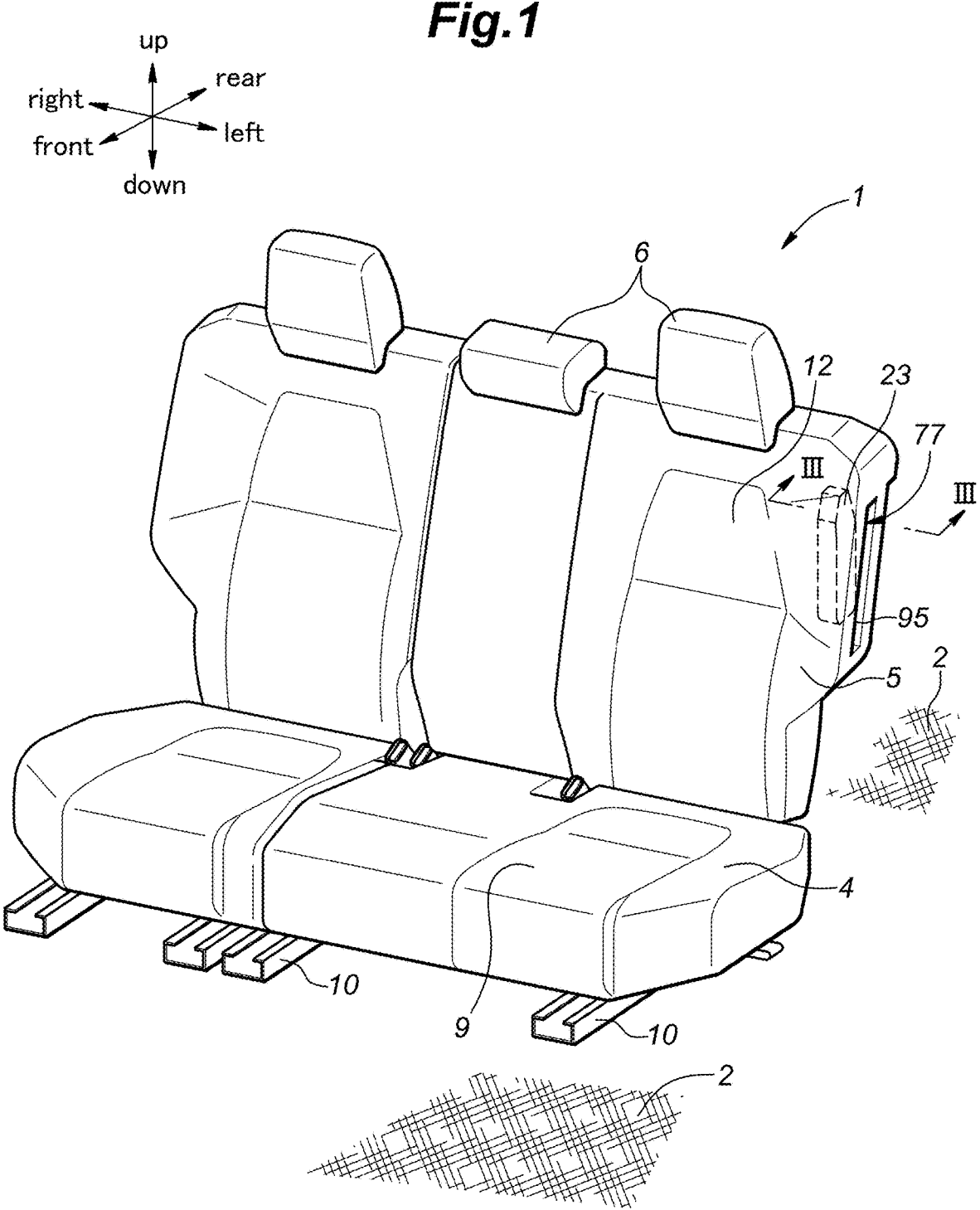
FIG. 1 is a perspective view of a vehicle seat according to a first embodiment of the present invention.

As shown in FIG. 1, a vehicle seat 1 according to the present invention is provided in a vehicle having two rows of seats in a front-rear direction, and forms a left side seat in the second row of rear seats. The vehicle seat 1 is provided on a floor 2 of the vehicle. The vehicle seat 1 includes a seat cushion 4 adapted to support a seated occupant, a seatback 5 supported at the rear of the seat cushion 4 and serving as a back recline, and headrests 6 provided on the top of the seatback 5.

The seat cushion 4 extends in a left-right direction and forms a seating surface 9 for two occupants. Provided below the seat cushion 4 are left and right lower rails 10 that are coupled to an upper surface of the floor 2 and extend in the front-rear direction. Left and right upper rails are engaged with the left and right lower rails 10, respectively, so as to be slidably moved along the lower rails 10. The seat cushion 4 is supported by the floor 2 via the lower rails 10 and the upper rails, and is capable of sliding rear and front.

The seatback 5 extends vertically and has a generally box-like shape with a surface facing frontward. A support surface 12 is formed on the front surface of the seatback 5 to support the backs of two occupants. The lower end of the seatback 5 is rotatably coupled to the rear end of a frame by using a known reclining mechanism, where the frame is provided to support the seat cushion 4.

As shown, the two headrests 6 are provided at the top of the seatback 5, side by side, on the left and right. The respective lower ends of the headrests 6 may be rotatably coupled to the seatback 5 so as to be rotatable about an axis in the left-right direction. The vehicle seat 1 may be an under-floor-storable seat configured such that a user can operate a strap to fold the seatback 5 frontward, storing the seat in a storage space under the floor 2.

Figure 2:
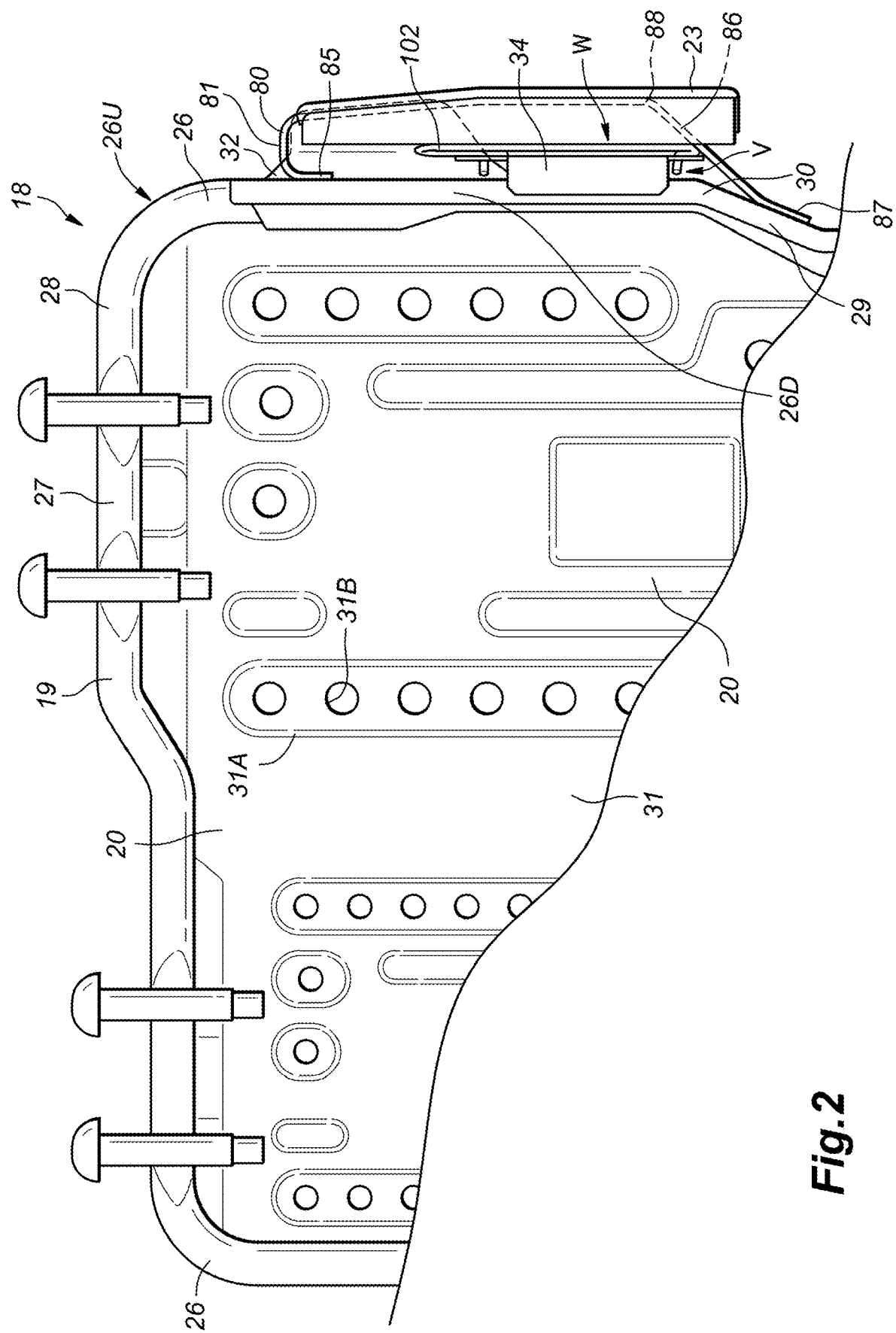
FIG. 2 is a front view of the vehicle seat when a pad member and a skin cover are removed.
Figure 3:
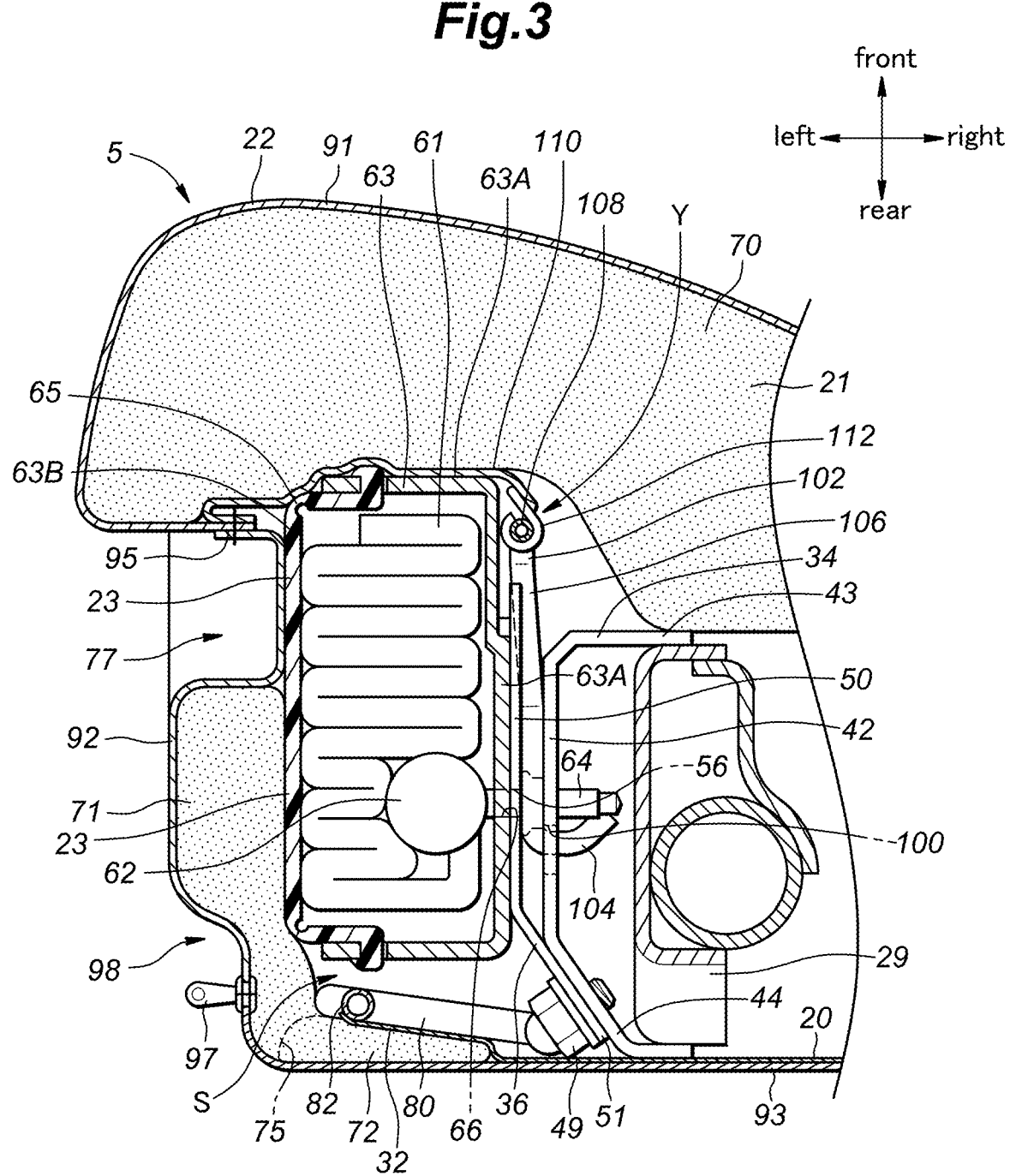
FIG. 3 is cross-sectional view taken along line III-III in FIG. 1.

Next, the structure of the seatback 5 will be described. As shown in FIGS. 2 and 3, the seatback 5 includes a seatback frame 18 (FIG. 2) configured to form a framework of the seat, a pad member 21 (FIG. 3) supported by the seatback frame 18, a skin cover 22 (FIG. 3) provided on the front surface of the pad member 21 to form an outer surface of the seatback 5, and an airbag module 23 (FIGS. 2 and 3) supported on the seatback frame 18.

As shown in FIG. 2, the seatback frame 18 forms the framework of the seatback 5, and includes a seatback frame outer portion 19 that forms a rectangular frame and a pan frame 20 (plate) located on the rear side of the seatback frame outer portion 19. The seatback frame outer portion 19 includes left and right side frames 26 (side members) extending vertically, an upper frame 27 extending in the left-right direction and coupled to the upper ends of the left and right side frames 26, and a lower frame (not shown) extending in the left-right direction and coupled to the lower portions of the left and right side frames 26. The side frame upper portions 26U and the upper frame 27 constitute the respective upper portions of the left and right side frames 26, and are formed by the bending of one circular pipe 28 into an inverted U-shaped. Side frame lower portions 26D (FIG. 3) are the lower portions of the left and right side frames 26, and are formed by sheet metal members 29 each having opposing left and right surfaces (i.e., surfaces facing away from each other in the left-right direction). The inner sides of the upper portions of the sheet metal members 29 are welded to the lower ends of the pipe 28. The front and rear edges of each of the sheet metal members 29 are bent toward the inside of the seat. The lower ends of the left and right side frames 26 each are rotatably coupled to the frame, by a reclining mechanism, for supporting the seat cushion 4. In the present embodiment, as shown in FIG. 3, the side frame lower portion 26D is formed by the two sheet metal members 29 that are arranged to face each other in the left-right direction and are coupled to each other.

Figure 4:
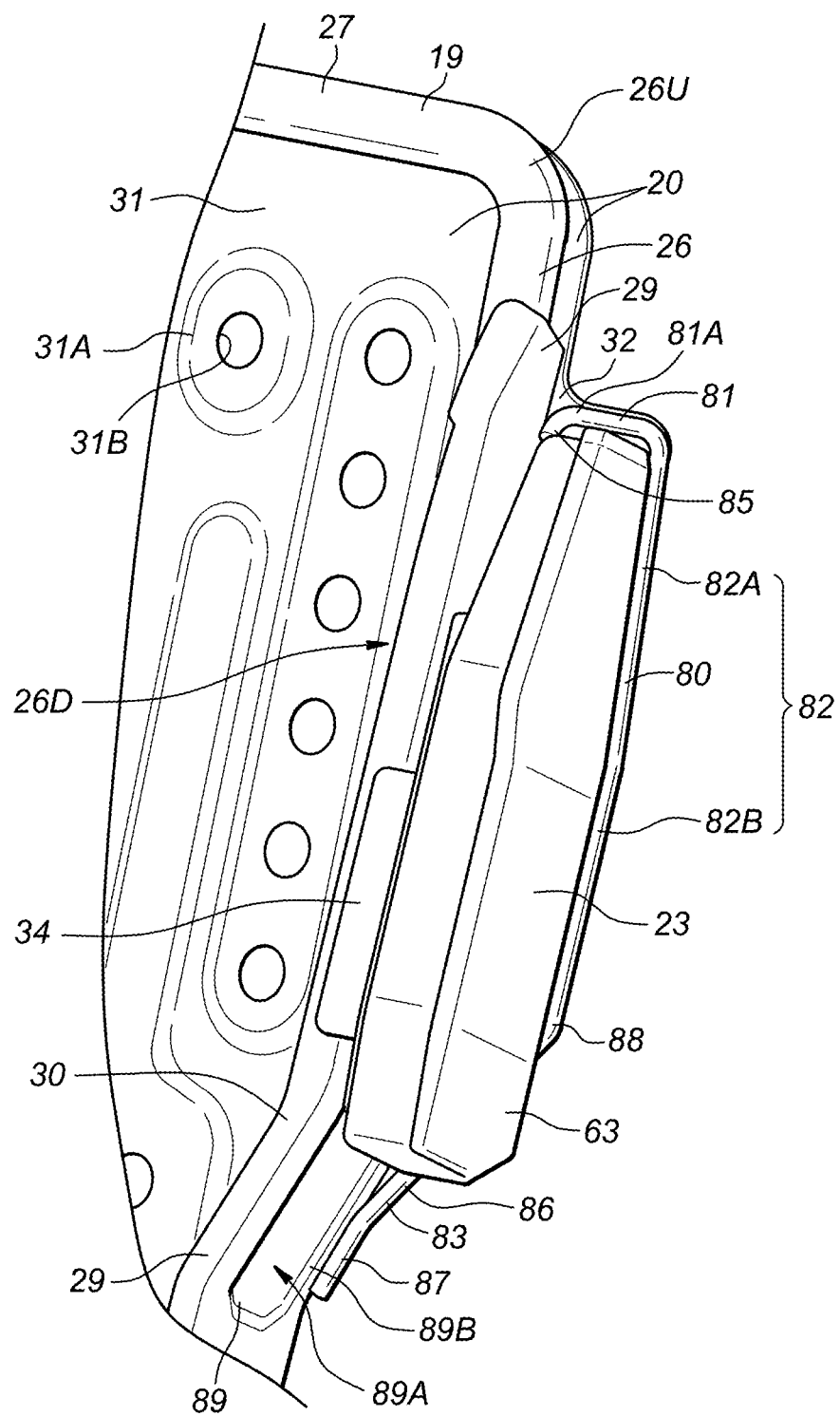
FIG. 4 is a perspective view of an upper left portion of the vehicle seat when the pad member and the skin cover are removed.

As shown in FIGS. 3 and 4, the left side frame lower portion 26D has a frame bend section 30 in the center part in the vertical direction, where the frame bend section 30 is bent inward in the left-right direction (i.e., bent to the right).

Figure 6:
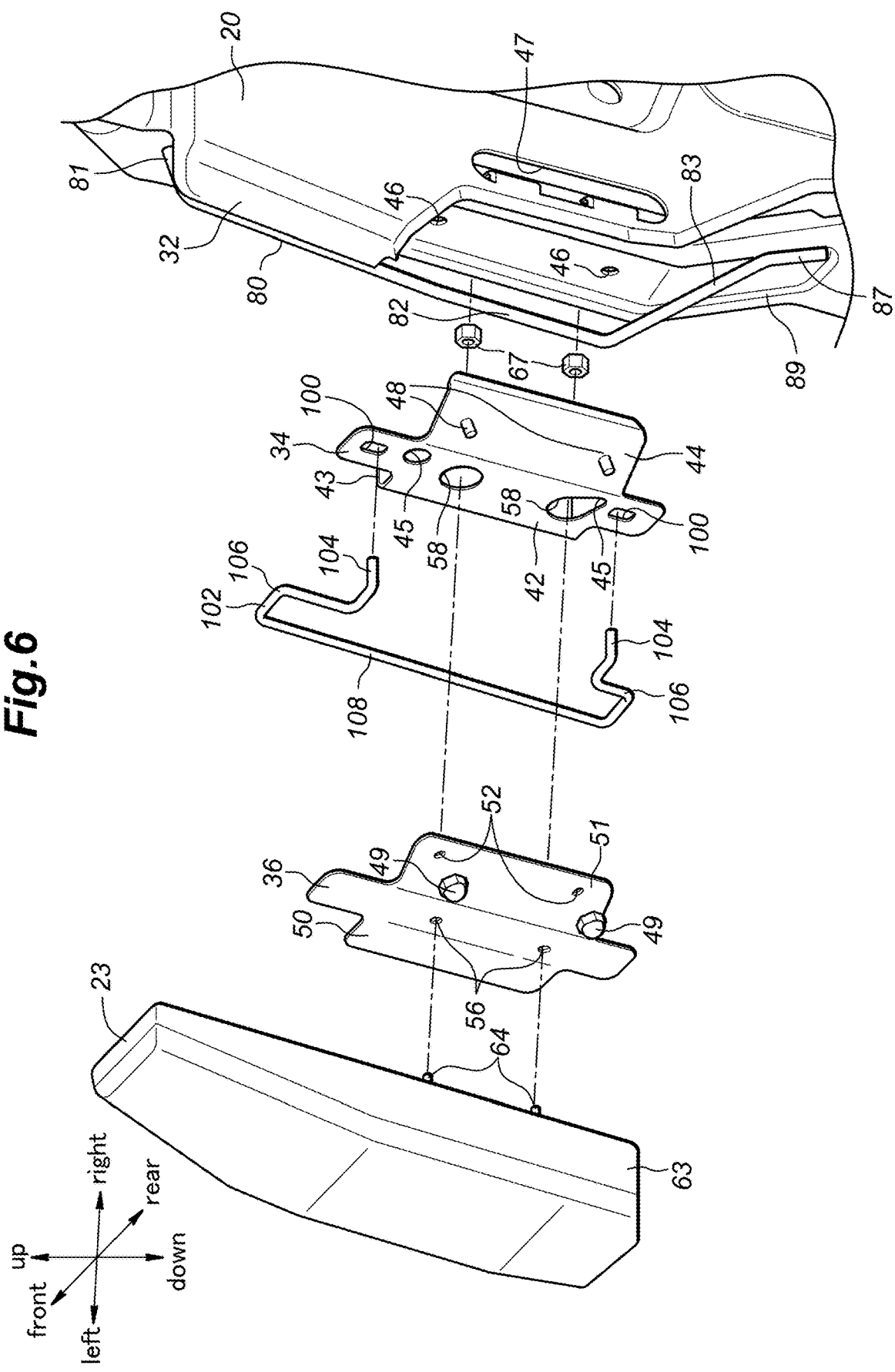
FIG. 6 is an exploded perspective view, as viewed from the rear, of the structure for coupling the airbag module to the side frame.

The pan frame 20 is a metal plate-shaped member and is positioned on the rear side of the side frames 26 and the upper frame 27 so that the pan frame has opposing front and rear surfaces. As shown in FIGS. 2 and 6, the pan frame 20 includes a pan frame base 31 extending to cover the respective rear sides of the side frames 26, the upper frame 27, and the lower frame, and a pan frame protrusion 32 extending outward from the pan frame base 31 beyond the outer (left) edge of the outer (left) side frame 26. The upper edge, the lower edge, and the left and right side edges of the pan frame base 31 are welded to the upper frame 27, the lower frame, and proper locations on the left and right side frames 26, respectively. As a result, the pan frame 20 is coupled to the rear side of the seatback frame outer portion 19. As shown in FIG. 2, a plurality of beads 31A and punch holes 31B for reinforcement may be provided at proper locations on the pan frame base 31.

As shown in FIG. 3, one of the left and right side frames (the left side frame 26 in this embodiment) is directly coupled to a frame bracket 34. As shown in FIG. 6, fastened to the frame bracket 34 is a module bracket 36 (retainer) configured to hold the airbag module 23. This causes the airbag module 23 to be coupled to the side frame 26 via the module bracket 36 and the frame bracket 34. As shown in FIG. 4, the airbag module 23 has a generally box-like shape extending along the side frame 26 and is positioned so that the outer surface of the airbag module 23 faces to the left (outside).

Figure 5:
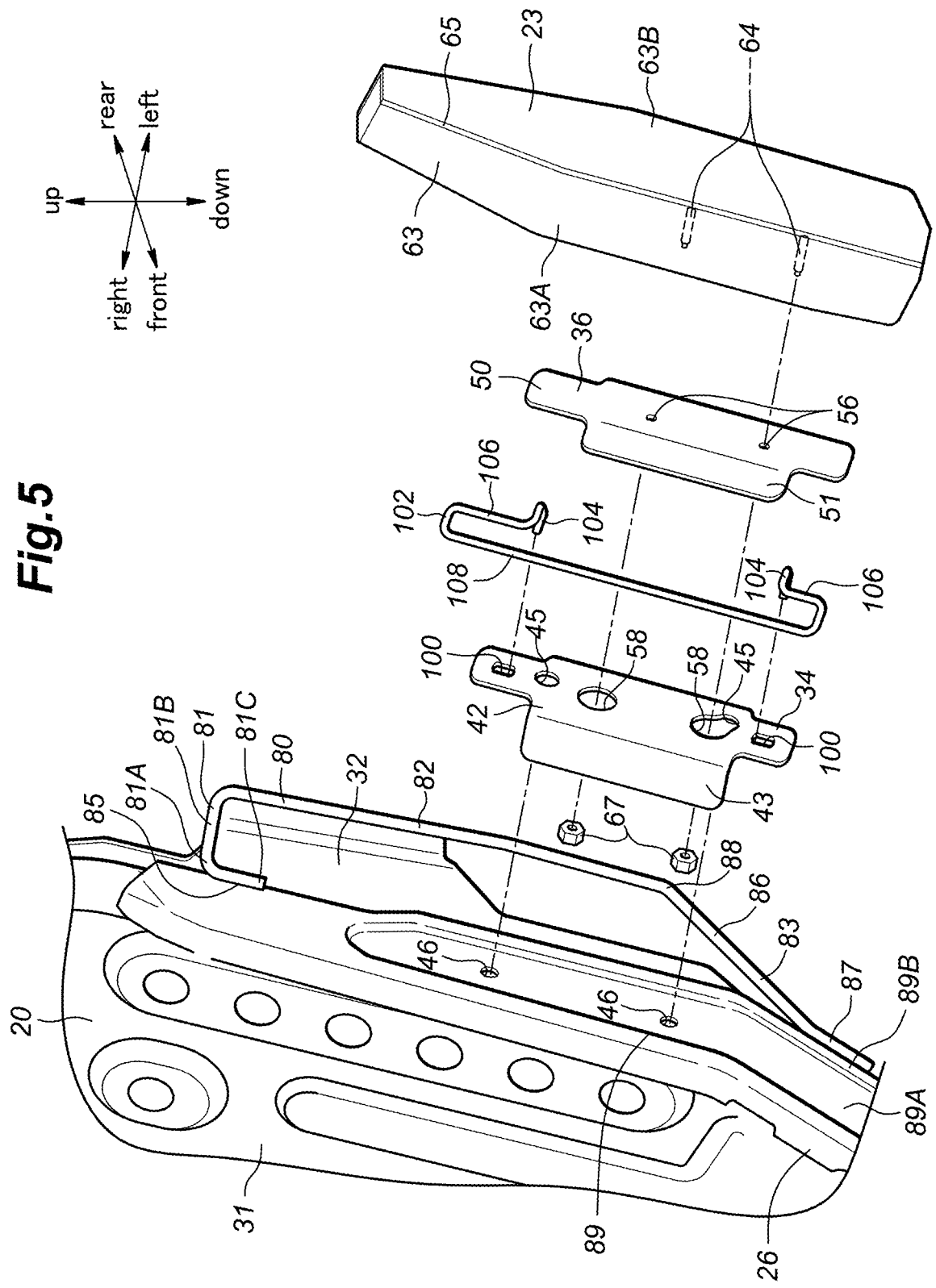
FIG. 5 is an exploded perspective view, as viewed from the front, of a structure for coupling an airbag module to a side frame.

As shown in FIGS. 5 and 6, the frame bracket 34 is a folded sheet metal member. As shown in FIG. 3, the plate thickness of the frame bracket 34 is greater than that of the pan frame 20. This condition of the plate thickness causes the frame bracket 34 to be sufficiently more rigid and less likely to be deformed compared to the pan frame 20.

The frame bracket 34 includes a generally square plate-shaped bracket base 42 having opposing surfaces generally facing away from each other in the left-right direction, a bracket front section 43 (FIG. 5) extending from the front edge of the bracket base 42, and a bracket slope section 44 (FIG. 6) extending from the rear edge of the bracket base 42.

As shown in FIG. 5, the bracket front section 43 is a plate part extending rightward from the front edge of the bracket base 42. As shown in FIG. 7(A), the bracket front section 43 is welded to the front face of the sheet metal member 29 that forms the left side frame lower portion 26D. In the present embodiment, the upper and lower right edge parts of the bracket front section 43 are welded to the front surface of the sheet metal member 29. In FIGS. 7(A) and 7(B), the welded portions are indicated with dot-hatching.

As shown in FIGS. 3 and 6, the bracket slope section 44 is a plate section inclined rearward to the right (inner side). As shown in FIG. 7(B), the rear edge of the bracket slope section 44 is bent to the right and welded to the rear surface of the sheet metal member 29. In the present embodiment, the upper and lower right edges of the bracket slope section 44 are welded to the rear surface of the sheet metal member 29. As a result, the frame bracket 34 is coupled to rear edge parts of the left side frame 26 of the seatback frame outer portion 19.

As shown in FIGS. 5 and 6, the frame bracket 34 and the sheet metal member 29 are preferably provided with positioning holes 45 and 46, respectively. In the present embodiment, the bracket base 42 is provided with two through holes, i.e., the positioning holes 45, and the sheet metal member 29 is also provided with two through holes, i.e., the positioning holes 46 at corresponding locations to the positioning holes 45. During welding, the frame bracket 34 is easily maintained at the proper position relative to the sheet metal member 29 by inserting jigs into the positioning holes 45 in the bracket base 42 and the corresponding positioning holes 46 in the sheet metal member 29. This facilitates the welding of the frame bracket 34 to the sheet metal member 29 at the proper relative position to the sheet metal member 29. In addition, as shown in FIG. 6, in order to facilitate the welding of the frame bracket 34 to the sheet metal member 29, the pan frame 20 is provided with welding work holes 47, i.e., through holes used for welding work, extending in the front-rear direction at locations rearward of the frame bracket 34.

As shown in FIG. 6, the bracket slope section 44 is provided with two stud bolts 48. More precisely, the stud bolts 48 are inserted into and welded to the through holes in the bracket slope section 44 so as to be secured to the bracket slope section 44.

As shown in FIGS. 5 and 6, the module bracket 36 is a folded sheet metal member, and includes a plate-shaped retainer base 50 extending in the front-rear direction, and a plate-shaped retainer slope section 51 extending from the rear edge of the retainer base 50 and inclined rearward to the right.

As shown in FIG. 6, the retainer slope section 51 has bolt holes 52 extending through it in the thickness direction. The retainer slope section 51 is provided to extend along the rear surface of the bracket slope section 44. The stud bolts 48 are passed through the bolt holes 52, and the module bracket 36 is fastened to the frame bracket 34 by the tightening of nuts 49 (fasteners) to the stud bolts 48. In the present embodiment, domed nuts (cap nuts) are used as the nuts 49. In the following description, a point where the frame bracket 34 is fastened to the module bracket 36, more accurately, an intersection of the central axis of a stud bolt 48 with the rear face of the bracket slope section 44, is referred to as a "fastening point P."

Figure 7:
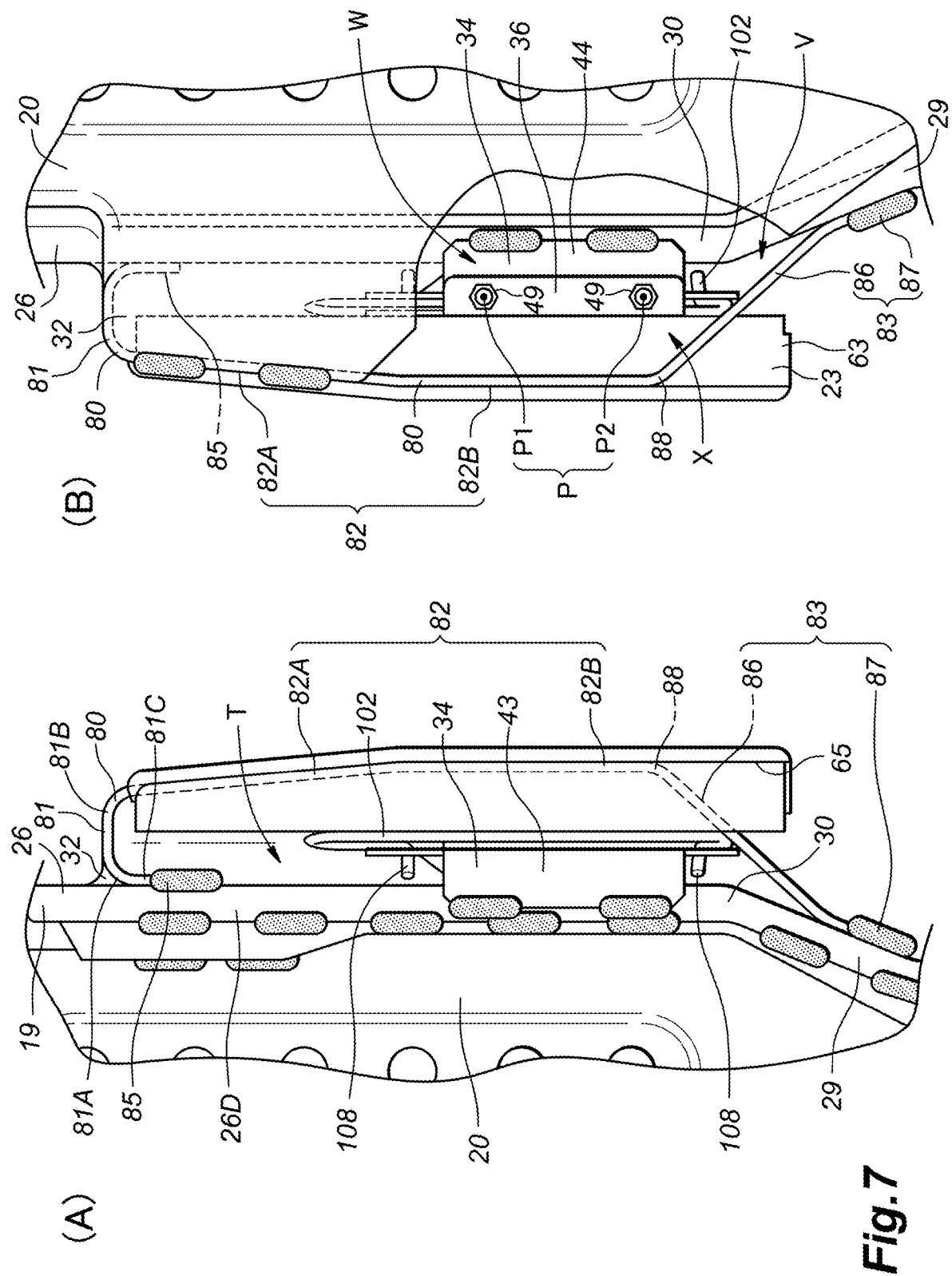
FIG. 7 is a diagram showing an upper left portion of the vehicle seat when the pad member and the skin cover are removed, and (A) and (B) are front and rear views of the upper left portion, respectively.

The module bracket 36 is provided with the bolt holes 52 at the positions corresponding to those of the stud bolts 48 of the bracket slope section 44. As a result, the frame bracket 34 is fastened to the module bracket 36 at two fastening points P1 and P2 (FIG. 7).

In the present embodiment, as shown in FIGS. 5 and 6, the module bracket 36 has the same vertical size as the frame bracket 34. More particularly, the vertical size of the bracket base 42 is substantially the same as that of the retainer base 50, and when the frame bracket 34 is fastened to the module bracket 36, the bracket base 42 and the retainer base 50 are arranged such that the top and lower edges of the bracket base 42 are aligned with those of the retainer base 50 in the vertical direction, respectively.

As shown in FIG. 3, the airbag module 23 includes an airbag 61, an inflator 62 configured to release gas into the airbag 61 to inflate and deploy the airbag 61, and a generally box-like shaped housing 63 that houses the airbag 61 and inflator 62. The inflator 62 is provided with male threaded protrusions 64 each having a generally cylindrical shape and protruding radially outward from the circumference of the inflator.

As shown in FIG. 5, the housing 63 has a generally box-like shape with a closed end. The housing 63 includes a housing body 63A having an opening and a lid 63B configured to close the opening of the housing body 63A. The airbag 61 and the inflator 62 are housed in the housing body 63A. As shown in FIG. 6, the airbag 61 is housed inside the housing 63 in a folded state. The left front edge of the lid 63B has a tear-off line 65 that is designed to tear open under the force of the bag inflation and deployment of the airbag 61. The bottom wall of the housing body 63A is provided with through holes 66 extending therethrough in the thickness direction at predetermined positions.

The male threaded protrusions 64 protrude from the interior of housing 63 to the exterior through the through holes 66. As shown in FIG. 5, the retainer base 50 has bolt holes 56 extending through it in the thickness direction such that the male threaded protrusions 64 are to be inserted into the bolt holes 56. The housing 63 is fastened to the retainer base 50 by the tightening of nuts 67 onto the male threaded protrusions 64. As a result, the airbag module 23 is coupled to the module bracket 36 and held on the left side of the retainer base 50. The airbag module 23 is assembled to the left side frame 26 by fastening the module bracket 36 and the frame bracket 34 at fastening points P1 and P2. In this process, the airbag module 23 is coupled to the left side of the retainer base 50 such that the housing 63 extends vertically and the opening of the housing body 63A opens outward (to the left side in the present embodiment). After assembly, the airbag module 23 is coupled to the left side frame 26 via the frame bracket 34 and the module bracket 36, and is supported by the left side frame 26. In the present embodiment, two through holes 58 are provided in the bracket base 42 such that interference between the male threaded protrusions 64 and the frame bracket 34 is avoided when the module bracket 36 is fastened to the frame bracket 34. As shown in FIGS. 5 and 6, the through holes 58 and the positioning holes 45 may be connected and formed to be one hole.

Figure 8:
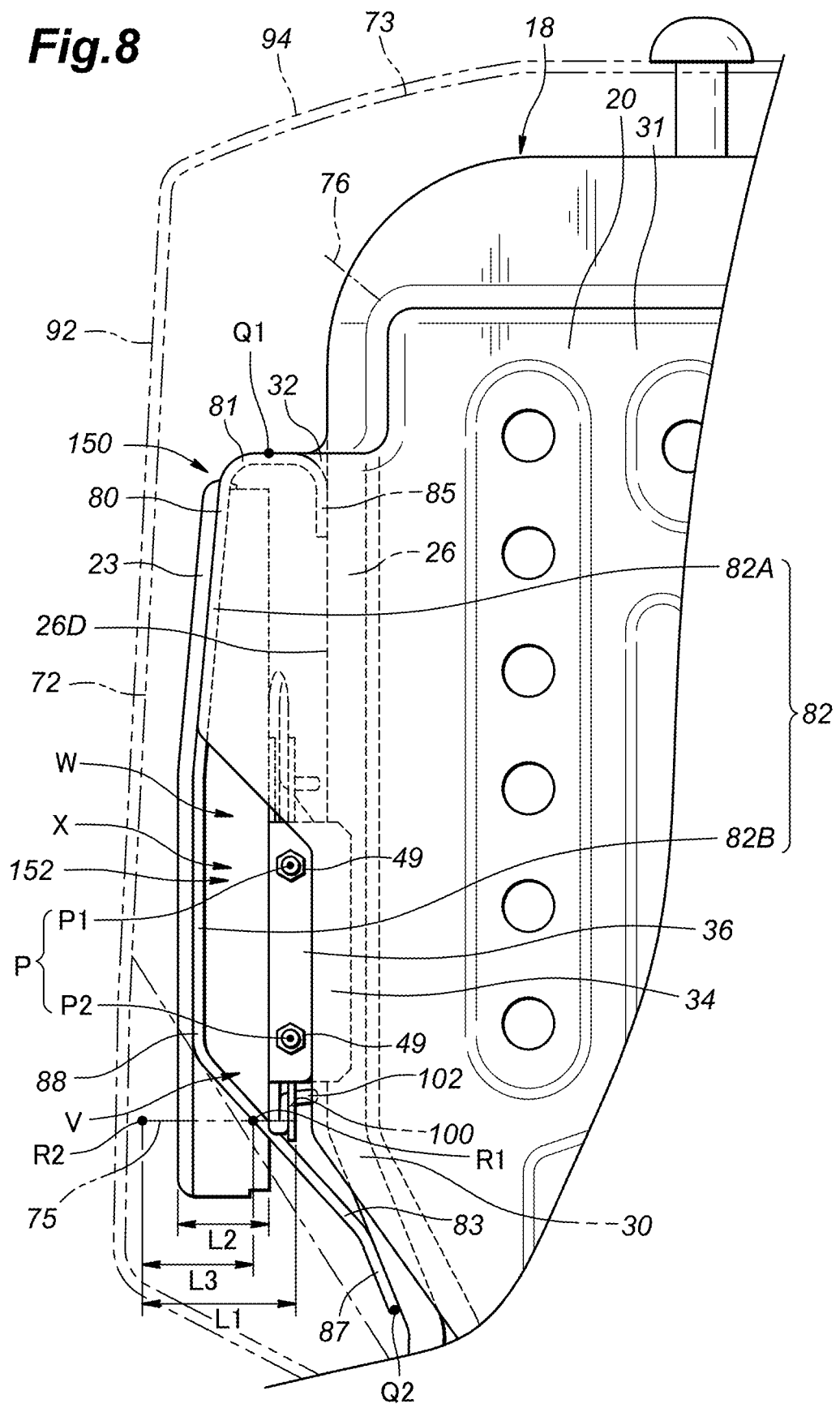
FIG. 8 is a rear view of the vehicle seat when the pad member and the skin cover are removed.
Figure 9:
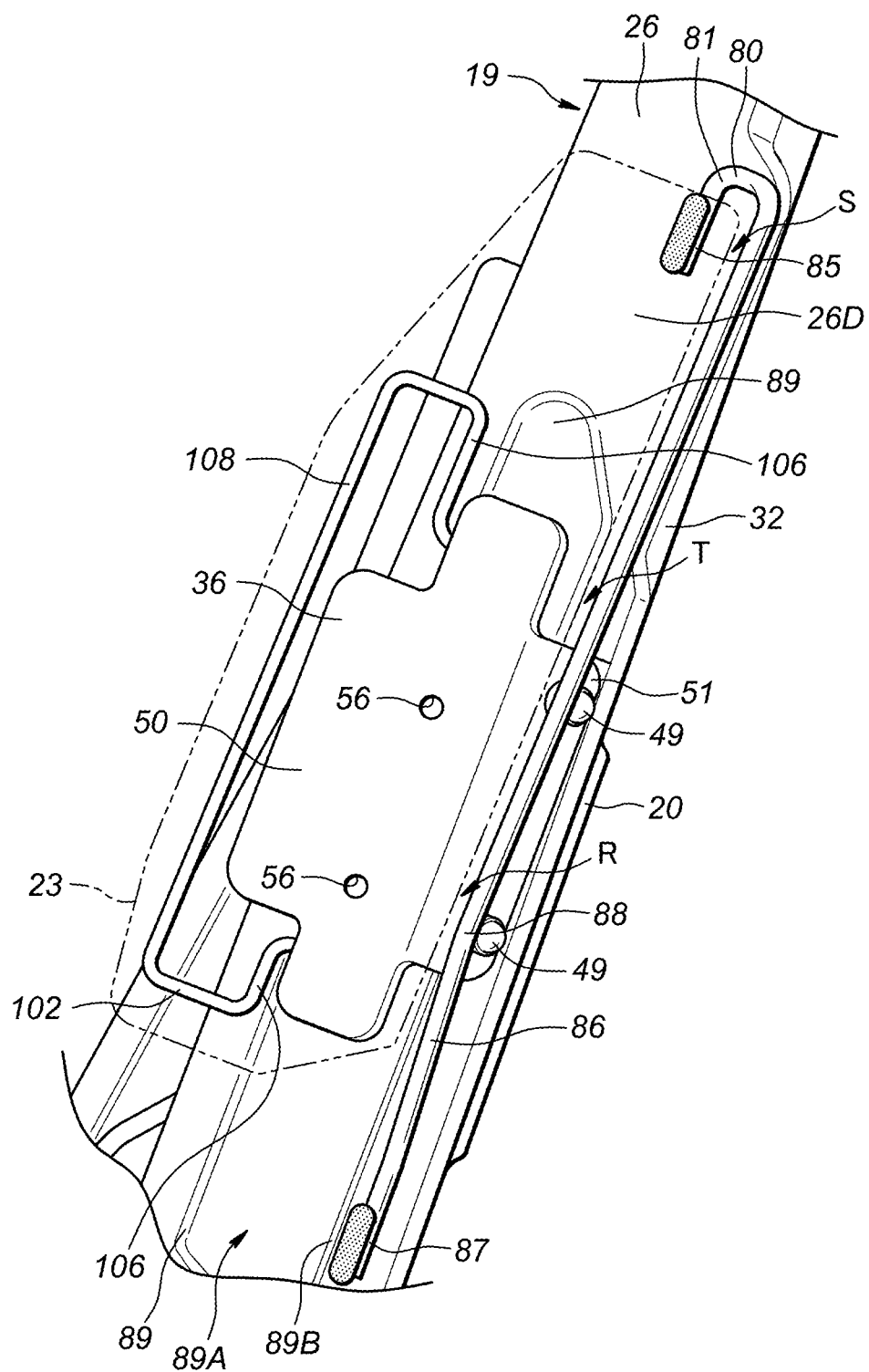
FIG. 9 is a side view of the upper left portion of the vehicle seat when the pad member, the skin cover, and the airbag module are removed.

As shown in FIGS. 2 and 8, the pan frame protrusion 32 extends from the top part of the left side frame 26 to the left and reaches a location rearward of the left edge of the assembled airbag module 23, as viewed in the rear view. As a result, the pan frame protrusion 32 is located above both the two stud bolts 48 (i.e., the two fastening points P1 and P2) in the rear view, as shown in FIG. 8, and the stud bolts 48 (i.e., fastening points P1 and P2) are located below the pan frame protrusion 32. In other words, as shown in FIG. 8, the pan frame 20 has an extension 150 extending to the left beyond the left side frame 26. In order to expose the fastening points P1 and P2, a cutout 152 is formed so as to expose the fastening points P1 and P2 of the extension 150. As shown in FIG. 9, the pan frame protrusion 32 is spaced apart from the rear surface of the airbag module 23, so that a gap space S is formed between the pan frame 20 (more specifically, the pan frame protrusion 32) and the airbag module 23 in the front-rear direction.

As shown in FIGS. 2 and 8, the upper part of the airbag module 23 is located frontward of the pan frame protrusion 32. As a result, the pan frame protrusion 32 extends over (i.e., overlaps) the upper half of the airbag module 23 in the rear view, so that the airbag module 23 is covered by the pan frame protrusion 32 from the rear side. The upper edge of the pan frame protrusion 32 is aligned vertically with that of the airbag module 23, while the lower edge of the pan frame protrusion 32 is positioned between the upper and lower edges of the airbag module 23 in the vertical direction. In the present embodiment, the lower edge of the pan frame protrusion 32 is positioned substantially in the center of the airbag module 23 in the vertical direction.

As shown in FIG. 8, the left side edge (outer edge) of the pan frame protrusion 32 extends along the upper outer edge of the assembled airbag module 23. In the present embodiment, the outer edge of the pan frame protrusion 32 is aligned with the upper outer edge of the airbag module 23 in the front-rear direction, and the pan frame protrusion 32 generally overlaps the airbag module 23 in the rear view. This feature enables the pan frame protrusion 32 and the airbag module 23 to form a less stepped side surface, which improves the appearance of the seatback 5.

As shown in FIG. 2, the upper edge of the pan frame protrusion 32 is located below the upper edge of the pan frame base 31, and also below the upper edge of seatback frame outer portion 19. As a result, a space U, in which a switch knob N for reclining can be provided, is formed such that the space U is located on the inner (right) side of the outer (left) edge of the airbag module 23, on the outer side of the inner edge of the seatback frame outer portion 19, below the upper edge of seatback frame outer portion 19, and above the airbag module 23

The pad member 21 is formed of a flexible cushioning material such as polyurethane foam. As shown in FIGS. 3 and 8, the pad member 21 includes: a front pad member 70 (FIG. 3) configured to cover the seatback frame outer portion 19 and the airbag module 23 from the front; a side pad member 71 (FIG. 3) configured to be coupled to an outer (i.e., left side) portion of the front pad member 70 and extend rearward; a rear pad member 72 (FIGS. 3 and 8) extending from the rear end of the side pad member 71 toward the inner side (i.e., right side) in the left-right direction; and an upper pad member 73 (FIG. 8) configured to connect the upper ends of the front pad member 70, the rear pad member 72, and the side pad member 71 to each other. The rear pad member 72 covers the seatback frame outer portion 19 and the airbag module 23 from the rear, while the upper pad member 73 covers the seatback frame outer portion 19 and the airbag module 23 from the above.

Figure 10:
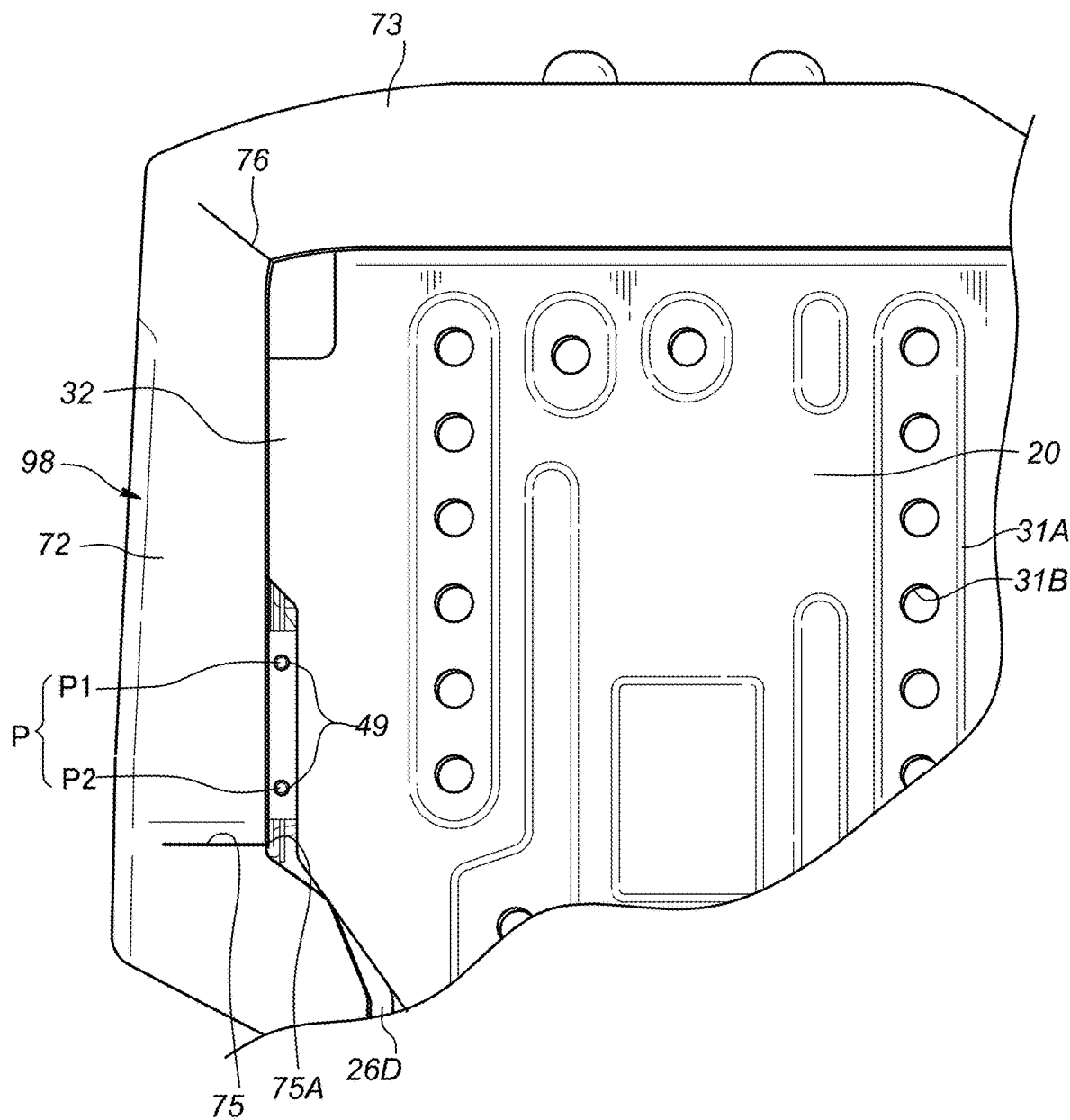
FIG. 10 is a rear view of the vehicle seat when the skin cover is removed.

As shown in FIG. 10, the rear pad member 72 has a slit 75 extending outward (to the left side) from the inner edge (right edge) of the rear pad member in left-right direction. The slit 75 is a cut extending through the rear pad member 72 in the front-rear direction and located below the frame bracket 34. As shown in FIG. 8, the slit 75 has a straight line shape and extends horizontally (i.e., in the left-right direction) and reaches a location rearward of the airbag module 23. In the present embodiment, the slit 75 extends from the right edge of the rear pad member 72 to the left along the lower edge of the airbag module 23 in the rear view and reaches a location rearward of the lower left edge of the airbag module 23. As shown in FIG. 8, the slit 75 is formed to have a lateral width L1 that is greater than the left-to-right width L2 of the airbag module 23. From the inside of the rear pad member 72, the slit 75 extends rightward direction from a location at a generally center portion in the left-right direction of the rear pad member 72 and reaches the inner right end of the rear pad member 72 to form an opening end 75A. In other words, the right edge of the slit 75 defines the opening end 75A, which opens toward the right direction.

An auxiliary slit 76 is formed to extend through the rear or upper pad member in the front-rear direction at a location where the rear pad member 72 is connected to the upper pad member 73 in the right-left direction. The auxiliary slit 76 is also a cut extending through the pad member in the front-rear direction. In the present embodiment, the auxiliary slit 76 extends from the upper inner edge (right edge) of the rear pad member 72 toward the outer edges (i.e., toward the left). In the present embodiment, the auxiliary slit 76 has a straight line shape and extends upward to the right from the upper right edge of the rear pad member 72. The auxiliary slit 76 is preferably formed to extend in the direction at an angle of approximately 45 degrees.

The slit 75 is located below the two fastening points P1 and P2, as viewed in the rear view, and the auxiliary slit 76 is located above the two fastening points P1 and P2. In other words, the two fastening points P1 and P2 are located between the slit 75 and the auxiliary slit 76 in the rear view.

The side pad member 71 (FIG. 3) has a box-like shape extending vertically over an outer (i.e., left side) edge of the airbag module 23 to cover the airbag module 23 from the outer side. As shown in FIG. 3, a deployment hole 77 is provided in a front portion of the side pad member 71. The deployment hole 77 passes through the front portion of the side pad member 71 in the left-right direction, and is located on the outer side (i.e., left side) of the airbag module 23. In the present embodiment, as shown in FIG. 1, the deployment hole 77 is formed to extend vertically along the seatback 5, and as shown in FIG. 3, the deployment hole 77 is located frontward of the slit 75.

As shown in FIG. 4, the vehicle seat 1 includes a shape former 80 coupled to the seatback frame outer portion 19, more particularly to the left side frame 26 in this case. The shape former 80 is formed by a folded wire member and is welded to the left side frame 26 at the both ends, as shown in FIG. 7(A). As shown in FIG. 9, the shape former 80 is located rearward of the airbag module 23 so that a gap space T is formed between the airbag module 23 and the shape former 80 in the front-rear direction. Thus, as the shape former 80 is formed of a wire member, the shape former 80 is enabled to be made lightweight and has a simple structure of the shape former 80.

As shown in FIG. 4, the shape former 80 is welded to the upper portion of left side frame 26. The shape former 80 includes a shape former upper portion 81 (an upper portion of the shape former) extending outward to the left from the left side frame 26, a shape former center portion 82 extending downward from the left end of the shape former upper portion 81, and a shape former lower portion 83 extending downward to the right from the lower end of the shape former center portion 82 and welded to the lower portion of the left side frame 26.

As shown in FIG. 5, the shape former 80 has a curved section 81A formed so as to bend and extend downward along the upper portion of the left side frame 26 at the inner end of the shape former upper portion 81 (in the present embodiment, at the right end). Specifically, the shape former upper portion 81 has a body section 81B extending in the left-right direction and an extension section 81C extending downward from the inner end (right end) of the body section 81B. As shown in FIG. 7(A), an upper attachment section 85 is provided in the curved section 81A, more accurately, in the extension section 81C, and the upper attachment section 85 of the shape former upper portion 81 is coupled by welding to the upper left side surface of the side frame 26. As shown in FIG. 5, the upper attachment section 85 is located frontward of the upper edge of the pan frame protrusion 32 and the shape former 80 is coupled to the left side frame 26 at a location frontward of the pan frame protrusion 32, enabling the pan frame protrusion 32 to cover the upper attachment section 85 from the rear to thereby protect the welded part of the upper attachment section 85 from loads applied from the rear. A middle section to the outer end of the shape former upper portion 81 is aligned in the front-rear direction with the upper edge of the pan frame protrusion 32; that is, the middle section of the shape former upper portion 81 extends in the left-right direction along the upper edge of the pan frame protrusion 32 in the rear view.

As shown in FIG. 4, the shape former center portion 82 connects the shape former upper portion 81 and the shape former lower portion 83 vertically on the outer side (left side) of the left side frame 26. The shape former center portion 82 includes an upper half portion 82A extending downward from the left end of the shape former upper portion 81 and extending along the outer side edge of the pan frame protrusion 32, and a lower half portion 82B extending downward from the lower end of the upper half portion 82A. The upper half portion 82A extends from the vertical position of the upper edge to the lower edge of the pan frame protrusion 32, and the lower end of the upper half portion 82A, i.e., the upper end of the lower half portion 82B, is aligned in the front-rear direction with the lower and outer edge of the pan frame protrusion 32. As a result, the shape former center portion 82 extends below the pan frame protrusion 32. The upper half portion 82A and the lower half portion 82B are located on the outer side (i.e., left side) of the left side frame 26. As shown in FIG. 8, a gap space W is formed in the left-right direction between the lower half portion 82B and the outer (left side) of the left side frame 26.

In the present embodiment, the upper half portion 82A of the shape former center portion 82 is coupled to the left edge of the pan frame protrusion 32. More specifically, as shown in FIG. 7(B), the upper half portion 82A is welded to the left edge of the pan frame protrusion 32 at two points (portion with dot-hatching in FIG. 7(B)).

As shown in FIG. 7(A), the shape former lower portion 83 includes a body section 86 extending generally straight down to the right from the lower end of the shape former center portion 82, and a lower attachment section 87 extending from the lower end of the body section 86 and welded to the left side surface of the left side frame 26. The body section 86 is inclined down to the right (inward in the left-right direction). The shape former 80 has a shape former curved section 88 formed so as to bend and extend downward and inward at the connection between the lower half portion 82B of the shape former center portion 82 and the body section 86. The lower attachment section 87 is provided at the lower end of the shape former 80, the lower attachment section being bent slightly downward along the left side frame 26. As shown in FIGS. 2, 7(B) and 8, the shape former curved section 88 is located above the frame bend section 30 and the lower attachment section 87 is located below the frame bend section 30. The upper part of the body section 86 is located on the left side with respect to the left side frame 26, and a gap space V is formed in the left-right direction between the upper part of the body section 86 and the left side frame 26.

In this way, as shown in FIGS. 7(B) and 8, the lower half portion 82B of the shape former center portion 82 and the shape former lower portion 83 connect the lower edge of the pan frame protrusion 32 and the lower portion of the left side frame 26. That is, the shape former 80 includes a portion extending between the lower edge of pan frame protrusion 32 and the lower portion of left side frame 26. In addition, a through-hole space X (FIG. 8), which is formed to extend in the front-rear direction, is defined by the right edge of the lower half portion 82B of the shape former center portion 82, the right edge of the shape former lower portion 83, the lower edge of the pan frame protrusion 32, and the lower left edge of the left side frame 26.

In the present embodiment, as shown in FIG. 8, at least a part of the shape former center portion 82 (in this case, the entire area of the shape former center portion 82, including the upper half portion 82A and the lower half portion 82B) extends along the outer surface (i.e., left side) of the airbag module 23 in the rear view.

The pan frame protrusion 32 covers the upper part (the upper half in the present embodiment) of the airbag module 23 from the rear. Thus, when the pad member 21 and the skin cover 22 are not provided, the lower part (the lower half) of the airbag module 23 is visible from the rear through the through-hole space X, as shown in FIGS. 7(B) and 8. As shown in FIG. 8, the lower edge of the pan frame protrusion 32 is positioned above the two fastening points P1 and P2. Two stud bolts 48 (i.e., the two fastening points P1 and P2) are both located frontward of the through-hole space X. In other words, the through-hole space X is located rearward of both the two stud bolts 48 (i.e., the two fastening points P1 and P2), and when the pad member 21 and the skin cover 22 are not provided, both the two stud bolts 48 (two fastening points P1 and P2) are visible through the through-hole space X, and are accessible by a fastening tool (e.g., universal wrench) through the through-hole space X from the rear.

When the pad member 21 and the skin cover 22 are not provided, the upper or lower edge of the module bracket 36 is visible from the rear through the gap spaces V, W between the left side frame 26 and the shape former 80. In the present embodiment, the upper and lower edges of the module bracket 36 are visible from the rear through the through-hole space X.

As shown in FIG. 5, the left side frame 26 has a linear bead 89 extending vertically to increase the stiffness of the left side frame 26. The lower attachment section 87 is attached to the left side frame 26 rearward of the bead 89. In the present embodiment, the bead 89 is formed as a side frame recess 89A that is recessed inward from the outer side, and the lower attachment section 87 is welded near an edge 89B of the side frame recess 89A. As a result, the coupling between the shape former 80 and the side frame 26 is located near the edge 89B of the bead 89, which is a stiffened portion, and the shape former 80 is firmly supported by the side frame 26.

In the present embodiment, the shape former 80 is generally flush with the pan frame 20, as shown in FIG. 9. In other words, the shape former 80 and the pan frame 20 are generally provided on the same plane. The lower end of the shape former 80, more specifically, the rear end of the lower attachment section 87, is located close to the pan frame 20 in the side view.

The front and rear edges of the side pad member 71 are connected to the front pad member 70 and the rear pad member 72, respectively. As shown in FIG. 3, when the pad member 21 is assembled, the front pad member 70 and the rear pad member 72 are located frontward and rearward of the shape former 80, respectively. The side pad member 71 is pulled inward (i.e., to the right) by the front pad member 70 and the rear pad member 72, and in contact with the left side of the shape former 80. The shape former 80 is in contact with the inner side surface of the side pad member 71, i.e., the right side surface to restrict the movement of the side pad member 71 to the right. This configuration determines the position of the side pad member 71, and forms the outer shape of the seatback 5. When a rightward load is applied to the left side surface of the seatback 5, the shape former 80 supports the side pad member 71 from the inner side thereof, thereby preventing deformation of the seatback 5. In other words, the shape former 80 defines the outer shape of the seatback 5 and serves to form the shape of the seatback 5.

As shown in FIG. 9, the shape former 80 is located rearward of the airbag module 23, and a gap space R is formed between the shape former 80 and the airbag module 23 in the front-rear direction.

When the pad member 21 is assembled to the seatback frame outer portion 19, the slit 75 is located below the upper edge of the shape former 80 and above the lower edge of the shape former 80. In this state, the slit 75 and the shape former 80 overlap in the front-rear direction. In the present embodiment, the slit 75 overlaps the shape former lower portion 83 in the front-rear direction. Furthermore, in the present embodiment, a slit-overlapping part of the shape former lower portion 83 overlaps the slit 75 in the front-rear direction, and the lateral distance L3 between the left end R1 (the outer side end) of the slit-overlapping part and the left end R2 (the outer side end) of the slit 75 is greater than the lateral width L2 of the airbag module 23.

The skin cover 22 is formed by the connection of a plurality of sheet-shaped members such as cloth and leather. As shown in FIG. 3, the skin cover 22 includes: a front skin cover 91 for covering the front surface of the front pad member 70 and the front left side of the side pad member 71; a left side skin cover 92 (outer skin cover) for covering the rear left side of the side pad member 71; a rear skin cover 93 for covering the rear surface of the rear pad member 72 and the rear surface of the pan frame 20; and an upper skin cover 94 (FIG. 8) for covering the upper surface of the upper pad member 73. The front, left, and rear edges of the upper skin cover 94 are sewn to the upper edges of the front skin cover 91, the left skin cover 92; and the rear skin cover 93, respectively.

As shown in FIG. 3, the left edge of the front skin cover 91 and the front edge of the left side skin cover 92 are stitched to each other to form a stitching line 95. The stitching line 95 serves as a breakable line that can break under a smaller load than other parts of the skin cover 22 (e.g., the stitching line between the front edge of upper skin cover 94 and the top edge of front skin cover 91). The stitching line 95 extends vertically and is accommodated within the deployment hole 77 in the front of the side pad member 71.

The rear edge of the left side skin cover 92 and the left edge of the rear skin cover 93 are joined to each other by a slide fastener 97 that extends vertically. More specifically, the side pad member 71 is recessed inward (i.e., to the right) at the left side rear edge and the rear pad member 72 is recessed frontward at the rear side left edge. As shown in FIG. 3, the pad member 21 has a fastener receiving recess 98 recessed inward in the pad member 21 at the connection between the side pad member 71 and the rear pad member 72. The fastener receiving recess 98 extends vertically at the connection portion between the side pad member 71 and the rear pad member 72 at a position corresponding to the slide fastener 97. The slide fastener 97 is accommodated in the fastener receiving recess 98.

As shown in FIG. 10, the fastener receiving recess 98 is located to the left of opening end 75A. In other words, the fastener receiving recess 98 does not reach the right edge of the rear pad member 72, and the fastener receiving recess 98 and the opening end 75A are provided at different positions. This configuration can increase the stiffness of a portion of the rear pad member 72 near the opening end 75A of the slit 75, compared to the case where the fastener receiving recess 98 overlaps the opening end 75A, which can prevent breakage of the pad member 21.

As shown in FIG. 5, the bracket base 42 has hang holes 100 at the top and bottom thereof, the hang holes 100 extending through it in the thickness direction, i.e., in the left-right direction. A cloth-hook wire 102 is latched into the hang holes 100. In the present embodiment, the cloth-hook wire 102 is formed by the bending of a round metal pipe into a predetermined shape. However, in other case, the cloth-hook wire 102 may be formed by the bending of a round metal bar. As shown in FIG. 5, the cloth-hook wire 102 includes a pair of upper and lower hooks 104 configured to be latched into or hung onto a corresponding hang hole 100 and located at both ends thereof, a pair of upper and lower wire coupling sections 106 extending frontward from the upper and lower hooks 104 beyond the front end of the airbag module 23, and a hook section 108 connecting the front ends of the upper and lower wire coupling sections 106. The cloth-hook wire 102 is engagedly coupled to the frame bracket 34 by the upper and lower hooks 104 at both two ends, each hook 104 being configured to be latched into or hung onto the hang holes 100 of the frame bracket 34. The upper and lower wire coupling sections 106 are L-shaped sections, which extend frontward from the upper and lower hooks 104, passing between the bracket base 42 and the retainer base 50 to the front, to reach bend points frontward of and on the right (inner) side of the airbag module 23, at which points, the wire coupling sections 106 bend to extend outward (to the left). As shown in FIG. 9, the wire coupling sections 106 extend between the bracket base 42 and the retainer base 50, where, when being assembled, the wire coupling sections 106 are pressed against the bracket base 42 by the airbag module 23. This feature holds the cloth-hook wire 102 between the frame bracket 34 and the module bracket 36 to restrict the movement thereof.

As shown in FIG. 3, the vehicle seat 1 is provided with a stay cloth 110 for tearing open the skin cover 22 under the force of the bag inflation and deployment of the airbag 61. The stay cloth 110 is formed of a sheet-like material that is less elastic than the skin cover 22. One end of the stay cloth 110 is stitched to the front skin cover 91 and the left side skin cover 92 at the stitching line 95. The stay cloth 110 extends from the one end toward the hook section 108 of the cloth-hook wire 102. The other end of the stay cloth 110 is provided with one or more J-shaped hooks 112, which are configured to be hung onto the hook section 108 of the cloth-hook wire 102.

Figure 11:
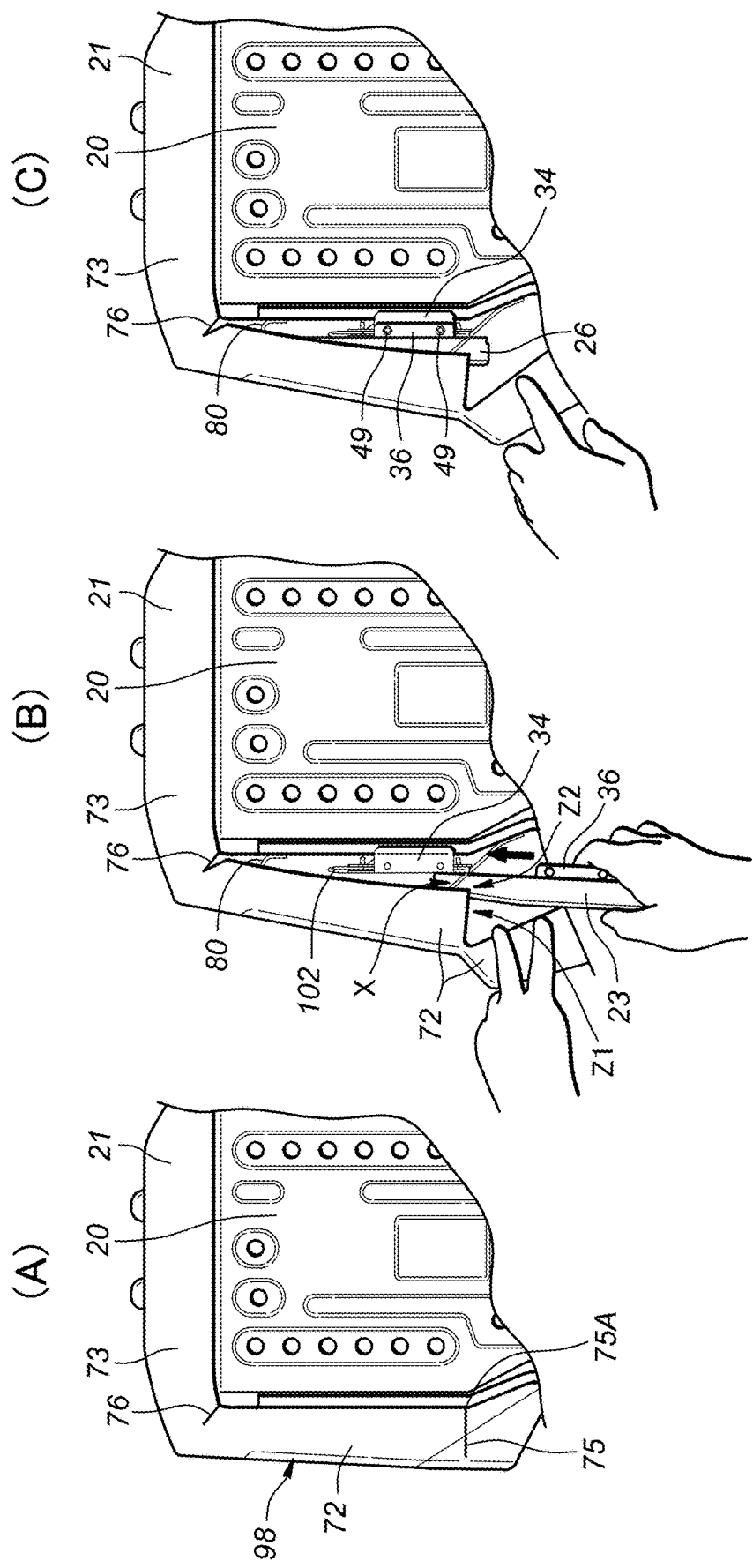
FIG. 11 is an explanatory diagram showing assembly of the airbag module, and (A), (B), and (C) illustrate before assembly, during assembly, and after assembly, respectively.

In the present embodiment, the hook section 108 includes a portion located frontward of the through-hole space X, and the stay cloth 110 is coupled to the cloth-hook wire 102 at least in part frontward of the through-hole space X. As shown in FIGS. 11(A) and 11(B), this feature enables a worker to, by bending or moving the rear pad member 72, make a visual check of the stay cloth 110 and the coupling of the stay cloth 110 to the cloth-hook wire 102 through the through-hole space X from the rear.

Next, how the vehicle seat 1 operates will be described. When the airbag 61 needs to be developed to protect occupants, e.g., in the event of a frontal collision, the inflator 62 is activated by a signal from a known control unit installed in the vehicle, to thereby supply gas to the inside of the airbag 61. As a result, the airbag 61 inflates and the housing 63 opens at the left front edge.

The gas supplied from the inflator 62 inflates the airbag 61 to the left, thereby applying a load to the stay cloth 110. The load applied to stay cloth 110 causes the stitching line 95 to break, forming an opening in the skin cover 22. The airbag 61 inflates to the left of the seatback 5 through the deployment hole 77 and the opening formed in the skin cover 22. As a result, the inflated airbag 61 deploys between the occupants seated in the vehicle seat 1 and a vehicle compartment side wall.

Next, a method for assembling the vehicle seat 1 will be described. After welding the frame bracket 34 and the shape former 80 to the seatback frame outer portion 19, an assembling worker places the pad member 21 on the seatback frame outer portion 19, the frame bracket 34 and the shape former 80, as shown in FIG. 11(A). The rear surface of the front skin cover 91 and the right surface of the left side skin cover 92 are preferably pre-coupled (glued) to the front surface of the front pad member 70 and the left surface of the side pad member 71, respectively. In FIGS. 11(A) to 11(C), the skin cover 22 is not shown for clarity.

When the pad member 21 is placed over the seatback frame outer portion 19, the frame bracket 34 and the shape former 80, the front pad member 70, the side pad member 71, and the rear pad member 72 are positioned frontward, leftward, and rearward of the seatback frame outer portion 19, the bracket, and the shape former 80, respectively.

Then, as shown in FIG. 3, the rear of the front pad member 70 is in contact with the left side frame 26. As a result, the front pad member 70 and the shape former 80 (more specifically, the rear of the front pad member 70 and the right end portion of the shape former 80) are provided apart from each other in the front-rear direction. As the right side of the side pad member 71 is in contact with the left end portion of the shape former 80, the right side surface of side pad member 71 and the left side surface of left side frame 26 are provided apart from each other in the left-right direction. As a result, a housing space Y is defined by the front pad member 70, the side pad member 71, the shape former 80, and the left side frame 26.

Next, the worker grasps the lower end of the rear pad member 72 and pulls it outward (i.e., rightward) to thereby open the slit 75. The load applied to the rear pad member 72 also opens the auxiliary slit 76 (FIG. 11(B)). As a result, the pad member 21 is bent along the slit 75 and the auxiliary slit 76.

The bend of the rear pad member 72 at the slit 75 forms a through-hole space Z1 in the rear pad member 72, and the lateral width of the through-hole space Z1 is wider than that of the airbag module 23. At the same time, a hole space Z2, which is laterally wider than the lateral width L2 of the airbag module 23, is formed between the left end R2 of the slit 75 and the shape former 80 (shape former lower portion 83).

While pulling the lower end of the rear pad member 72 outward (leftward), the worker inserts the cloth-hook wire 102 through the slit 75 between the left side frame 26 and the side pad member 71, and latches the hook 104 of the cloth-hook wire 102 into the hang hole 100. The worker then pulls the stay cloth 110 toward the cloth-hook wire 102 and hangs the hooks 112 of the stay cloth 110 onto the hook section 108 of the cloth-hook wire 102. Then, the hook section 108 of the cloth-hook wire 102 is located frontward of the through-hole spaces X and is visible from the rear through the through-hole space X. Thus, when the hooks 112 are hung on the hook section 108 of the cloth-hook wire 102, the worker can make a visual check of the coupling between the cloth-hook wire 102 and the stay cloth 110 (more specifically, the coupling between the hooks 112 and the hook section 108) through the through-hole space X. This configuration allows the worker to easily hang the hooks 112 onto the hook section 108, thereby facilitating the assembling of the vehicle seat 1.

Then, as shown in FIG. 11(B), while pulling the lower end of the rear pad member 72 outward (leftward), the worker inserts the airbag module 23 fastened to the module bracket 36 through the slit 75 between the left side frame 26 and the pad member 21. Then, the worker pushes the airbag module 23 upward to thereby position the airbag module 23 in the housing space Y.

Next, while pulling the lower end of the rear pad member 72 outward, the worker places the airbag module 23 so that the module bracket 36 is aligned with the frame bracket 34, and inserts the stud bolts 48 into the bolt holes 52. As shown in FIG. 11(B), while pulling the lower end of the rear pad member 72 outward, the worker pulls and bends the pad member 21 along the slit 75 and the auxiliary slit 76. As a result, the slit 75 and the auxiliary slit 76 open, which ensures that the two fastening points P1 and P2 are more visible and easily accessible through the through-hole space X. The worker inserts the fastening tool such as a universal wrench into the through-hole space X and tightens the nuts 49, thereby fastening the module bracket 36 to the frame bracket 34. As a result, the airbag module 23 is coupled to the left side frame 26 via the module bracket 36 and the frame bracket 34. In this way, the through-hole space X allows a fastening tool to be inserted from the rear so that the nuts 49 are tightened on the stud bolt 48, enabling a worker to easily fasten the airbag module 23 to the side frame 26.

The worker then places the rear skin cover 93 along the rear surface of the rear pad member 72 and the rear surface of the pan frame 20, and joins the outer side edge of the rear skin cover 93 to the rear edge of the left side skin cover 92 using the slide fastener 97. In this way, the assembly of the vehicle seat 1 is completed.

Next, effects or technical benefits of the vehicle seat 1 will be described. As shown in FIG. 11(A), a worker is enabled to open the slit 75 by pulling the lower end of the rear pad member 72 downward to the left. This allows the worker to easily insert the airbag module 23 through the slit 75 to a point between the seatback frame outer portion 19 (more specifically, the left side frame 26) and the pad member 21, which facilitates the assembly of the airbag module 23 to the side frame 26.

As shown in FIG. 11(B), when a worker pulls the lower part of the rear pad member 72 downward to the left, the lower part of the rear pad member 72 is pulled toward the left, creating a gap space between the rear pad member 72 and the pan frame base 31.

Since the pan frame protrusion 32 and the stud bolts 48 do not overlap each other, as viewed from the rear, the stud bolts 48, i.e., the fastening points P1 and P2, are visible from the rear through the through-hole space X, as shown in FIG. 11(C). This feature allows the worker to make a visual check of the fastening points through the through-hole space X. Thus, in this configuration, when a worker moves the airbag module 23 from the below to a proper position where the bolt holes 52 are aligned with the stud bolts 48 (more specifically, from a position that is below the pan frame protrusion 32 and also below the fastening points P1 and P2 to the proper position where the stud bolts 48 is placed into the bolt holes 52), it is ensured that the module bracket 36 is kept visible to the worker from the rear, without blockage of the worker's view by the pan frame protrusion 32. Furthermore, when the worker fastens the module bracket 36 to the frame bracket 34, the view, which is not obstructed by the pan frame protrusion 32, allows the worker to easily fasten the module bracket 36 to the frame bracket 34. In this way, this configuration makes it easy for the worker to move the airbag module 23 to the proper position and fasten the module bracket 36, which improves the efficiency of the work of assembling the airbag module 23.

As shown in FIG. 11(B), when the lower end of the rear pad member 72 is pulled outward (to the left), the stud bolts 48 (i.e., the fastening points P) become visible from the rear. As can be understood from FIG. 11(B), the gap between the rear pad member 72 and the pan frame base 31 is wider toward the lower. In the present invention, since the stud bolts 48 are located below the pan frame protrusion 32, the stud bolts 48 are easily visible compared to the case where the location is above the pan frame protrusion 32.

In addition, during the process of moving the airbag module 23 from the below and placing it in the proper position, the movement of the airbag module 23 is not obstructed by the pan frame protrusion 32, which facilitates the assembly of the airbag module 23 from the below as shown in FIG. 11(B).

When the assembly of the airbag module 23 is completed, at least part of the airbag module 23 (in particular, the upper part) is covered by the pan frame protrusion 32 from the rear (back side), as shown in FIG. 7(B). This feature provides a protection for the airbag module from loads applied from the rear. Furthermore, as shown in FIG. 3, the protrusion 32 and the airbag module 23 are spaced apart from each other in the front-rear direction so as to form a gap space S therebetween. When a load toward the front is applied from the rear surface of the pan frame 20, the gap space S prevents the load from being directly transmitted to the airbag module 23 when a forward-facing load is applied to the rear surface of the pan frame 20. Thus, the gap space feature provides a protection for the airbag module 23 against the load applied from the rear and prevents the load from being directly transmitted to the airbag module 23, thereby preventing the orientation of the airbag module 23 from being changed. As a result, a more stable behavior of the airbag module for airbag deployment is achieved, which protects an occupant in a more secure manner. In addition, the gap space S prevents the movement of the airbag module 23 from being obstructed during assembly, thereby allowing an assembling worker to easily move the airbag module 23 to the proper position, which improves the efficiency of the work of assembling the airbag module 23.

As shown in FIG. 3, the rear pad member 72 is located rearward of the airbag module 23. Thus, as shown in FIG. 11(B), the airbag module 23 is covered by the rear pad member 72 from the rear. As a result, the backside of the seatback 5 is made elastic, which improves the comfort of the vehicle seat 1.

The slit 75 is in a form of a straight line and thus can be made simple. The slit 75 extends in a substantially horizontal direction and is located below the frame bracket 34, which enables a worker to easily move the airbag module 23 to the proper position by inserting and pushing the airbag module 23 upward in a direction orthogonal to the slit 75. This allows the worker to easily determine the movement direction of the airbag module 23 during assembly work. Since the slit 75 extends horizontally, the slit 75 can be easily opened by pushing the lower end of the rear pad member 72 to the outside, which improves the efficiency of the work of assembling the airbag module 23.

In the present embodiment, the auxiliary slit 76 formed in the pad member 21 facilitates the outward movement of the lower part of the rear pad member 72. Furthermore, the auxiliary slit 76 is provided at the outer upper end of the inner surface of the rear pad member 72. As a result, when a worker pushes the lower end of the rear pad member 72 outward, a load is likely to be concentrated at the auxiliary slit 76, which facilitates the opening of the auxiliary slit 76. This feature facilitates the opening of the gap space between the pad member 21 and the side frame 26, allowing the worker to easily insert the airbag module 23 through the gap space between side frame 26 and pad member 21, which facilitates the assembly of the airbag module 23.

Since the auxiliary slit 76 extends upward and outward in an inclined direction from the upper edge of rear pad member 72, allowing for easy movement of the lower part of rear pad member 72 toward the outer side, which facilitates opening of auxiliary slit 76, thereby allowing a worker to easily insert the airbag module 23 into the gap space between the side frame 26 and the pad member 21.

The fastening points P1 and P2 are located below the auxiliary slit 76 in the rear view. When the lower part of the rear pad member 21 is moved outward, the pad member 21 is bent near the auxiliary slit 76, as shown in FIG. 11(B), causing the fastening points P1 and P2 to be more exposed and easier to access. Thus, this feature allows a worker to easily fasten the frame bracket 34 to the module bracket 36.

The slit 75 and the deployment hole 77 are provided at different positions along the front-rear direction. As a result, part of the pad member 21 near the slit 75 and the deployment hole is less deformable compared to the cases where the slit and the deployment hole are provided at a same position along the front-rear direction, thereby enabling the shape of the pad member 21 to be easily maintained. Moreover, since the receiving recess 98 is formed at a different position from the opening end 75A of the slit 75, part of the rear pad member 72 near the opening end 75A of the slit 75 is more rigid compared to the case where they are provided at a same position.

As shown in FIG. 2, the airbag module 23 is coupled to and supported by the side frame 26, which is more rigid than the pan frame 20, which enables a more stable behavior of the airbag module for airbag deployment, compared to the cases where the airbag module 23 is coupled to the pan frame 20. As shown in FIG. 3, the thickness of the frame bracket 34 is greater than that of the pan frame 20, which reduces the weight of the seatback 5 and increases the rigidity of the frame bracket 34. This feature allows the airbag 61 to be more stably supported by the side frame 26 (seatback frame outer portion 19) during deployment, thereby enabling a more stable behavior of the airbag 61 for airbag deployment.

Furthermore, the frame bracket 34 is coupled to the front and rear edges of the outer (left) side frame 26, respectively, which allows the airbag module 23 to be more securely coupled to the left side frame 26 compared to the cases where the frame bracket 34 is coupled to either the front edge or the rear edge of the left side frame 26. This feature allows the airbag 61 to be more stably supported by the left side frame 26 (seatback frame outer portion 19) during deployment, thereby enabling a more stable behavior of the airbag 61 for airbag deployment.

Second Embodiment

Figure 12:
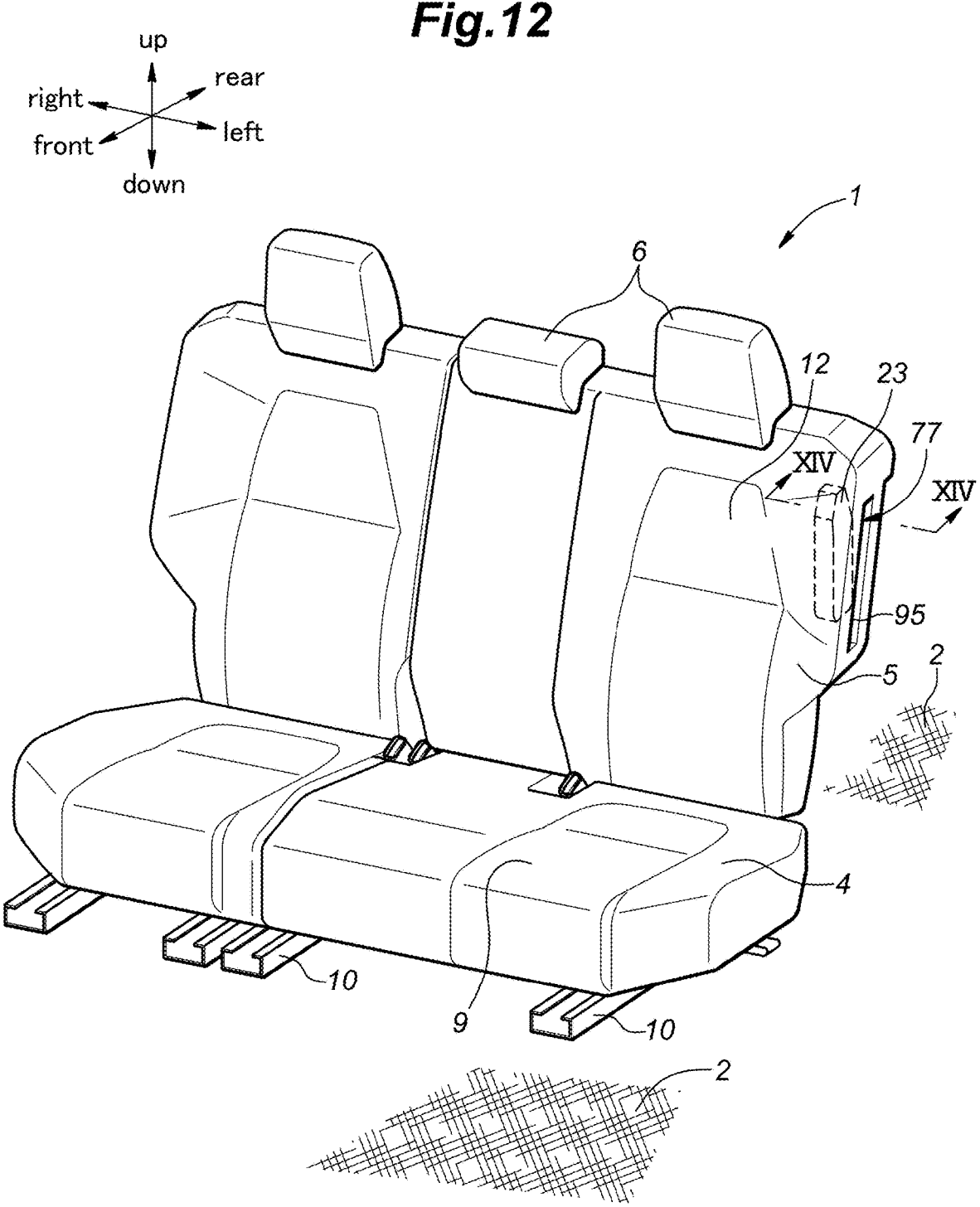
FIG. 12 is a perspective view of a seat equipped with a vehicle seat according to a second embodiment of the present invention.

As shown in FIG. 12, a vehicle seat 1 according to a second embodiment of the present inventions is different from the vehicle seat 1 of the first embodiment only in features discussed below. The other features of the second embodiment are similar to those of the first embodiment. Thus, the vehicle seat 1 of the present embodiment described below is provided in a vehicle having two rows of seats in the front-rear direction, and forms a left side seat in the second row of rear seats, as in the first embodiment.

Figure 13:
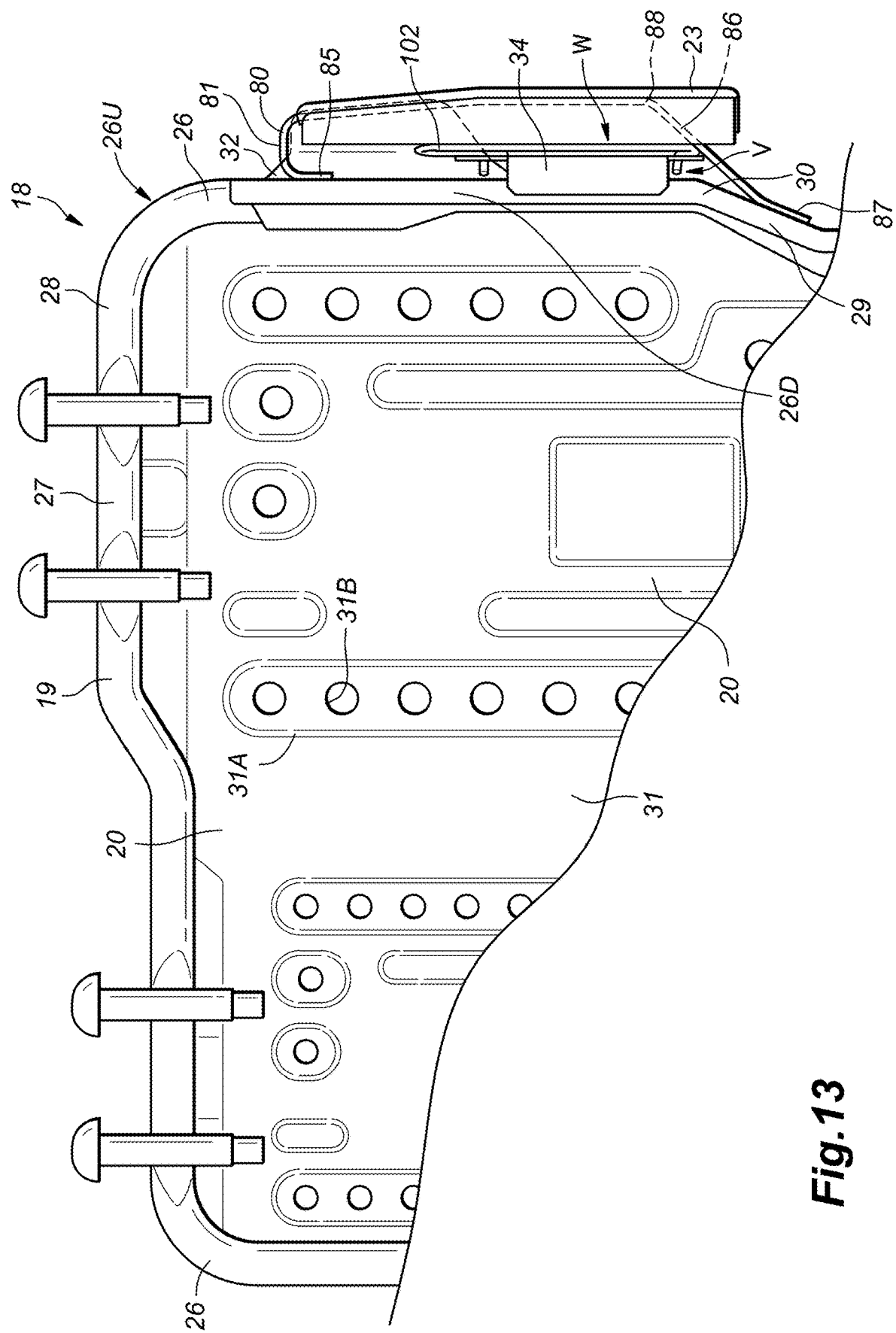
FIG. 13 is a front view of the vehicle seat when a pad member and a skin cover are removed.
Figure 14:
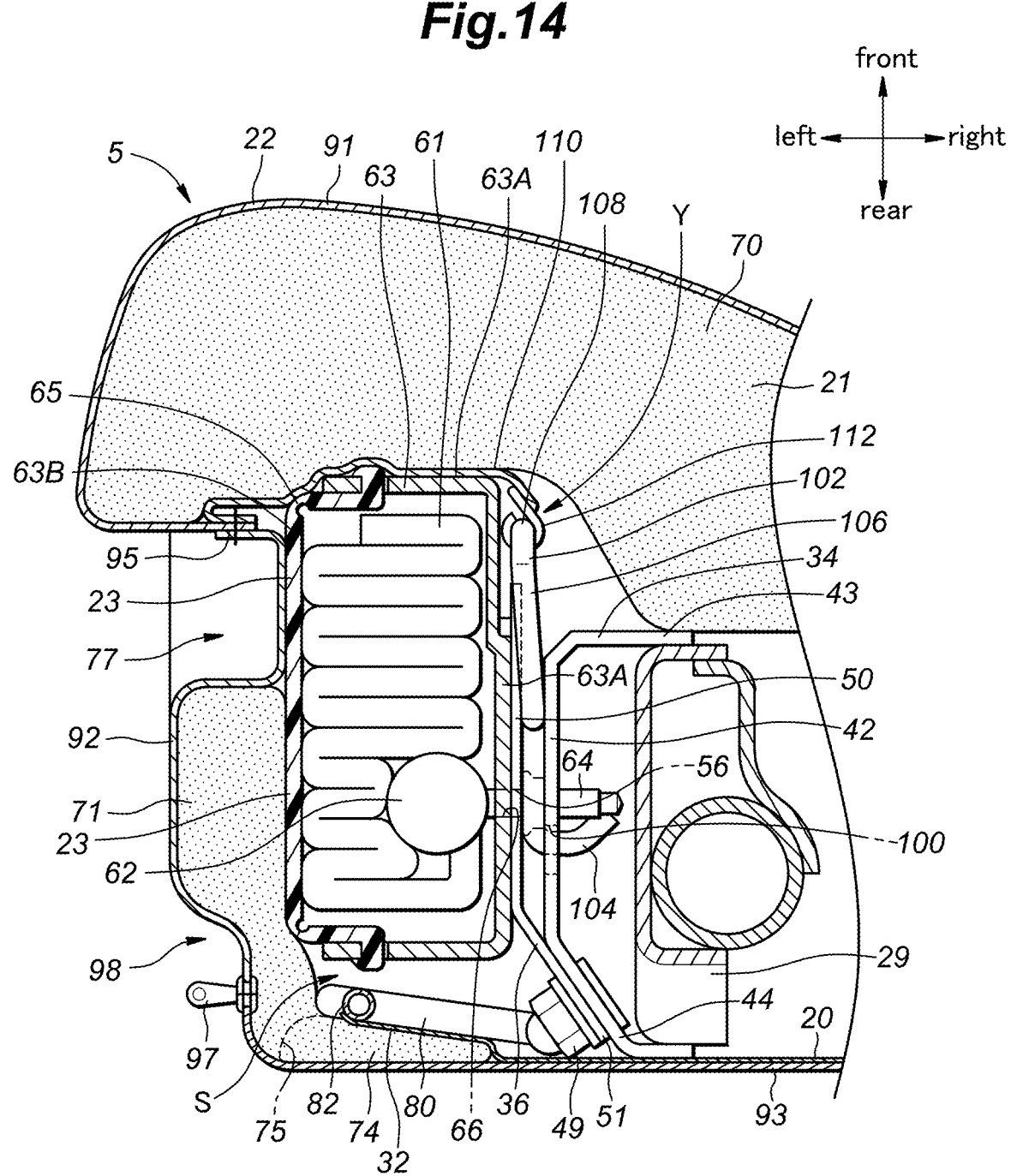
FIG. 14 is cross-sectional view taken along line XIV-XIV in FIG. 12.

Next, the structure of the seatback 5 will be described. As shown in FIGS. 13 and 14, the seatback 5 includes a seatback frame 18 (FIG. 13) configured to form a framework of the seat, a pad member 21 (FIG. 14) supported by the seatback frame 18, a skin cover 22 (FIG. 14) provided on the front surface of the pad member 21 to form an outer surface of the seatback 5, and an airbag module 23 (FIGS. 13 and 14) supported on the seatback frame 18.

As shown in FIG. 13, the seatback frame 18 forms the framework of the seatback 5, and includes a seatback frame outer portion 19 that forms a rectangular frame and a pan frame 20 (plate) located on the rear side of the seatback frame outer portion 19. The seatback frame outer portion 19 includes left and right side frames 26 (side members) extending vertically, an upper frame 27 extending in the left-right direction and coupled to the upper ends of the left and right side frames 26, and a lower frame (not shown) extending in the left-right direction and coupled to the lower portions of the left and right side frames 26. The side frame upper portions 26U and the upper frame 27 constitute the respective upper portions of the left and right side frames 26, and are formed by the bending of one circular pipe 28 into an inverted U-shaped. Side frame lower portions 26D (FIG. 14) are the lower portions of the left and right side frames 26, and are formed by sheet metal members 29 each having opposing left and right surfaces (i.e., surfaces facing away from each other in the left-right direction). The inner sides of the upper portions of the sheet metal members 29 are welded to the lower ends of the pipe 28. The front and rear edges of each of the sheet metal members 29 are bent toward the inside of the seat. The lower ends of the left and right side frames 26 each are rotatably coupled to the frame, by a reclining mechanism, for supporting the seat cushion 4. In the present embodiment, as shown in FIG. 14, the side frame lower portion 26D is formed by the two sheet metal members 29 that are arranged to face each other in the left-right direction and are coupled to each other.

Figure 15:
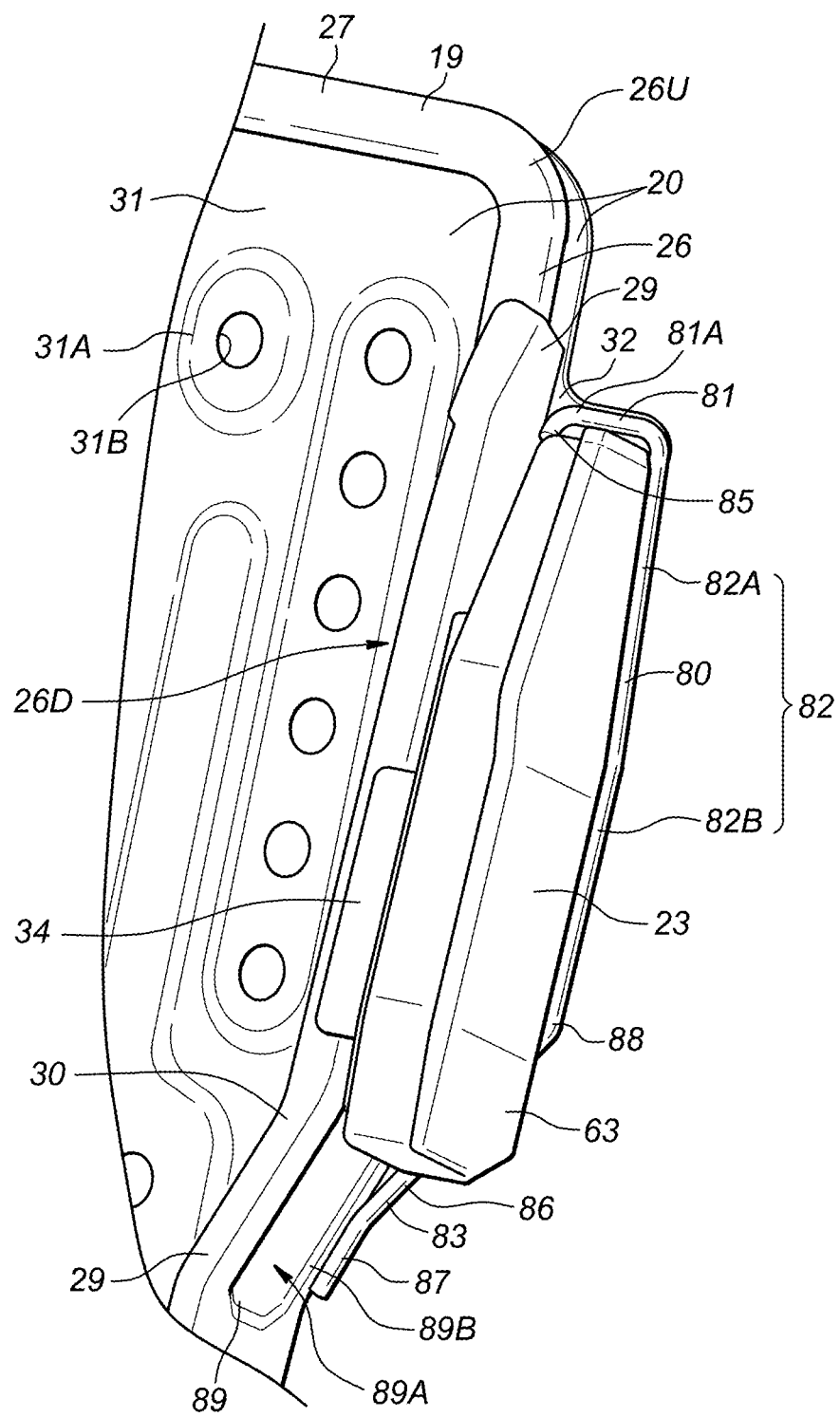
FIG. 15 is a perspective view of an upper left portion of the vehicle seat when the pad member and the skin cover are removed.

As shown in FIGS. 13 and 15, the left side frame lower portion 26D has a frame bend section 30 in the center part in the vertical direction, where the frame bend section 30 is bent inward in the left-right direction (i.e., bent to the right).

Figure 16:
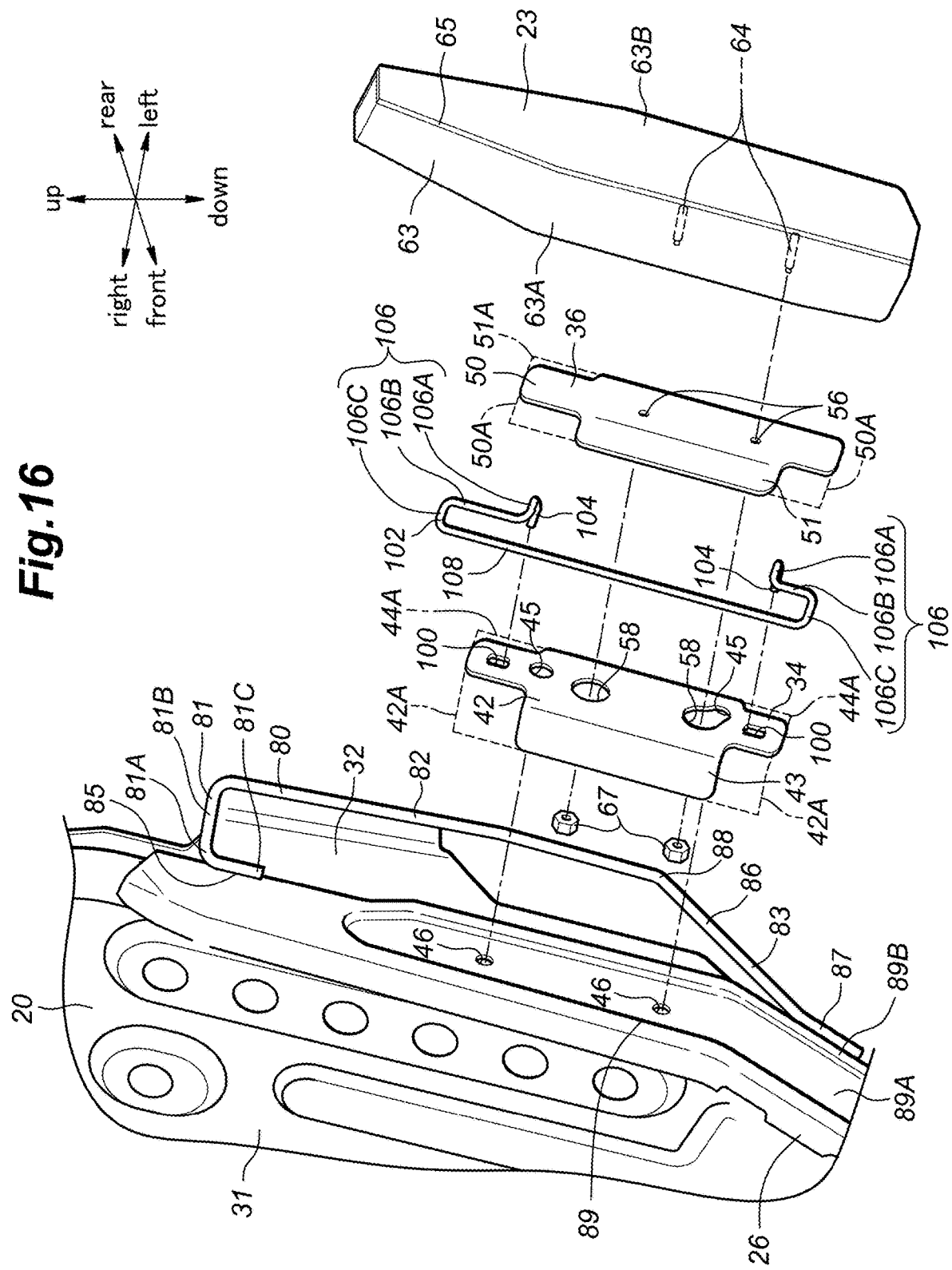
FIG. 16 is an exploded perspective view, as viewed from the front, of a structure for coupling an airbag module to a side frame.
Figure 17:
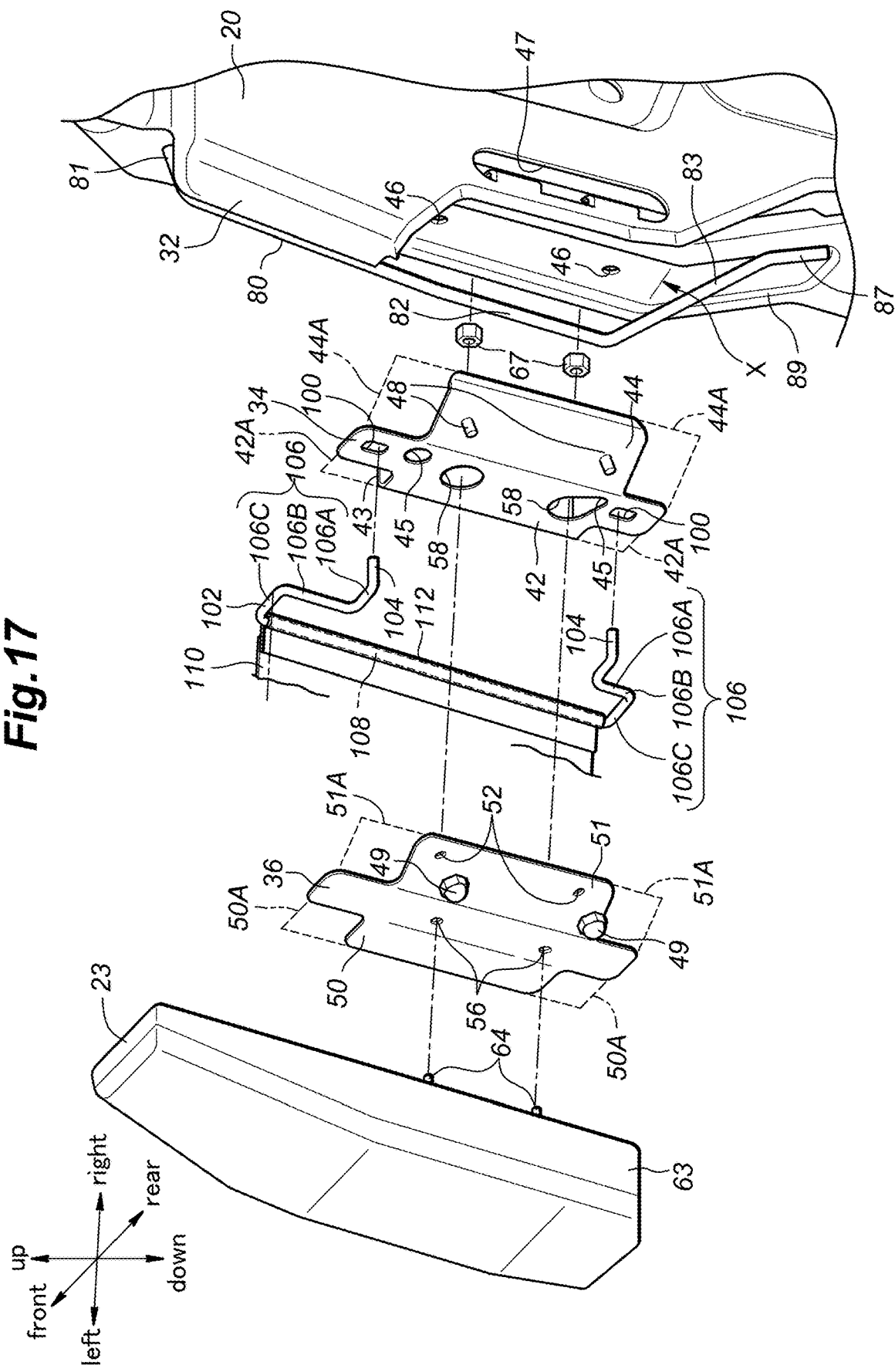
FIG. 17 is an exploded perspective view, as viewed from the rear, of the structure for coupling the airbag module to the side frame.

As shown in FIGS. 16 and 17, the frame bracket 34 is a folded sheet metal member. As shown in FIG. 14, the plate thickness of the frame bracket 34 is greater than that of the pan frame 20. This condition of the plate thickness causes the frame bracket 34 to be sufficiently more rigid and less likely to be deformed compared to the pan frame 20.

The frame bracket 34 includes a generally square plate-shaped bracket base 42 (bracket base section) having opposing surfaces generally facing away from each other in the left-right direction, a bracket front section 43 (FIG. 16) extending from the front edge of the bracket base 42, and a bracket slope section 44 (bracket coupling section, FIG. 17) extending from the rear edge of the bracket base 42.

The upper and lower ends of the front portion of the bracket base 42 are provided with respective front cutouts 42A cut out rearward from the front edge. The front cutouts 42A are each square in shape and extend from the front edge of the bracket base 42 to the center of the bracket base 42 in the front-rear direction.

Figure 18:
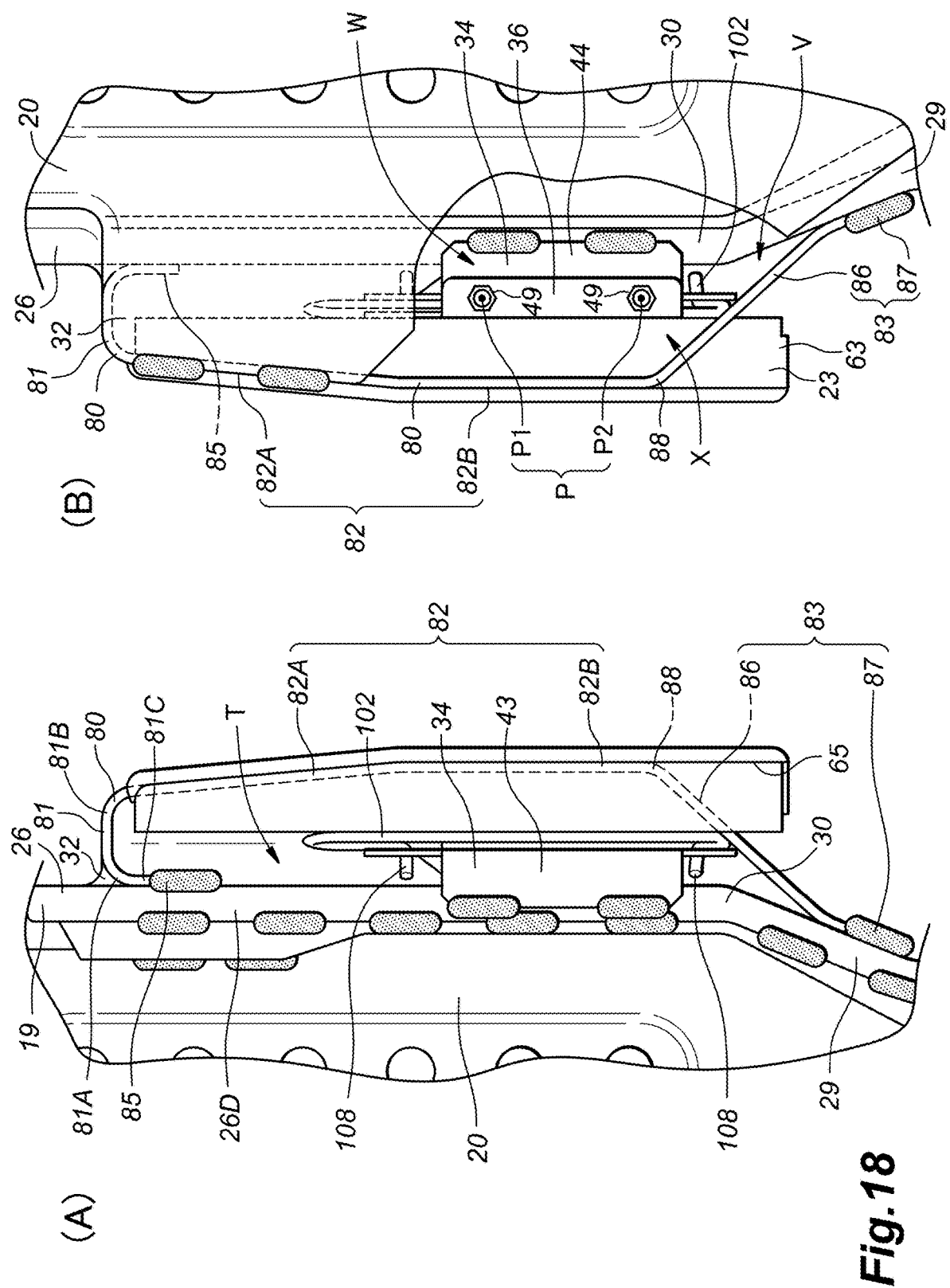
FIG. 18 is a diagram showing an upper left portion of the vehicle seat when the pad member and the skin cover are removed, and (A) and (B) are front and rear views of the upper left portion, respectively.

As shown in FIG. 16, the bracket front section 43 is a plate part extending rightward from the front edge of the bracket base 42. As shown in FIG. 18(A), the bracket front section 43 is welded to the front face of the sheet metal member 29 that forms the left side frame lower portion 26D. In the present embodiment, the upper and lower right edge parts of the bracket front section 43 are welded to the front surface of the sheet metal member 29. In FIGS. 18(A) and 18(B), the welded portions are indicated with dot-hatching.

The upper and lower ends of the rear edge portion of the bracket slope section 44 are provided with respective rear cutouts 44A which are cut out frontward from the rear edge; that is, extending through the bracket slope section in the front-rear direction. In the present embodiment, each rear cutout 44A is square in shape and extends frontward from the rear edge of the bracket slope section 44 to reach the rear edge of the bracket base 42.

As shown in FIGS. 16 and 17, the module bracket 36 is a folded sheet metal member, and includes a plate-shaped retainer base 50 (module base section) extending in the front-rear direction, and a plate-shaped retainer slope section 51 (module coupling section) extending from the rear edge of the retainer base 50 and inclined rearward to the right.

The upper and lower ends of the front portion of the retainer base 50 are provided with respective front cutouts 50A extending rearward from the front edge. Each front cutout 50A is square in shape and is cut out from the front edge of the retainer base 50 to the center of the retainer base 50 in the front-rear direction. In the present embodiment, the front cutouts 42A of the bracket base 42 are roughly the same shape as the corresponding front cutouts 50A of the retainer base 50.

The upper and lower ends of the rear edge portion of the retainer slope section 51 are provided with respective rear cutouts 51A which are cut out frontward from the rear edge; that is, extending through the bracket slope section in the front-rear direction. In the present embodiment, each rear cutout 51A is square in shape and is cut out frontward from the rear edge of the retainer slope section 51 to reach the rear edge of the retainer base 50. In the present embodiment, the rear cutouts 44A of the bracket slope section 44 are roughly the same shape as the corresponding rear cutouts 51A of the retainer slope section 51.

Figure 20:
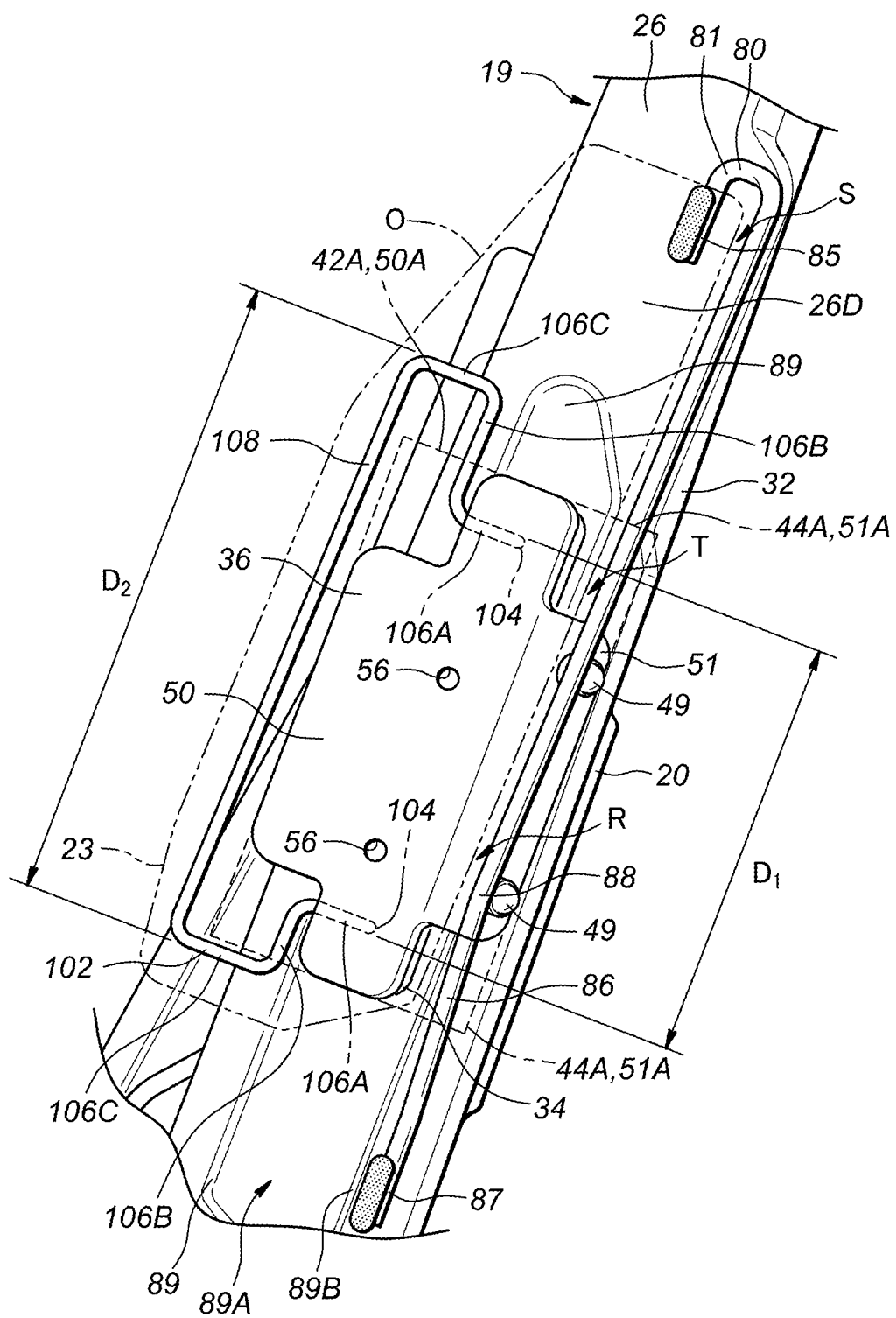
FIG. 20 is a side view of the upper left portion of the vehicle seat when the pad member, the skin cover, and the airbag module are removed.

In the present embodiment, as shown in FIGS. 16 and 17, the module bracket 36 has the same vertical size as the frame bracket 34. More particularly, the vertical size of the bracket base 42 is substantially the same as that of the retainer base 50, and when the frame bracket 34 is fastened to the module bracket 36, the bracket base 42 and the retainer base 50 are arranged such that the top and lower edges of the bracket base 42 are aligned with those of the retainer base 50 in the vertical direction, respectively. Moreover, as shown in FIG. 20, the front cutouts 42A of the bracket base 42 and the corresponding front cutouts 50A of the retainer base 50 overlap each other in the left-right direction and are aligned with each other in the side view (in the left-right direction). The rear cutouts 44A of the bracket slope section 44 and the corresponding rear cutouts 51A of the retainer slope section 51 also overlap each other in the front-rear direction and are aligned with each other in the rear view.

As shown in FIG. 16, the housing 63 has a generally box-like shape with a closed end. The housing 63 includes a housing body 63A having an opening and a lid 63B configured to close the opening of the housing body 63A. The airbag 61 and the inflator 62 are housed in the housing body 63A. As shown in FIG. 17, the airbag 61 is housed inside the housing 63 in a folded state. The left front edge of the lid 63B has a tear-off line 65 that is designed to tear open under the force of the bag inflation and deployment of the airbag 61.

When the inflator 62 is activated to supply gas to the inside of the airbag 61, the tear-off line 65 tears open and the inflated airbag 61 deploys toward the front to the left. The bottom wall of the housing body 63A is provided with through holes 66 extending therethrough in the thickness direction at predetermined positions.

Figure 19:
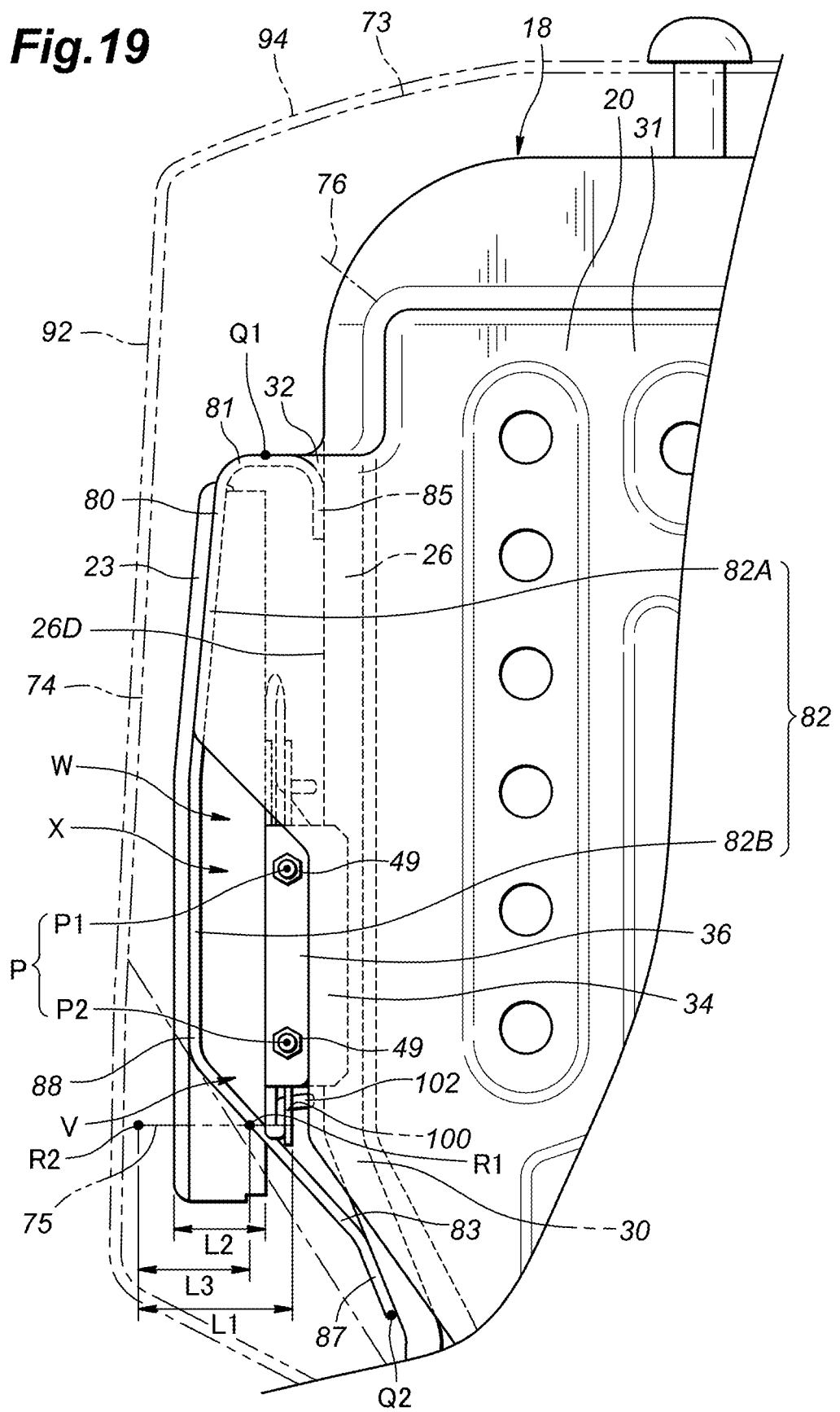
FIG. 19 is a rear view of the vehicle seat when the pad member and the skin cover are removed.

As shown in FIGS. 13 and 19, the pan frame protrusion 32 extends from the top part of the left side frame 26 to the left and reaches a location rearward of the left edge of the assembled airbag module 23, as viewed in the rear view. As a result, the pan frame protrusion 32 is located above both the two stud bolts 48 (i.e., the two fastening points P1 and P2) in the rear view, as shown in FIG. 19, and the stud bolts 48 (i.e., fastening points P1 and P2) are located below the pan frame protrusion 32. In other words, as shown in FIG. 19, the pan frame 20 has an extension 150 extending to the left beyond the left side frame 26. In order to expose the fastening points P1 and P2, a cutout 152 is formed so as to expose the fastening points P1 and P2 of the extension 150. As shown in FIG. 20, the pan frame protrusion 32 is spaced apart from the rear surface of the airbag module 23, so that a gap space S is formed between the pan frame 20 (more specifically, the pan frame protrusion 32) and the airbag module 23 in the front-rear direction.

The pad member 21 is formed of a flexible cushioning material such as polyurethane foam. As shown in FIGS. 14 and 19, the pad member 21 includes: a front pad member 70 (FIG. 14) configured to cover the seatback frame outer portion 19 and the airbag module 23 from the front; a side pad member 71 (FIG. 14) configured to be coupled to an outer (i.e., left side) portion of the front pad member 70 and extend rearward; a rear pad member 74 (FIGS. 14 and 19) extending from the rear end of the side pad member 71 toward the inner side (i.e., right side) in the left-right direction; and an upper pad member 73 (FIG. 19) configured to connect the upper ends of the front pad member 70, the rear pad member 74, and the side pad member 71 to each other. The rear pad member 74 covers the seatback frame outer portion 19 and the airbag module 23 from the rear, while the upper pad member 73 covers the seatback frame outer portion 19 and the airbag module 23 from the above.

Figure 21:
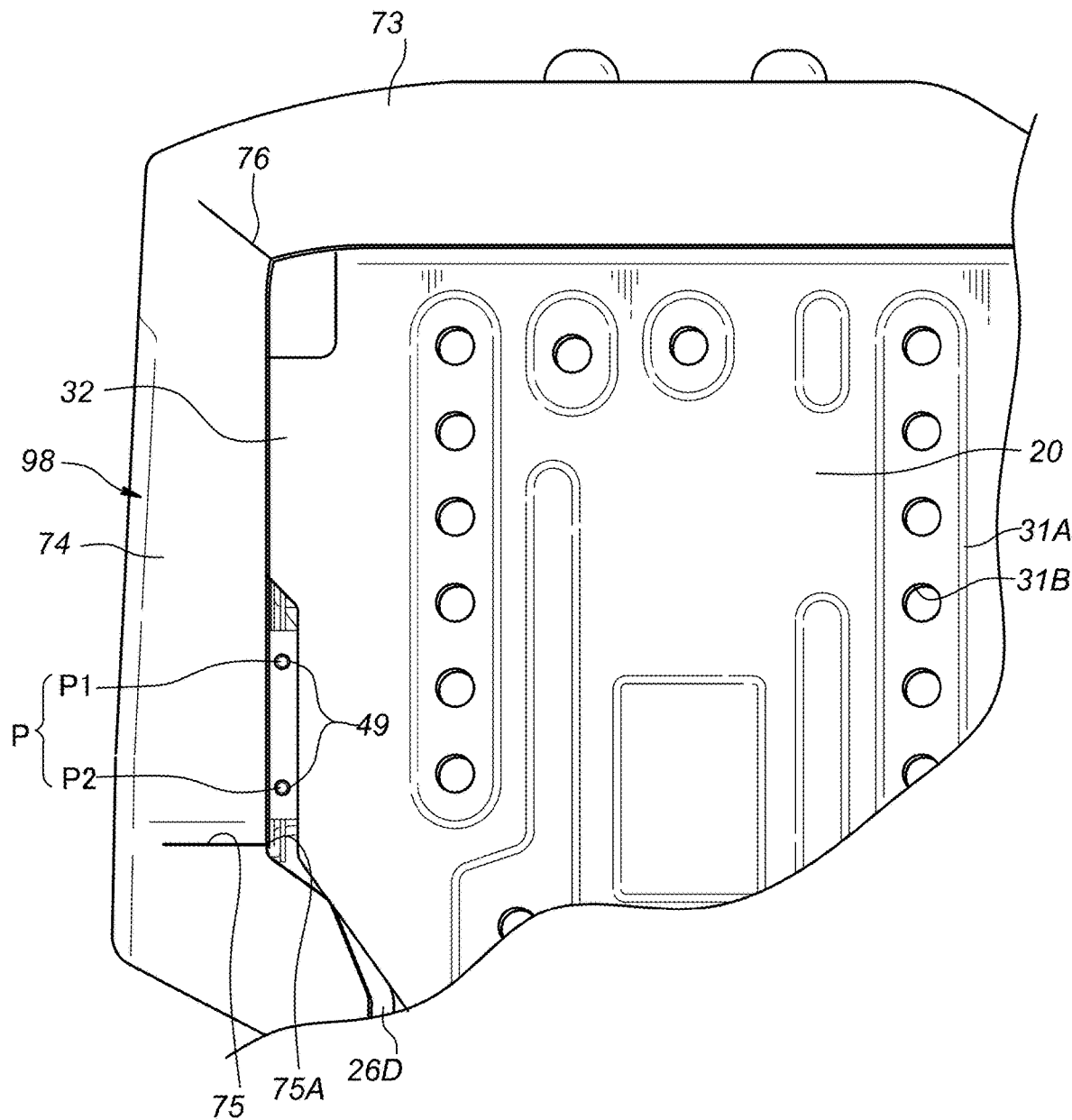
FIG. 21 is a rear view of the vehicle seat when the skin cover is removed.

As shown in FIG. 21, the rear pad member 74 has a slit 75 extending outward (to the left side) from the inner edge (right edge) of the rear pad member in left-right direction. The slit 75 is a cut extending through the rear pad member 74 in the front-rear direction and located below the frame bracket 34. As shown in FIG. 19, the slit 75 has a straight line shape and extends horizontally (i.e., in the left-right direction) and reaches a location rearward of the airbag module 23. In the present embodiment, the slit 75 extends from the right edge of the rear pad member 74 to the left along the lower edge of the airbag module 23 in the rear view and reaches a location rearward of the lower left edge of the airbag module 23. As shown in FIG. 19, the slit 75 is formed to have a lateral width L1 that is greater than the left-to-right width L2 of the airbag module 23. From the inside of the rear pad member 74, the slit 75 extends rightward direction from a location at a generally center portion in the left-right direction of the rear pad member 74 and reaches the inner right end of the rear pad member 74 to form an opening end 75A. In other words, the right edge of the slit 75 defines the opening end 75A, which opens toward the right direction.

As shown in FIG. 15, the vehicle seat 1 includes a shape former 80 coupled to the seatback frame outer portion 19, more particularly to the left side frame 26 in this case. The shape former 80 is formed by a folded wire member (rod-shaped member) and is welded to the left side frame 26 at the both ends, as shown in FIG. 18(A). As shown in FIG. 20, the shape former 80 is located rearward of the airbag module 23 so that a gap space T is formed between the airbag module 23 and the shape former 80 in the front-rear direction. Thus, as the shape former 80 is formed of a wire member, the shape former 80 is enabled to be made lightweight and has a simple structure of the shape former 80.

When the pad member 21 is assembled to the seatback frame outer portion 19, the slit 75 is located below the upper edge of the shape former 80 and above the lower edge of the shape former 80. In this state, the slit 75 and the shape former 80 overlap in the front-rear direction. In the present embodiment, the slit 75 overlaps the shape former lower portion 83 in the front-rear direction. Furthermore, in the present embodiment, a slit-overlapping part of the shape former lower portion 83 overlaps the slit 75 in the front-rear direction, and the lateral distance L3 between the left end R1 (the outer side end) of the slit-overlapping part and the left end R2 (the outer side end) of the slit 75 is greater than the lateral width L2 of the airbag module 23.

The skin cover 22 is formed by the connection of a plurality of sheet-shaped members such as cloth and leather and configured to cover a surface of the pad member 21. More specifically, as shown in FIG. 14, the skin cover 22 includes: a front skin cover 91 for covering the front surface of the front pad member 70 and the front left side of the side pad member 71; a left side skin cover 92 (outer skin cover) for covering the rear left side of the side pad member 71; a rear skin cover 93 for covering the rear surface of the rear pad member 74 and the rear surface of the pan frame 20; and an upper skin cover 94 (FIG. 19) for covering the upper surface of the upper pad member 73. The front, left, and rear edges of the upper skin cover 94 are sewn to the upper edges of the front skin cover 91, the left skin cover 92; and the rear skin cover 93, respectively.

As shown in FIGS. 16 and 17, the bracket base 42 has hang holes 100 at the top and bottom thereof, the hang holes 100 extending through it in the thickness direction, i.e., in the left-right direction. As shown in FIG. 17, the hang holes 100, which are defined in the bracket base 42, are located frontward of the rear cutouts 44A. As shown in FIG. 19, the lower rear cutouts 44A are located frontward of the through-hole space X.

A cloth-hook wire 102 is latched into the hang holes 100. the cloth-hook wire 102 is a rod-like member bent into a predetermined shape. In the present embodiment, the cloth-hook wire 102 is formed by the bending of a round metal pipe into a predetermined shape. However, in other cases, the cloth-hook wire 102 may be formed by the bending of a round metal bar. As shown in FIG. 14, the cloth-hook wire 102 includes a pair of upper and lower hooks 104 (coupling parts) configured to be latched into or hung onto a corresponding hang hole 100 and located at both ends thereof, a pair of upper and lower wire coupling sections 106 which are connected to and extend frontward from the upper and lower hooks 104, passing between the frame bracket 34 and the module bracket 36 to reach front end points frontward of the frame bracket 34 and the module bracket 36, and a hook section 108 (cloth-hook section) connecting the front end points of the upper and lower wire coupling sections 106 (FIG. 16). The hook section 108 is located on the inner side (right side) of the front end of the airbag module 23, and the airbag module 23 faces the left side frame 26 in the left-right direction with the cloth-hook wire 102 provided therebetween. The hooks 104 at both ends of the cloth-hook wire 102 are latched into or hung onto the corresponding hang holes 100 of the frame bracket 34. As a result, the cloth-hook wire 102 is coupled to the left side frame 26 via the frame bracket 34.

The lower hang hole 100 is located frontward of the corresponding rear cutout 44A and the through-hole space X. Thus, as shown in FIG. 19, when the lower hook 104 is latched into the hang hole 100, the lower hook 104 is visible through the through-hole space X and the lower rear cutout 44A. This configuration allows an assembling worker to make a visual check of a location where the cloth-hook wire 102 is coupled to the frame bracket 34, which improves the efficiency of the work of assembling the vehicle seat.

The wire coupling sections 106 connect to the corresponding hooks 104 and have a pair of upper and lower first extending sections 106A extending frontward, a pair of shaft sections 106B extending in opposite vertical directions from the front ends of the first extending sections, and a second pair of upper and lower extending sections 106C extending frontward from the ends of the corresponding shaft sections 106B. The hook section 108 extends vertically to connect the ends of the second pair of upper and lower extending sections 106C. As shown in FIG. 20, the cloth-hook section (108) extends substantially parallel to the upper and lower shaft sections 106B.

The first extending sections 106A extend and pass between the bracket base 42 and the retainer base 50 and further extend frontward beyond the bracket base 42 and the retainer base 50. In other words, the retainer base 50 faces the bracket base 42 in the left-right direction with the cloth-hook wire 102 (first extending sections 106A) extending therebetween. As shown in FIG. 20, the rear parts of the first extending sections 106A are pressed against the bracket base 42 from the retainer base 50, and thus held by the retainer base 50 and the bracket base 42. This feature restricts the movement of the cloth-hook wire 102.

The first extending sections 106A extend between the bracket base 42 and the retainer base 50 to points that are aligned with the front cutouts 42A of the bracket base 42 and the front cutouts 50A of the retainer base 50 in the left-right direction. As shown in FIG. 20, the points at which the shaft sections 106B connect to the first extending sections 106A are aligned with the front cutouts 42A of the bracket base 42 and the front cutouts 50A of the retainer base 50 in the left-right direction. In other words, the front cutouts 42A and the front cutouts 50A are formed so as to extend from lines rearward of the shaft sections 106B to the front edges of the bracket base 42 and the retainer base 50. The two shaft sections 106B are exposed at locations frontward of the bracket base 42 and the retainer base 50.

As shown in FIG. 20, the cloth-hook wire 102 is located rearward of the front edge of the airbag module 23. More specifically, the hook section 108 is located rearward of the front edge of airbag module 23 and frontward of the outer side frame 26, the frame bracket 34, and the module bracket 36.

The cloth-hook wire 102 is located frontward of the rear edge of the airbag module 23. In the present embodiment, the cloth-hook wire 102 is located rearward of the outer edge O of the airbag module 23 (FIG. 20) in the side view.

The hook section 108 is located frontward of the frame bracket 34 and the module bracket 36. The upper end and the lower end of the hook section 108 are located above the upper hook 104 and below the lower hook 104, respectively. As shown in FIG. 20, the vertical length D2 of the hook section 108 is greater than the vertical length (distance) D1 between the upper edges of the upper hook 104 and the lower edge of the lower hook 104.

The upper and lower shaft sections 106B extend upward and downward from the points inward of the front cutouts 50A of the retainer base 50 and the front cutouts 42A of the bracket base 42, respectively. The upper and lower second extending sections 106C are located above and below the frame bracket 34 and module bracket 36, respectively.

As shown in FIG. 14, the vehicle seat 1 is provided with a stay cloth 110 for tearing open the skin cover 22 under the force of the bag inflation and deployment of the airbag 61. The stay cloth 110 is formed of a sheet-like material that is less elastic than the skin cover 22. One end of the stay cloth 110 is stitched to the front skin cover 91 and the left side skin cover 92 at the stitching line 95. The stay cloth 110 extends from the one end, passing between the front surface and the pad member 74, toward the hook section 108 of the cloth-hook wire 102. The other end of the stay cloth 110 is provided with one or more J-shaped hooks 112, which are configured to be hung onto the hook section 108 of the cloth-hook wire 102. This configuration allows the stay cloth 110 to be hung onto the cloth-hook wire 102 at the other end and coupled to the outer side frame 26. In other words, the cloth-hook wire 102 serves as a cloth-hook member for attaching the stay cloth 110 to the side frame 26.

Figure 22:
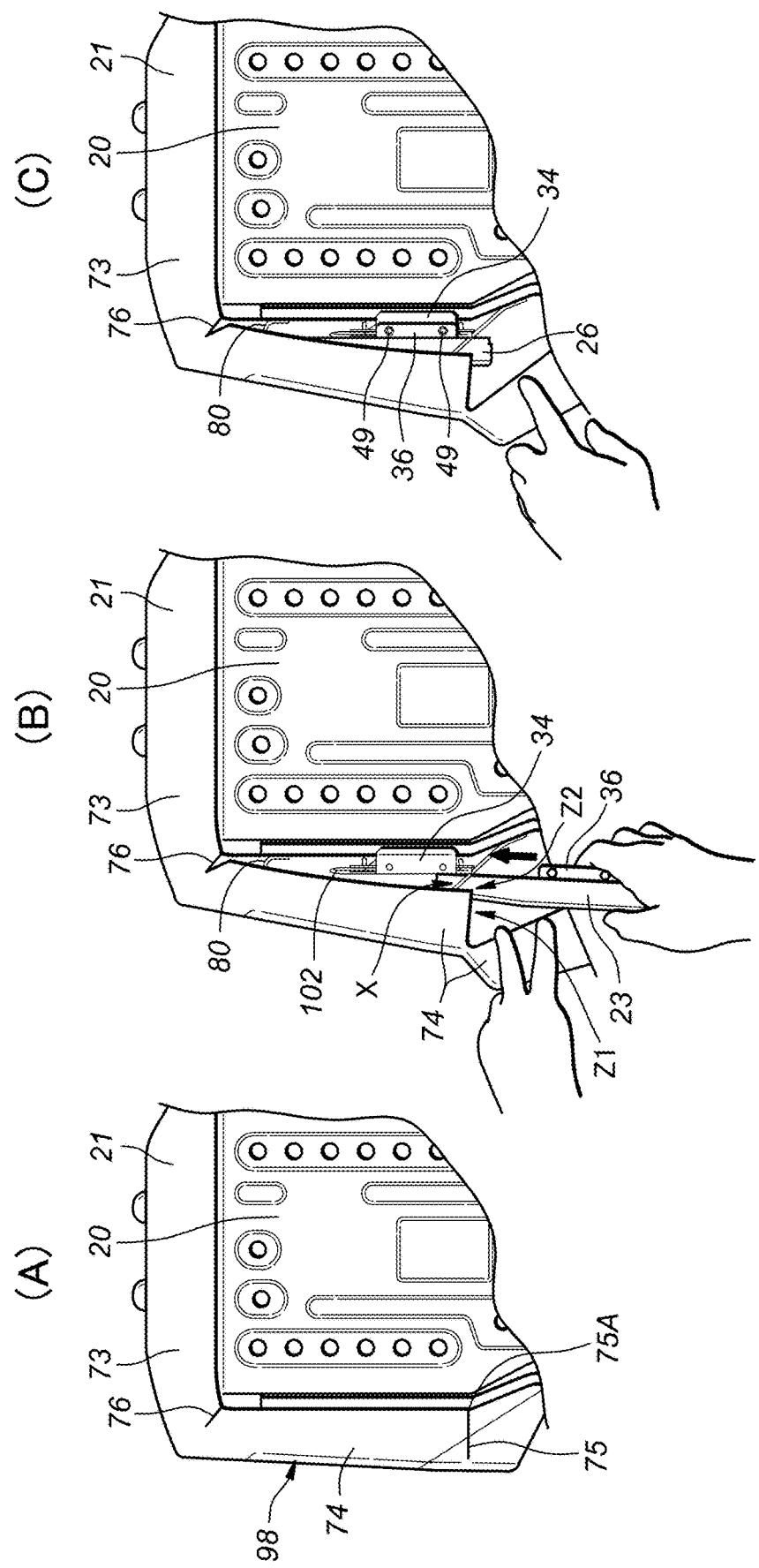
FIG. 22 is an explanatory diagram showing assembly of the airbag module, and (A), (B), and (C) illustrate before assembly, during assembly, and after assembly, respectively.

In the present embodiment, the hook section 108 includes a portion located frontward of the through-hole space X, and the stay cloth 110 is coupled to the cloth-hook wire 102 at least in part frontward of the through-hole space X. As shown in FIGS. 22(A) and 22(B), this feature enables a worker to, by bending or moving the rear pad member 74, make a visual check of the stay cloth 110 and the coupling of the stay cloth 110 to the cloth-hook wire 102 through the through-hole space X from the rear.

Next, how the vehicle seat 1 operates will be described. When the airbag 61 needs to be developed to protect occupants, e.g., in the event of a frontal collision, the inflator 62 is activated by a signal from a known control unit installed in the vehicle, to thereby supply gas to the inside of the airbag 61. As a result, the airbag 61 inflates and the housing 63 opens at the left front edge.

When the inflator 62 is activated to supply gas into the airbag 61, the airbag 61 inflates, causing the tear-off line 65 to tear open and the inflated airbag 61 deploys toward the front to the left. As the stay cloth 110 is located frontward of the front surface of the airbag module 23, the airbag 61 contacts the stay cloth 110 from the rear during deployment, and expansion pressure is applied to the stay cloth 110. The pressure applied to stay cloth causes the stitching line 95 to break. As a result, airbag inflation causes the airbag 61 to deploy to the left side of an occupant seated in the vehicle seat 1, i.e., deploy between the occupant and a side wall of the vehicle compartment. Thus, use of the stay cloth 110 enables the stitching line 95 to open and tear more quickly, allowing the airbag 61 to inflate and deploy more quickly.

Next, a method for assembling the vehicle seat 1 will be described. After welding the frame bracket 34 and the shape former 80 to the seatback frame outer portion 19, an assembling worker places the pad member 21 on the seatback frame outer portion 19, the frame bracket 34 and the shape former 80, as shown in FIG. 22(A). The rear surface of the front skin cover 91 and the right surface of the left side skin cover 92 are preferably pre-coupled (glued) to the front surface of the front pad member 70 and the left surface of the side pad member 71, respectively. In FIGS. 22(A) to 22(C), the skin cover 22 is not shown for clarity.

Next, the worker grasps the lower end of the rear pad member 74 and pulls it outward (i.e., rightward) to thereby open the slit 75. The load applied to the rear pad member 74 also opens the auxiliary slit 76 (FIG. 22(B)). As a result, the pad member 21 is bent along the slit 75 and the auxiliary slit 76.

Then, as shown in FIG. 19, the lower hook 104 is visible through the through-hole space X and the lower rear cutout 44A. This configuration allows an assembling worker to make a visual check of a location where the cloth-hook wire 102 is coupled to the frame bracket 34, which improves the efficiency of the work of assembling the vehicle seat.

As shown in FIG. 14, the cloth-hook wire 102 is located frontward of the outer (left) side frame 26. This configuration allows an assembling worker to easily hang the hooks 112 onto the hook section 108 from the inner (right) side without being obstructed by the side frame 26, which facilitates the assembly of the stay cloth 110.

Then, as shown in FIG. 22(B), while pulling the lower edge of the rear pad member 74 outward (to the left), the worker inserts, through the opened slit 75, the airbag module 23 fastened to the module bracket 36 between the left side frame 26 and the pad member 21. After the insertion of the airbag module, the worker moves the airbag module 23 upward and places the airbag module 23 into the housing space Y.

Next, while pulling the lower end of the rear pad member 74 outward, the worker places the airbag module 23 so that the module bracket 36 is aligned with the frame bracket 34, and inserts the stud bolts 48 into the bolt holes 52.

The worker then places the rear skin cover 93 along the rear surface of the rear pad member 74 and the rear surface of the pan frame 20, and joins the outer side edge of the rear skin cover 93 to the rear edge of the left skin cover 92 using the slide fastener 97. In this way, the assembly of the vehicle seat 1 is completed.

Next, effects or technical benefits of the vehicle seat 1 will be described. As shown in FIG. 14, the cloth-hook wire 102 is located rearward of the front edge of the airbag module 23, and thus the cloth-hook wire 102 does not protrude frontward from the front edge of the airbag module 23. In this configuration, when an occupant seated on the vehicle seat 1 reclines on the seatback 5, the occupant is prevented from sensing the presence of the cloth-hook wire 102 across the skin cover 22 and the pad member 21 (the front pad member 70) as a protrusion and feeling uncomfortable with the protrusion, which improves the comfort of the vehicle seat 1.

Furthermore, the cloth-hook wire 102 is located frontward of the rear edge of the airbag module 23. In this configuration, when an occupant touches the lower portion of the pan frame protrusion 32 from the rear of the seatback 5, the occupant is prevented from sensing the presence of the cloth-hook wire 102 across the skin cover 22 and the pad member 21 (the front pad member 70) as a protrusion and feeling uncomfortable with the protrusion.

As shown in FIG. 20, the cloth-hook wire 102 is located rearward of the front outer edge (O) of the airbag module 23 in the side view and does not protrude relative to the airbag module 23 in either the front-rear direction and the vertical direction This configuration enables the vehicle seat to be easily made more compact (having a smaller size) compared to the cases where the cloth-hook wire 102 protrudes relative to the airbag module 23 in the front-rear direction and the vertical direction.

The vertical length D2 of the cloth-hook section 108 is greater than the vertical distance D1 (hereafter also referred to as "hook length") between the upper edge of the upper hook 104 and the lower edge of the lower hook 104. This configuration enables the stay cloth 110 having a size (width in a vertically-extended state) greater than the hook length D1 to be hung on the hook section 108, as shown in FIG. 20. In other words, this configuration enables the use of the stay cloth 110 having a greater width compared to the case where the length of the hook section 108 is equal to or smaller than the hook length D1, which ensures that the stay cloth 110 receives the pressure caused by the inflation of the airbag 61.

Figure 23:
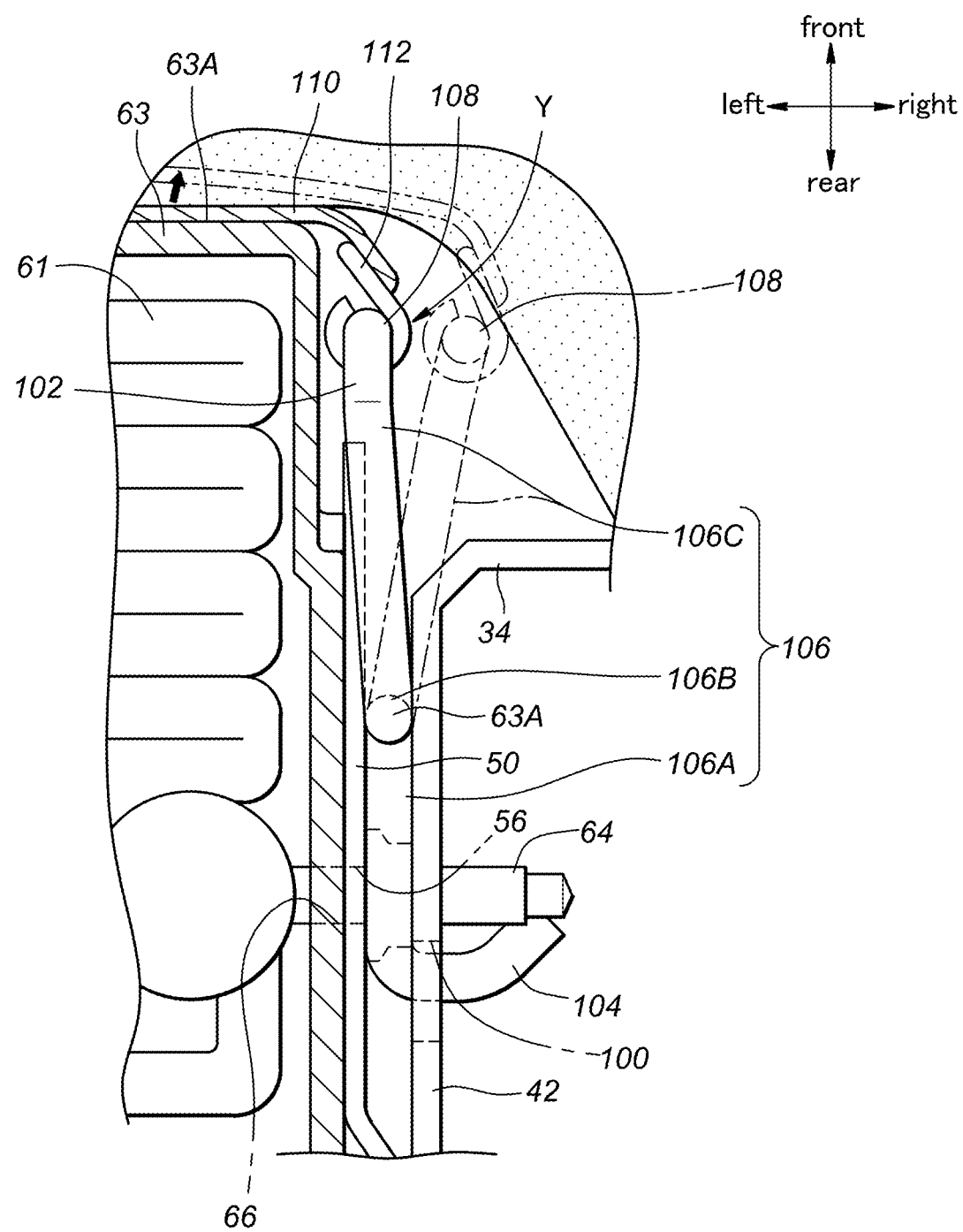
FIG. 23 is an explanatory diagram illustrating the bending of a stay cloth wire during airbag deployment.

FIG. 23 shows the position of the stay cloth 110 and the shape of the cloth-hook wire 102 when airbag 61 inflates as indicated by the dash-double-dot lines. As shown in FIG. 23, when the airbag 61 inflates and the stay cloth 110 is subjected to the airbag inflation pressure, the stay cloth 110 is pushed so as to deploy frontward (arrow in FIG. 23). During deployment of the airbag, the hook section 108 receives a load applied toward the front to the right in an inclined direction. As a result, torsional deformation of the cloth-hook wire 102 occurs in the shaft sections 106B, as shown in the dash-double-dot line in FIG. 23. The torsional deformation of the shaft sections 106B absorbs the load, thereby preventing deformation of the hook section 108. The configuration enables the stay cloth 110 to remain in the vertically-extended state, which ensures that the stay cloth 110 receives the pressure caused by the inflation of the airbag 61.

As shown in FIG. 20, the first extending sections 106A are held between the retainer base 50 and the bracket base 42, thereby restricting the movement of the cloth-hook wire 102, which prevents the cloth-hook wire 102 from shifting when receiving pressure. This feature that prevents the cloth-hook wire 102 from shifting upon receiving pressure, restricts the movement of the stay cloth 110, thereby ensuring that the stay cloth receives the pressure caused by the inflation of the airbag 61, which further increases the stability of the deployment behavior of the airbag 61.

The hook section 108 is located frontward of the frame bracket 34. Thus, when torsional deformation of the cloth-hook wire 102 occurs in the shaft sections 106B, as shown in FIG. 23, this configuration prevents occurrence of abnormal noise caused due to the contact between the hook section 108 and the frame bracket 34. Similarly, the hook section 108 is located frontward of the module bracket 38. Thus, when torsional deformation of the cloth-hook wire 102 occurs in the shaft sections 106B, this configuration prevents occurrence of abnormal noise caused due to the contact between the hook section 108 and the module bracket 36. In addition, the hook section 108 is located frontward of the frame bracket 34, which prevents rust formed on the frame bracket 34 from adhering to the stay cloth 110.

In the present embodiment, as shown in FIG. 20, the upper and lower second extending sections 106C are located above the frame bracket 34 and the module bracket 36 and below the frame bracket 34 and the module bracket 36, respectively. Thus, when torsional deformation of the cloth-hook wire 102 occurs in the shaft sections 106B, this configuration prevents occurrence of abnormal noise caused due to the contact between the second extending sections 106C and either of the frame bracket 34 or the module bracket 36.

Third Embodiment

Figure 24:
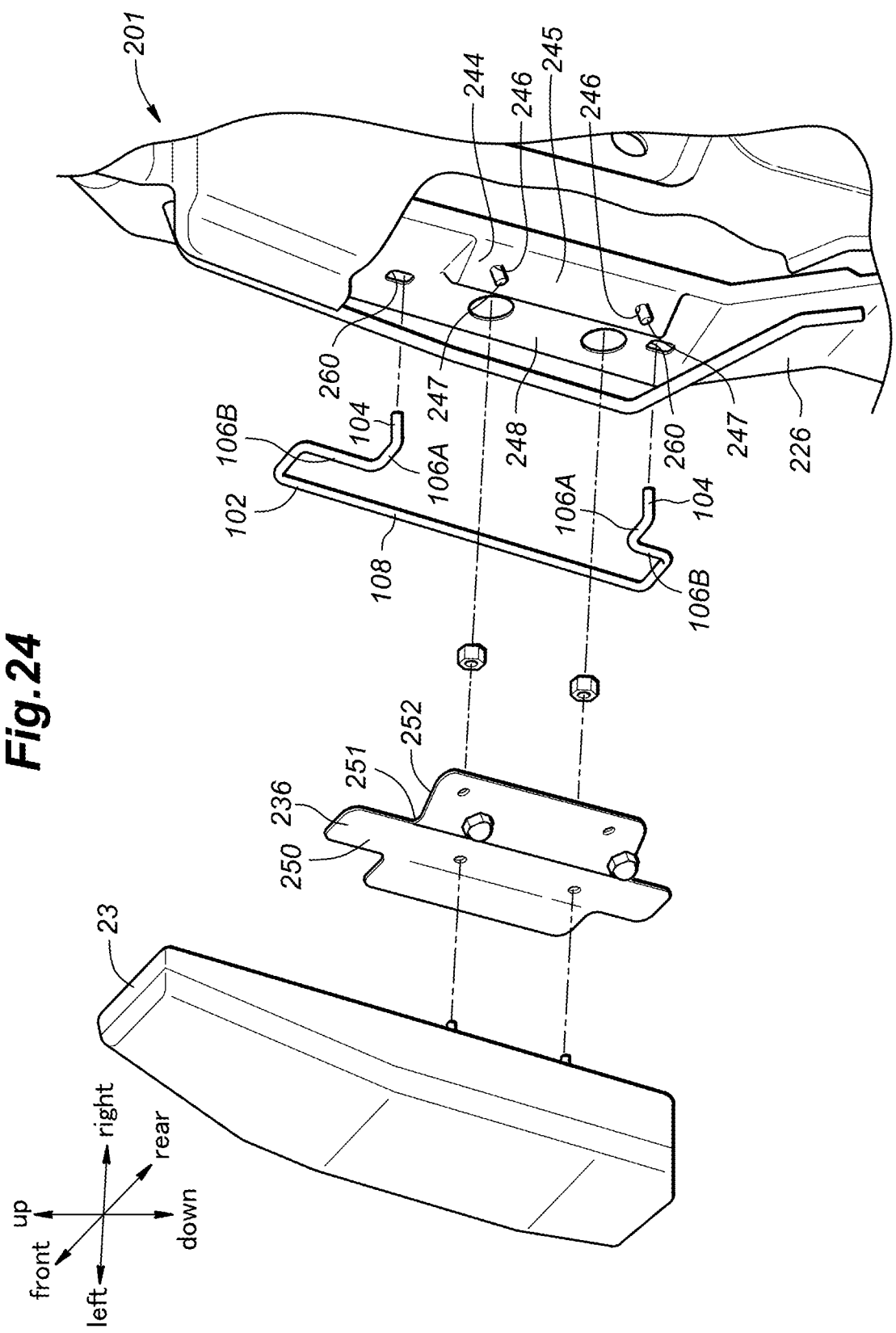
FIG. 24 is an exploded perspective view, as viewed from the rear, of the structure for coupling the airbag module to the side frame in a vehicle seat according to a third embodiment of the present invention.
Figure 25:
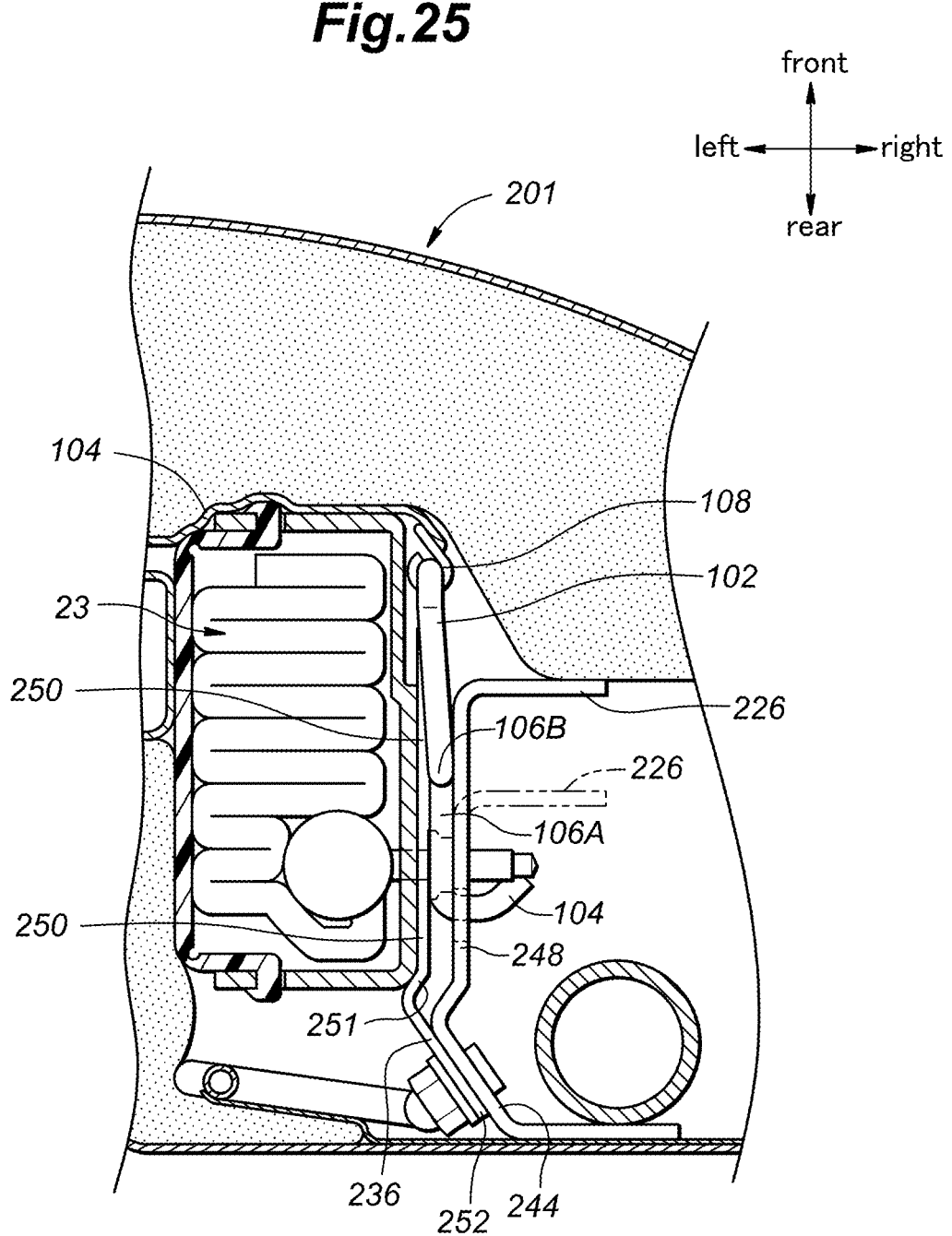
FIG. 25 is a horizontal cross-sectional view of the vehicle seat of the third embodiment.

A vehicle seat 201 of a third embodiment of the present invention differs from the vehicle seat 1 of the second embodiment in that the frame bracket 34 is integrated with the side frame 26 and in the shape of the module bracket 36. As shown in FIGS. 24 and 25, a frame cut-and-raised section 244 (frame coupling section) is cut and raised to the left (outer side) at the rear edge of the side frame 226 at generally vertically center part thereof. The frame cut-and-raised section 244 has a coupling slope section 245 inclined rearward to the left (outer side) in a similar manner to the bracket slope section 44 of the second embodiment. The coupling slope section 245 defines two through holes 246 extending through it in the thickness direction, and stud bolts 247 are welded to the through holes 246 so as to protrude rearward to the left in an inclined direction. The side frame 226 is provided with a frame flat plate section 248 frontward of the frame cut-and-raised section 244, the frame flat plate section 248 having main opposing surfaces facing to the left and the right. The frame flat plate section 248 defines a pair of upper and lower hang holes 260 extending through it in the left-right direction in a similar manner to the second embodiment.

As shown in FIG. 25, the module bracket 236 includes a plate-shaped retainer base 250 (module base section) having outer and inner main surfaces, a retainer extension section 251 (module coupling section) extending rearward to the left in an inclined direction from the rear edge of the retainer base 250, and a retainer slope section 252 (module coupling section) extending to the right in an inclined direction from the rear edge of the retainer extension section 251, in a similar manner to the second embodiment.

As shown in FIG. 24, the cloth-hook wire 102 of the third embodiment has the same shape as the second embodiment. As shown in FIG. 25, the hooks 104 of the cloth-hook wire 102 are latched into the hang holes 260. The module bracket 236 is provided such that the retainer base 250 faces the frame flat plate section 248 from the left, with the cloth-hook wire 102 (more specifically, the first extending section 106A) held therebetween. Furthermore, the retainer slope section 252 is coupled to the frame cut-and-raised section 244, so that the module bracket 236 is coupled to the side frame 226. When the module bracket is coupled to the side frame, the first extending sections 106A of the cloth-hook wire are located between the retainer base 250 and the frame flat plate section 248. Provided on the left side of the retainer base 250 is a generally box-shaped airbag module 23, which is rectangular in the top view, in a similar manner to the second embodiment.

In the vehicle seat 201 of the third embodiment, the cloth-hook wire 102 is located rearward of the front edge of the airbag module 23 and frontward of the rear edge of the airbag module 23, as in the second embodiment. The hook section 108 is located frontward of both the side frame 226 and the module bracket 236. The cloth-hook wire 102 may be located rearward of the front outer edge of the airbag module 23 in the side view, as in the second embodiment. The shaft sections 106B of the cloth-hook wire 102 may be located frontward of the side frame 226, in a similar manner to the second embodiment.

Next, effects or technical benefits of the so configured vehicle seat 201 will be described. As in the second embodiment, the cloth-hook wire 102 is located rearward of the front edge of the airbag module 23, an occupant seated on the vehicle seat is prevented from sensing the presence of the cloth-hook wire as a protrusion and feeling uncomfortable with the protrusion.

This configuration allows the cloth-hook wire 102 and the airbag module 23 to be coupled to the side frame 226 without using the frame bracket 34. Since the cloth-hook wire 102 and the airbag module 23 to the side frame 226 by using only a single bracket (module bracket 236), the vehicle seat 201 is comprised of a smaller number of components or parts compared to the second embodiment, and thus the vehicle seat 201 is made simple.

Fourth Embodiment

Figure 26:
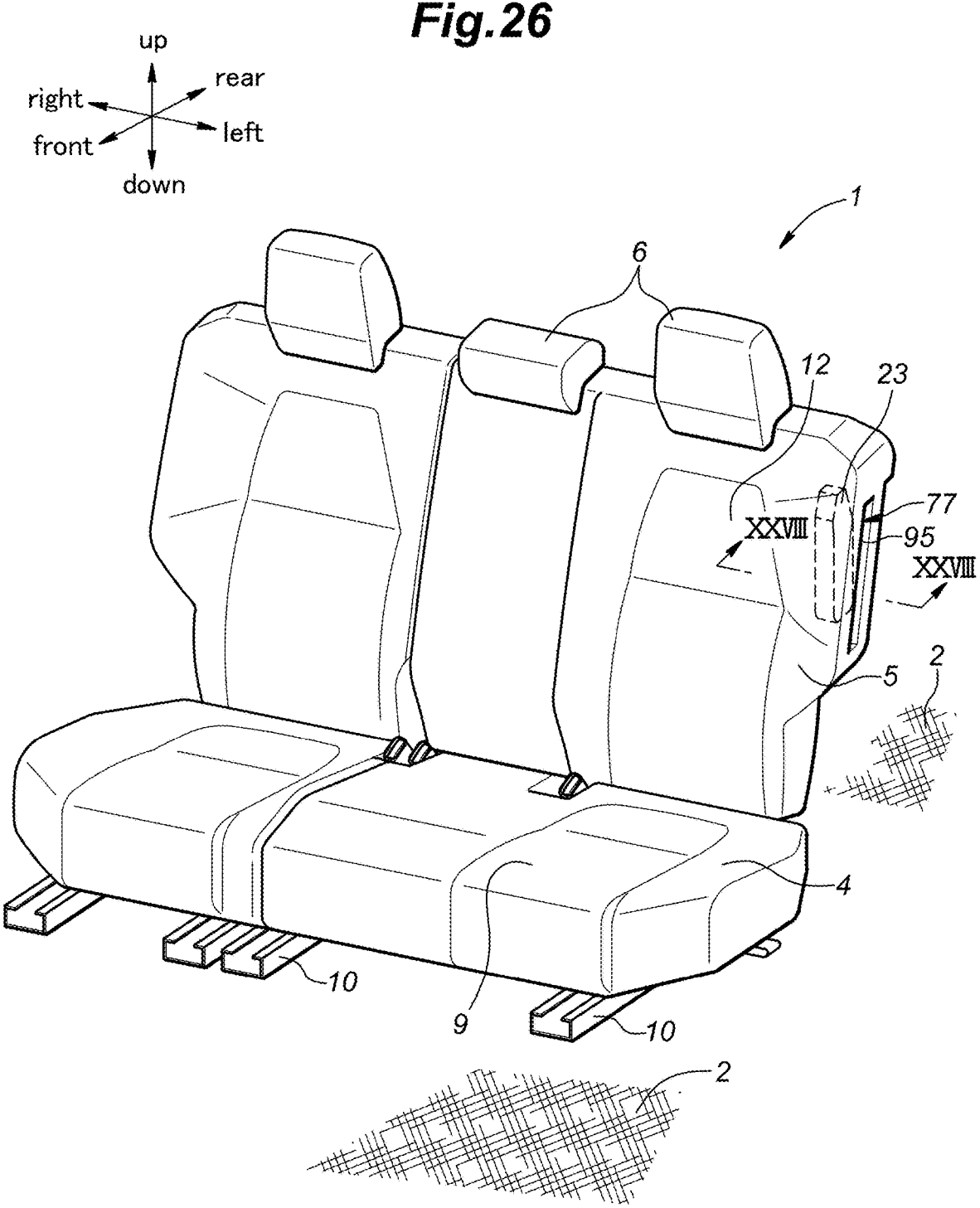
FIG. 26 is a perspective view of a seat equipped with a vehicle seat according to a fourth embodiment of the present invention.

As shown in FIG. 26, a vehicle seat 1 according to a fourth embodiment of the present inventions is different from the vehicle seat 1 of the first embodiment only in features discussed below. The other features of the fourth embodiment are similar to those of the first embodiment. Thus, the vehicle seat 1 of the present embodiment described below is provided in a vehicle having two rows of seats in the front-rear direction, and forms a left side seat in the second row of rear seats, as in the first embodiment. The vehicle seat 1 is provided on a floor 2 of the vehicle. The vehicle seat 1 includes a seat cushion 4 adapted to support a seated occupant, a seatback 5 supported at the rear of the seat cushion 4 and serving as a back recline, and headrests 6 provided on the top of the seatback 5.

Figure 27:
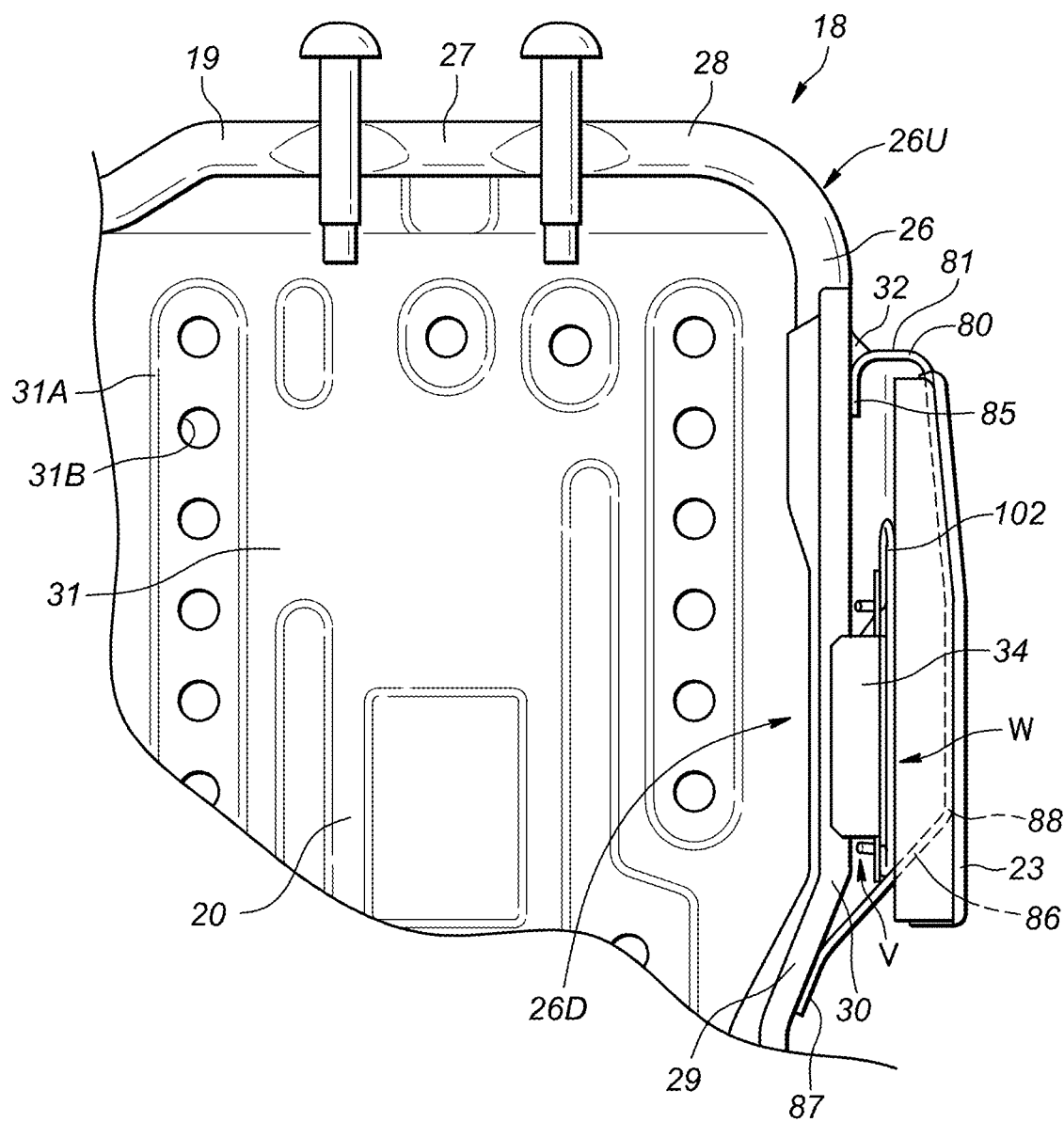
FIG. 27 is a front view of the vehicle seat when a pad member and a skin cover are removed.
Figure 28:
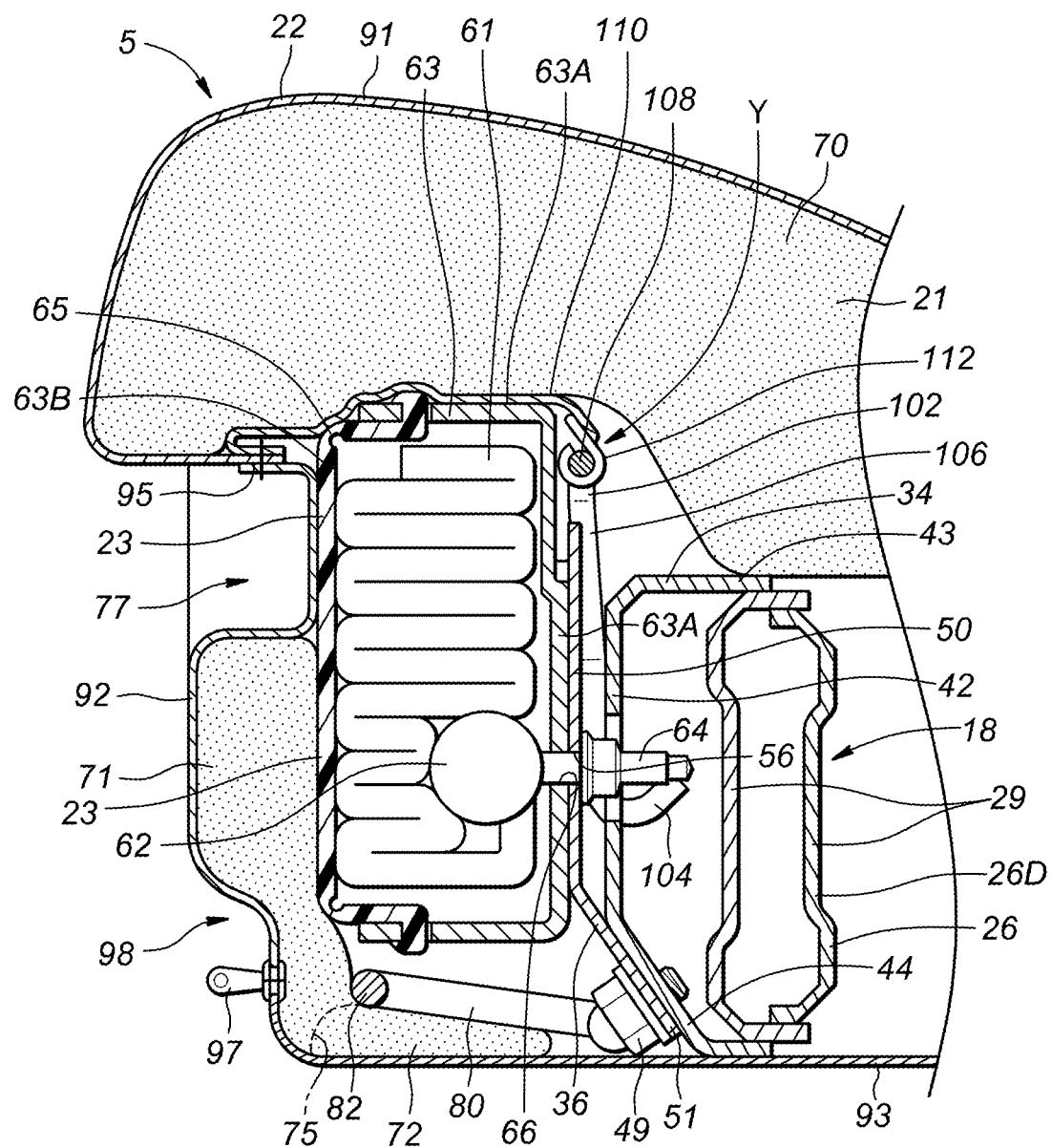
FIG. 28 is cross-sectional view taken along line XXVIII-XXVIII in FIG. 26.

Next, the structure of the seatback 5 will be described. As shown in FIGS. 27 and 28, the seatback 5 includes a seatback frame 18 (FIG. 27) configured to form a framework of the seat, a pad member 21 (FIG. 28) supported by the seatback frame 18, a skin cover 22 (FIG. 28) provided on the front surface of the pad member 21 to form an outer surface of the seatback 5, and an airbag module 23 (FIGS. 27 and 28) supported on the seatback frame 18.

As shown in FIG. 2, the seatback frame 18 forms the framework of the seatback 5, and includes a seatback frame outer portion 19 that forms a rectangular frame and a pan frame 20 (plate) located on the rear side of the seatback frame outer portion 19. The seatback frame outer portion 19 includes left and right side frames 26 (side members) extending vertically, an upper frame 27 extending in the left-right direction and coupled to the upper ends of the left and right side frames 26, and a lower frame (not shown) extending in the left-right direction and coupled to the lower portions of the left and right side frames 26. The side frame upper portions 26U and the upper frame 27 constitute the respective upper portions of the left and right side frames 26, and are formed by the bending of one circular pipe 28 into an inverted U-shaped. Side frame lower portions 26D are the lower portions of the left and right side frames 26, and are formed by sheet metal members 29 each having opposing left and right surfaces (i.e., surfaces facing away from each other in the left-right direction). The inner sides of the upper portions of the sheet metal members 29 are welded to the lower ends of the pipe 28. The front and rear edges of each of the sheet metal members 29 are bent toward the inside of the seat. The lower ends of the left and right side frames 26 each are rotatably coupled to the frame, by a reclining mechanism, for supporting the seat cushion 4. In the present embodiment, as shown in FIG. 28, the side frame lower portion 26D is formed by the two sheet metal members 29 that are arranged to face each other in the left-right direction and are coupled to each other.

Figure 29:
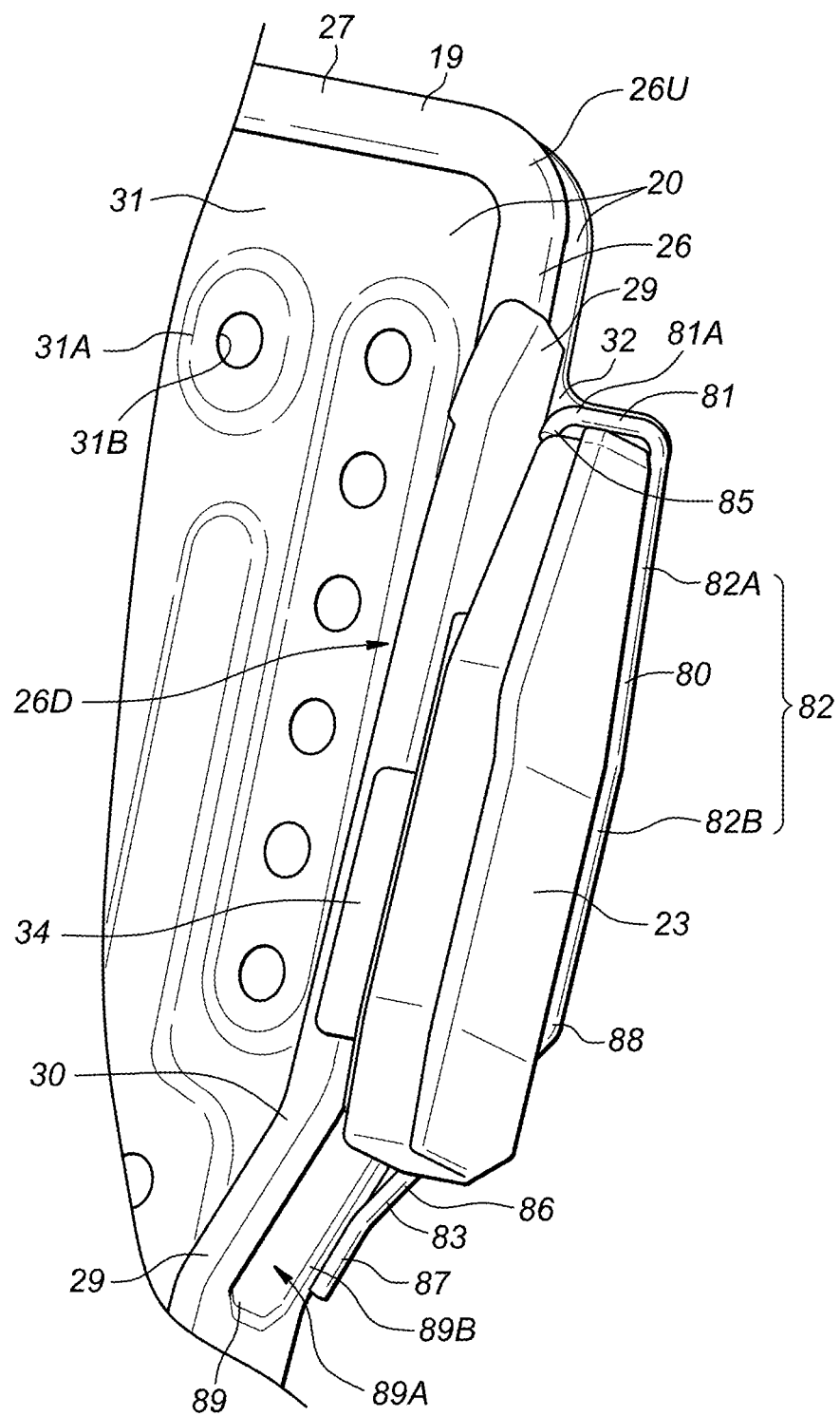
FIG. 29 is a perspective view of an upper left portion of the vehicle seat when the pad member and the skin cover are removed.

As shown in FIGS. 28 and 29, the left side frame lower portion 26D has a frame bend section 30 in the center part in the vertical direction, where the frame bend section 30 is bent inward in the left-right direction (i.e., bent to the right).

Figure 31:
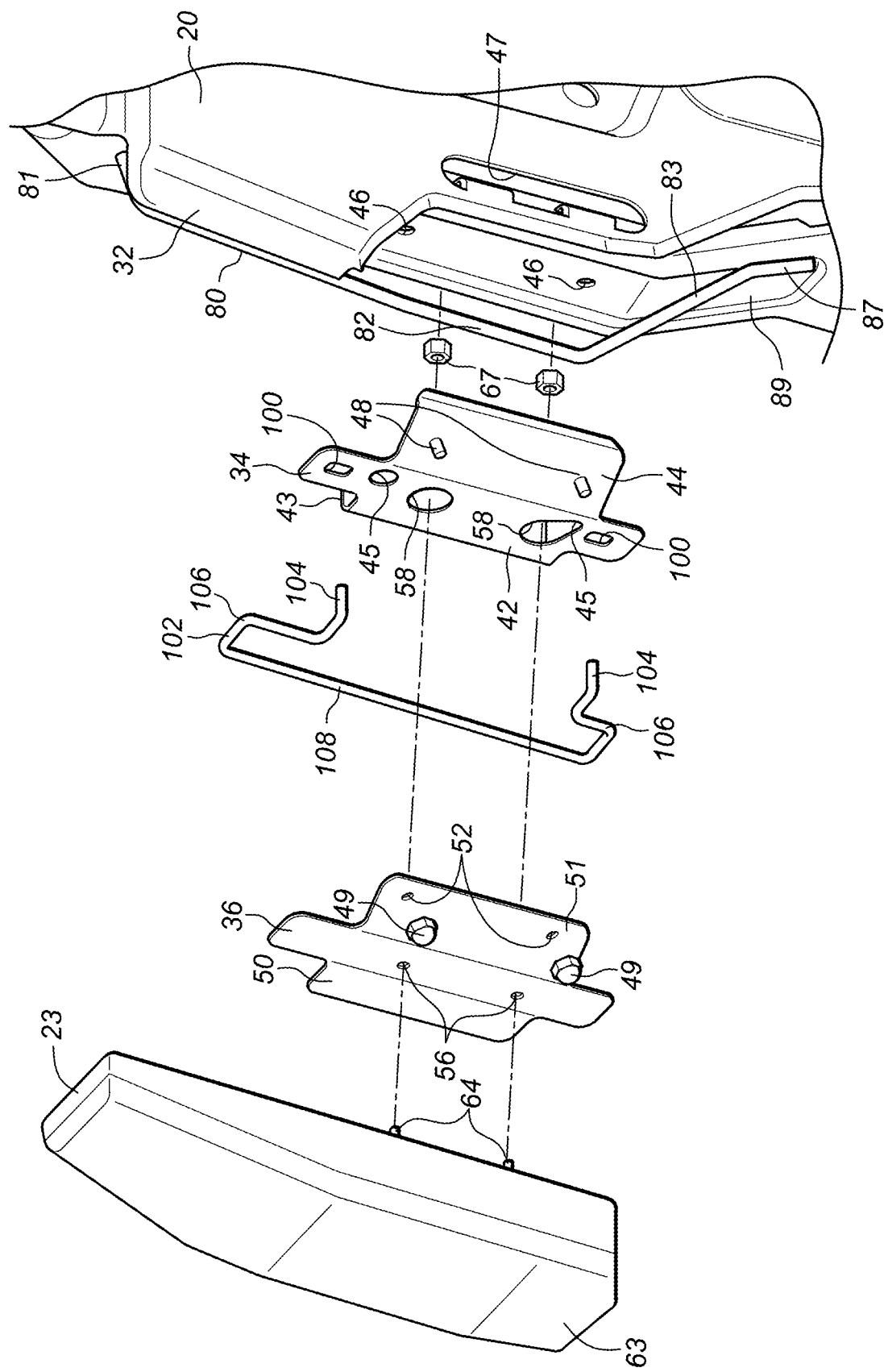
FIG. 31 is an exploded perspective view, as viewed from the rear, of the structure for coupling the airbag module to the side frame.

The pan frame 20 is a metal plate-shaped member and is positioned on the rear side of the side frames 26 and the upper frame 27 so that the pan frame has front and rear surfaces facing away from each other. As shown in FIG. 31, the pan frame 20 includes a pan frame base 31 extending to cover the respective rear sides of the side frames 26, the upper frame 27, and the lower frame, and a pan frame protrusion 32 extending outward from the pan frame base 31 beyond the outer (left) edge of the outer (left) side frame 26. The upper edge, the lower edge, and the left and right side edges of the pan frame 20 are welded to the upper frame 27, the lower frame, and proper locations on the left and right side frames 26, respectively. As shown in FIG. 28, a plurality of beads 31A and punch holes 31B for reinforcement may be provided at proper locations on the pan frame base 31.

As shown in FIG. 28, the left side frame 26 is directly coupled to a frame bracket 34. Fastened to the frame bracket 34 is a module bracket 36 (retainer) configured to hold the airbag module 23. The airbag module 23 is coupled to the side frame 26 via the module bracket 36 and the frame bracket 34. The airbag module 23 has a generally box-like shape extending along the side frame 26 and is positioned so that the outer surface of the airbag module 23 faces to the left (outside).

Figure 30:
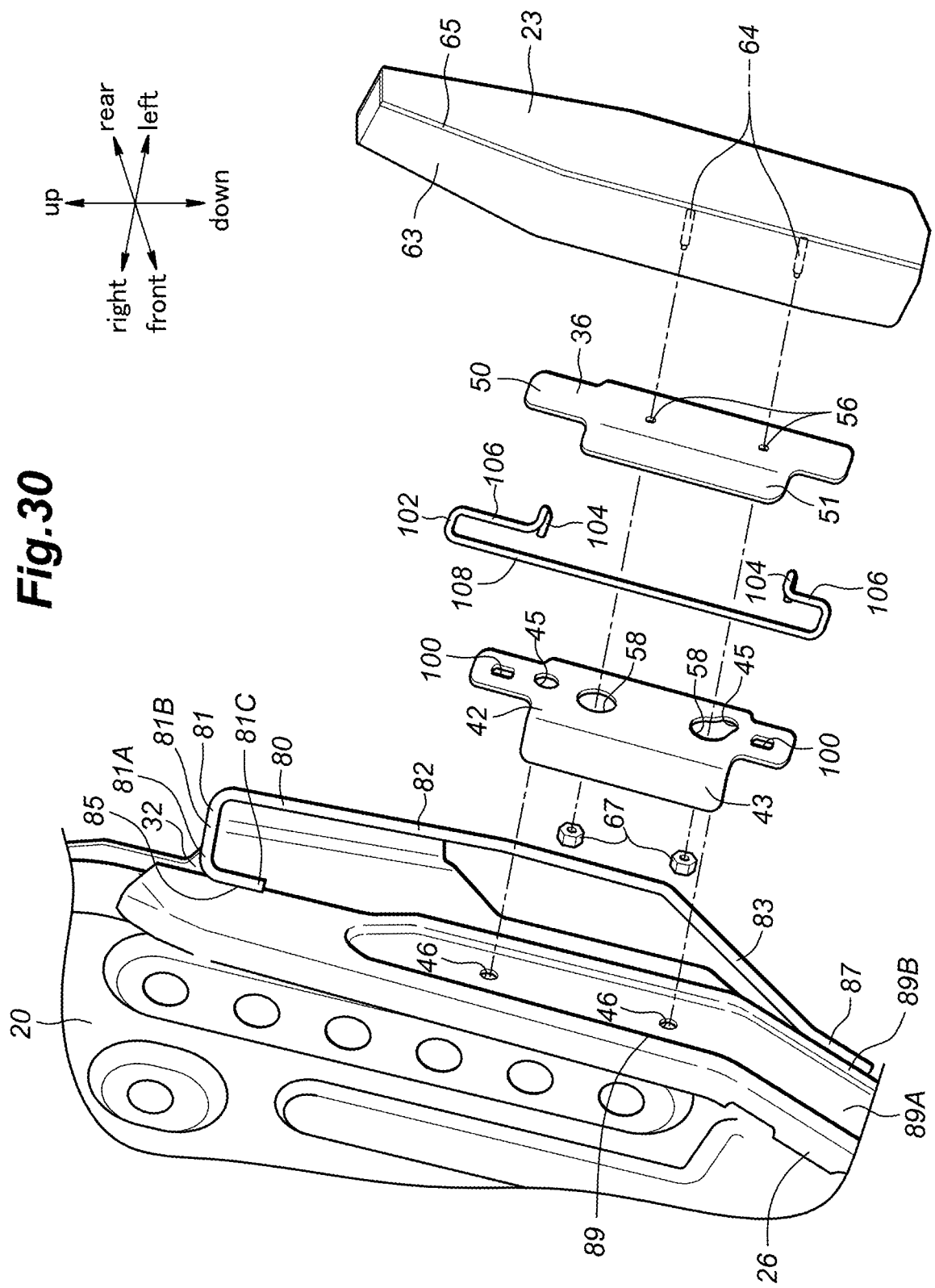
FIG. 30 is an exploded perspective view, as viewed from the front, of a structure for coupling an airbag module to a side frame.

As shown in FIGS. 30 and 31, the frame bracket 34 is a folded sheet metal member, and includes a generally square plate-shaped bracket base 42 having opposing surfaces generally facing away from each other in the left-right direction, a bracket front section 43 (FIG. 30) extending from the front edge of the bracket base 42, and a bracket slope section 44 (FIG. 31) extending from the rear edge of the bracket base 42.

Figure 32:
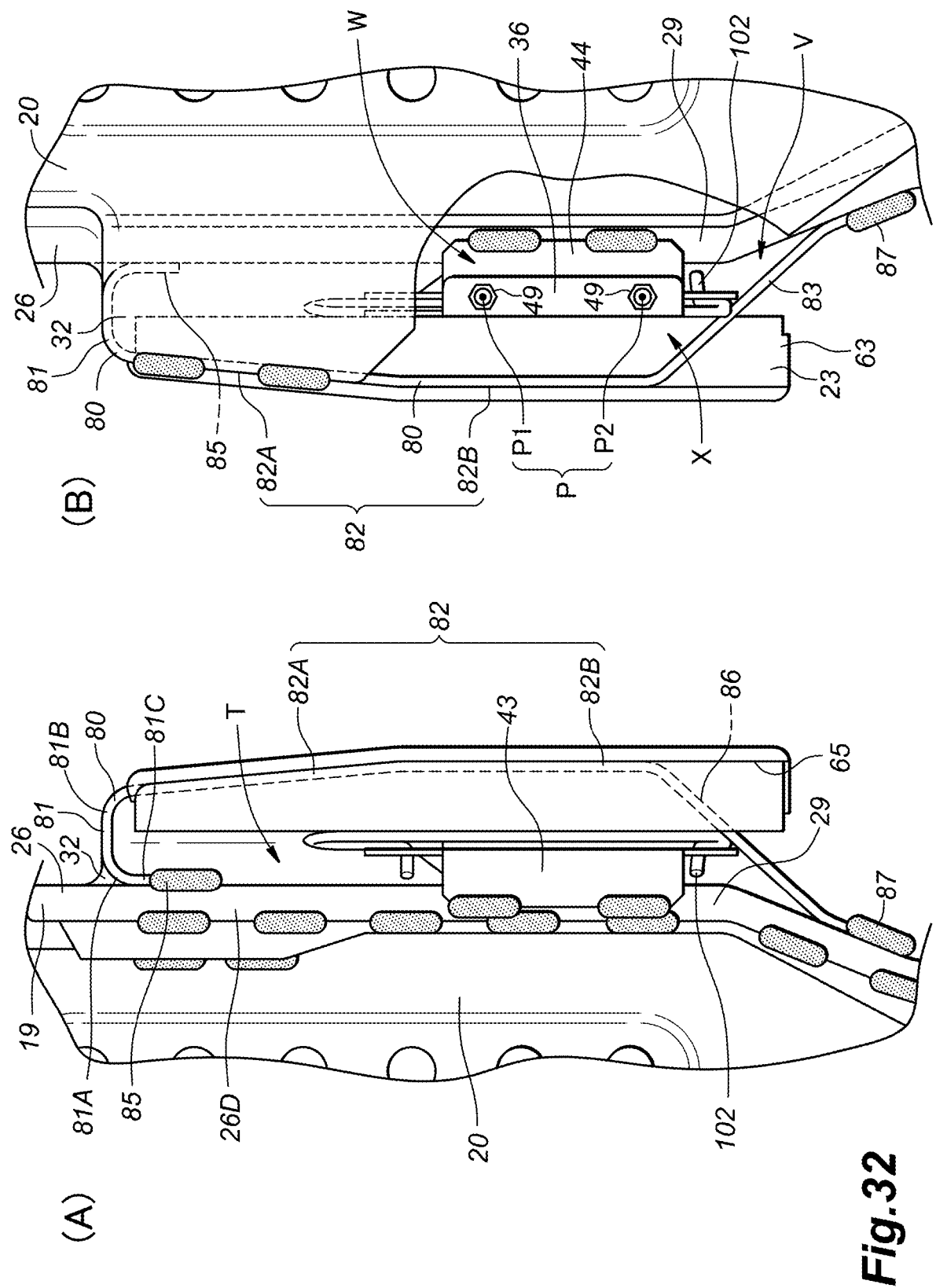
FIG. 32 is a diagram showing an upper left portion of the vehicle seat when the pad member and the skin cover are removed, and (A) and (B) are front and rear views of the upper left portion, respectively.

As shown in FIG. 30, the bracket front section 43 is a plate part extending rightward from the front edge of the bracket base 42. As shown in FIG. 32(A), the bracket front section 43 is welded to the front face of the sheet metal member 29 that forms the left side frame lower portion 26D. In the present embodiment, the upper and lower right edges of the bracket front section 43 are welded to the front surface of the sheet metal member 29. In FIGS. 32(A) and 32(B), the welded portions are indicated with dot-hatching.

As shown in FIGS. 28 and 31, the bracket slope section 44 is a plate section inclined rearward to the right (inner side). As shown in FIG. 32(B), the rear edge of the bracket slope section 44 is bent to the right and welded to the rear surface of the sheet metal member 29. In the present embodiment, the upper and lower right edges of the bracket slope section 44 are welded to the rear surface of the sheet metal member 29. As a result, the frame bracket 34 is coupled to a seatback frame outer portion 19 on one side (i.e., one of the left or right sides; the left side in the present embodiment) of the vehicle seat.

As shown in FIG. 31, the retainer slope section 51 has bolt holes 52 extending through it in the thickness direction. The retainer slope section 51 is provided to extend along the rear surface of the bracket slope section 44. The stud bolts 48 are passed through the bolt holes 52, and the module bracket 36 is fastened to the frame bracket 34 by the tightening of nuts 49 (fasteners) to the stud bolts 48. In the present embodiment, domed nuts (cap nuts) are used as the nuts 49. In the following description, a point where the frame bracket 34 is fastened to the module bracket 36, i.e., the position of the center of a bolt hole 52, is sometimes referred to as a "fastening point P" as necessary The housing 63 has a generally box-like shape. The housing 63 includes a housing body 63A opening outward from the outer side, and a lid 63B configured to close the opening of the housing body 63A. The airbag 61 and the inflator 62 are housed in the housing body 63A. As shown in FIG. 31, the airbag 61 is housed inside the housing 63 in a folded state. The left front edge of the lid 63B has a tear-off line 65 that is designed to tear open under the force of the bag inflation and deployment of the airbag 61. The bottom wall of the housing body 63A is provided with through holes 66 extending therethrough in the thickness direction at predetermined positions.

The male threaded protrusions 64 protrude from the interior of housing 63 to the exterior through the through holes 66. As shown in FIG. 30, the retainer base 50 has bolt holes 52 extending through it in the thickness direction such that the male threaded protrusions 64 are to be inserted into the bolt holes 56. The housing 63 is fastened to the retainer base 50 by the tightening of nuts 67 onto the male threaded protrusions 64. As a result, the airbag module 23 is coupled to the module bracket 36 and held on the left side of the retainer base 50. In the present embodiment, two through holes 58 are provided in the bracket base 42 such that interference between the male threaded protrusions 64 and the frame bracket 34 is avoided when the module bracket 36 is fastened to the frame bracket 34. As shown in FIGS. 30 and 31, the through holes 58 and the positioning holes 45 may be connected and formed to be one hole.

Figure 33:
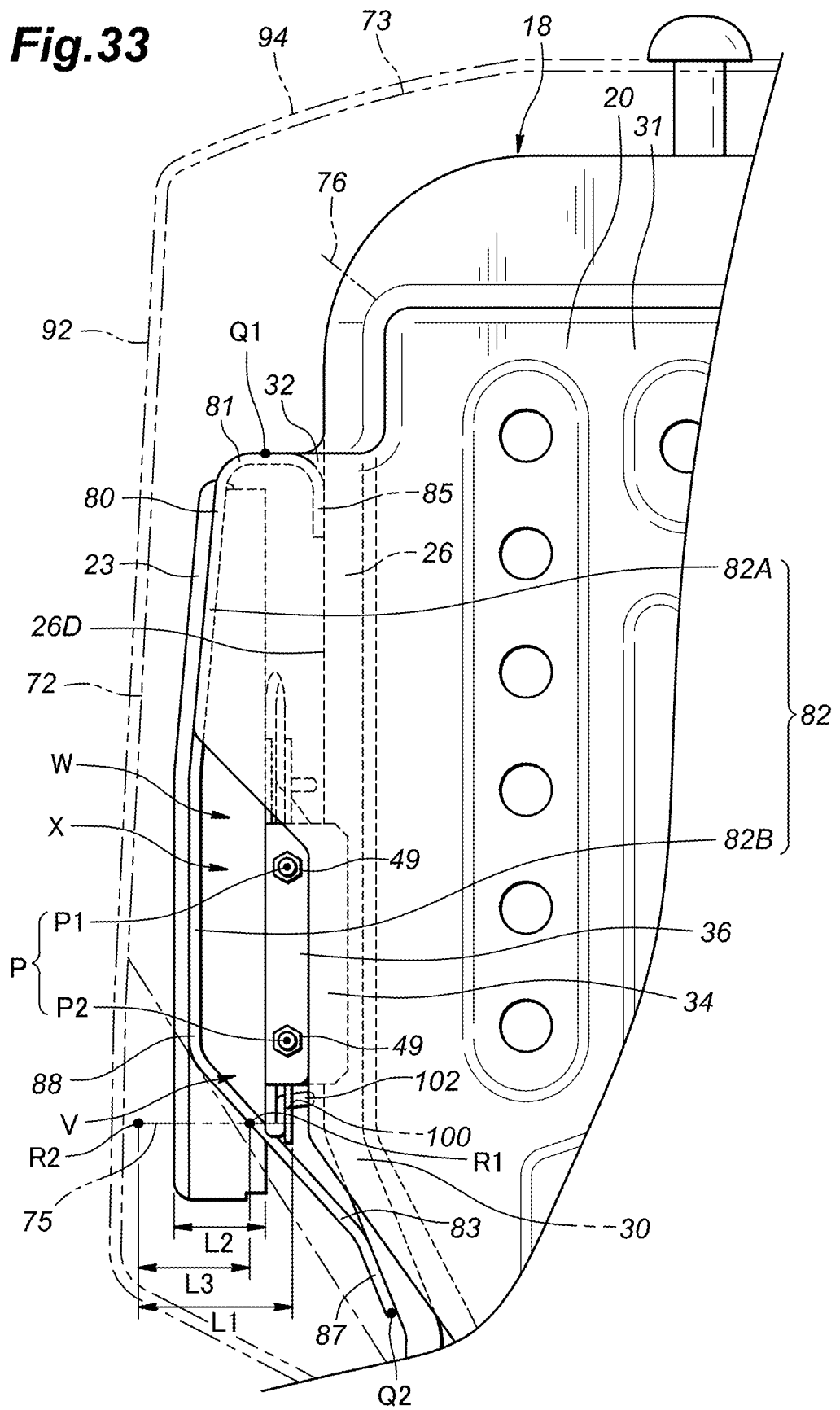
FIG. 33 is a rear view of the vehicle seat when the pad member and the skin cover are removed.
Figure 34:
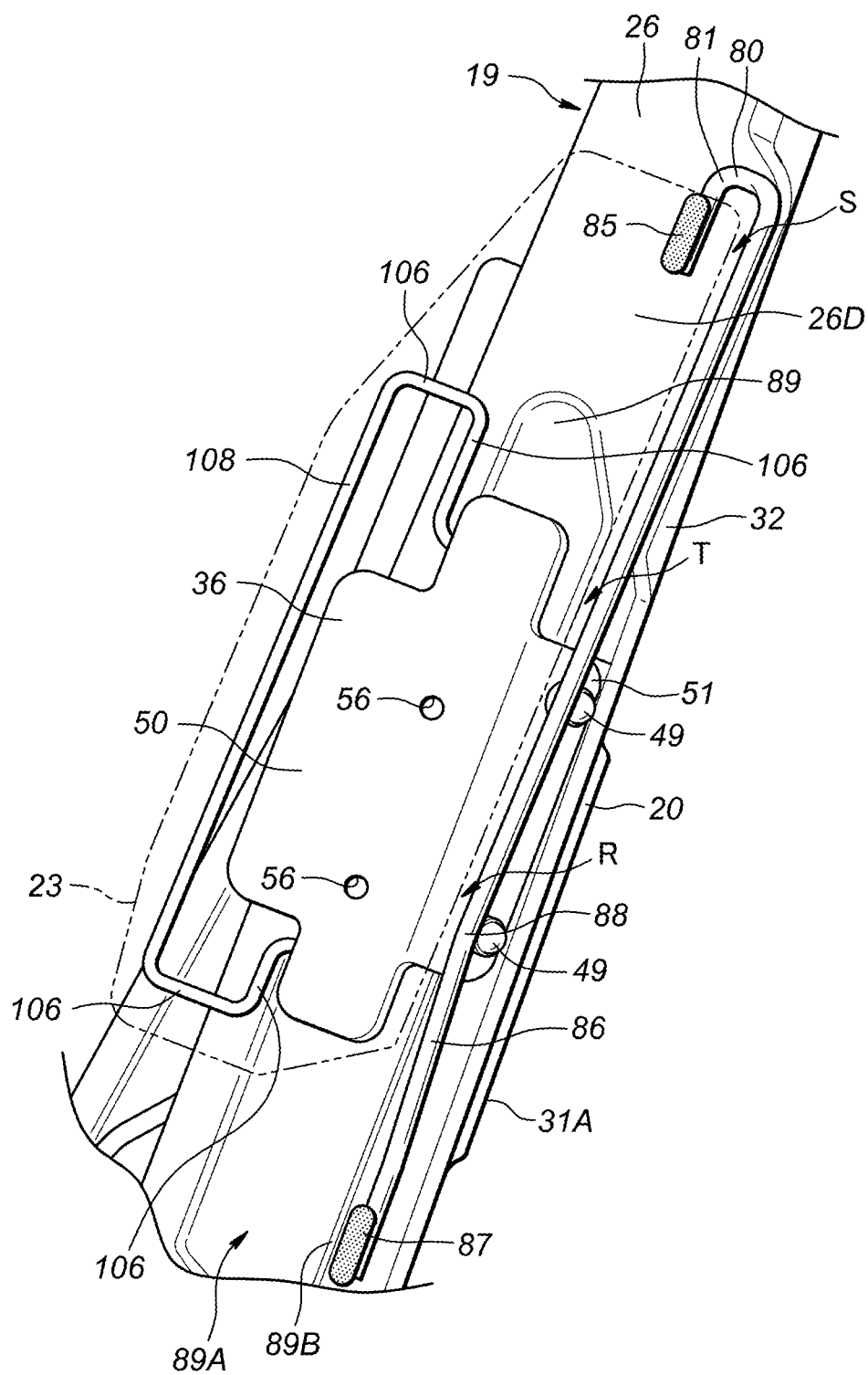
FIG. 34 is a side view of the upper left portion of the vehicle seat when the pad member, the skin cover, and the airbag module are removed.

As shown in FIGS. 27 and 33, the pan frame protrusion 32 extends to the left beyond the left side frame 26 and reaches a location rearward of the left edge of the airbag module 23, as viewed in the rear view. As shown in FIG. 34, the pan frame protrusion 32 is spaced apart from the rear surface of the airbag module 23, so that a gap space S is formed between the pan frame 20 and the airbag module 23 in the front-rear direction.

As shown in FIG. 33, the pan frame protrusion 32 extends over (i.e., overlaps) the upper half of the airbag module 23 in the rear view, so that the airbag module 23 is covered by the pan frame protrusion 32 from the rear side. The upper edge of the pan frame protrusion 32 is aligned vertically with that of the airbag module 23, while the lower edge of the pan frame protrusion 32 is positioned between the upper and lower edges of the airbag module 23 in the vertical direction. In the present embodiment, the lower edge of the pan frame protrusion 32 is positioned substantially in the center of the airbag module 23 in the vertical direction.

Figure 35:
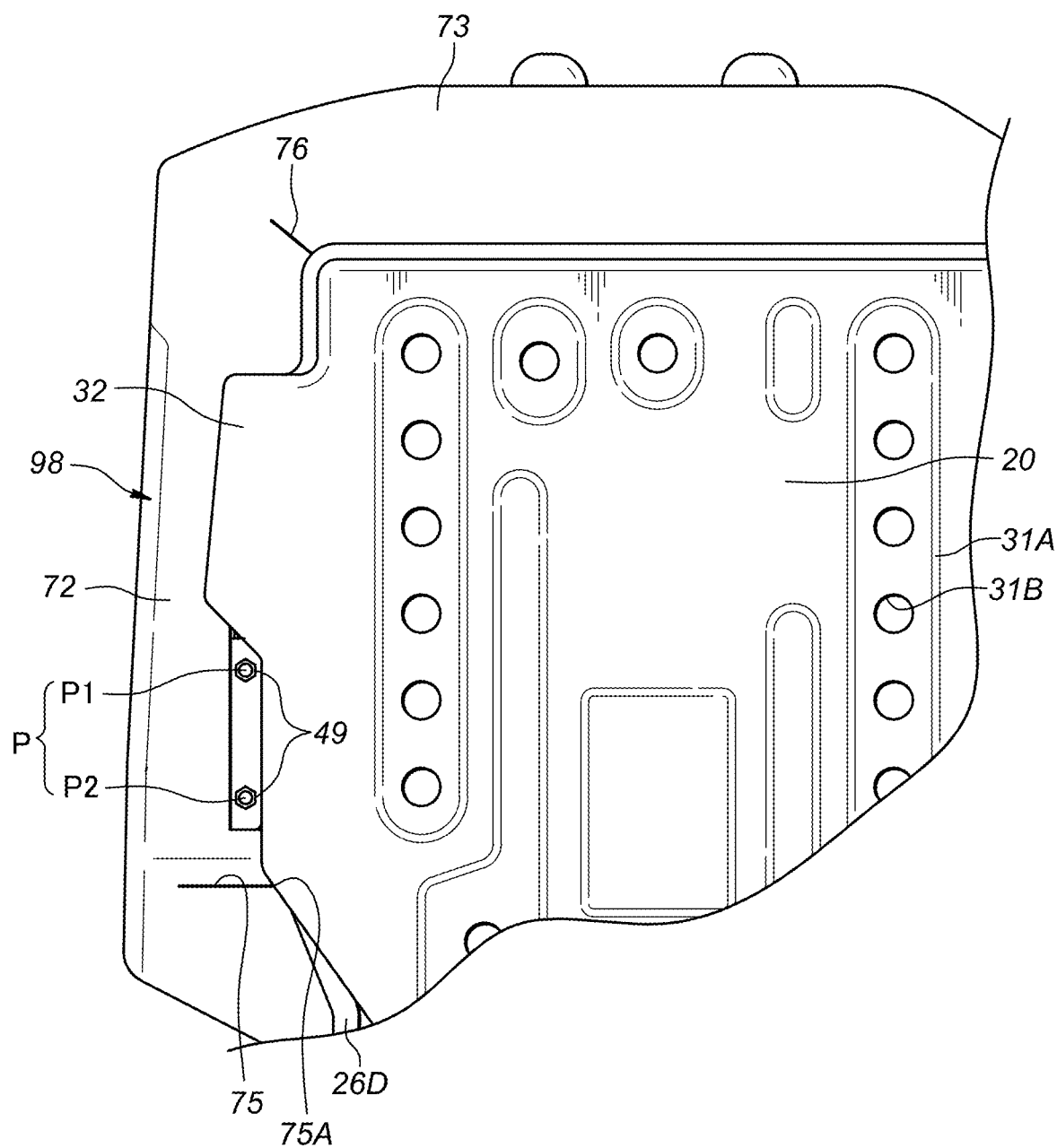
FIG. 35 is a rear view of the vehicle seat when the skin cover is removed.

The pad member 21 is formed of a flexible cushioning material such as polyurethane foam. As shown in FIGS. 28 and 35, the pad member 21 includes: a front pad member 70 (FIG. 28) configured to cover the seatback frame outer portion 19 and the airbag module 23 from the front; a side pad member 71 (FIG. 28) configured to be coupled to an outer (i.e., left side) portion of the front pad member 70 and extend rearward; a rear pad member 72 (FIGS. 28 and 35) extending from the rear end of the side pad member 71 toward the inner side (i.e., right side) in the left-right direction; and an upper pad member 73 (FIG. 35) configured to connect the upper ends of the front pad member 70, the rear pad member 72, and the side pad member 71 to each other. The rear pad member 72 covers the seatback frame outer portion 19 and the airbag module 23 from the rear, while the upper pad member 73 covers the seatback frame outer portion 19 and the airbag module 23 from the above.

As shown in FIG. 35, an auxiliary slit 76 is formed to extend through the rear or upper pad member in the front-rear direction at a location where the rear pad member 72 is connected to the upper pad member 73 in the right-left direction. The auxiliary slit 76 is also a cut extending through the pad member in the front-rear direction. In the present embodiment, the auxiliary slit 76 extends from the upper inner edge (right edge) of the rear pad member 72 toward the outer edges (i.e., toward the left). In the present embodiment, the auxiliary slit 76 has a straight line shape and extends upward to the right from the upper right edge of the rear pad member 72. The auxiliary slit 76 is preferably formed to extend in the direction at an angle of approximately 45 degrees.

As shown in FIG. 35, the slit 75 is located below the two fastening points P1 and P2, as viewed in the rear view, and the auxiliary slit 76 is located above the two fastening points P1 and P2. In other words, the two fastening points P1 and P2 are located between the slit 75 and the auxiliary slit 76 in the rear view.

The side pad member 71 has a box-like shape extending vertically over an outer (i.e., left side) edge of the airbag module 23 to cover the airbag module 23 from the outer side. As shown in FIG. 28, a deployment hole 77 is provided in a front portion of the side pad member 71. The deployment hole 77 passes through the front portion of the side pad member 71 in the left-right direction, and is located on the outer side (i.e., left side) of the airbag module 23. In the present embodiment, as shown in FIG. 26, the deployment hole 77 is formed to extend vertically along the seatback 5, and as shown in FIG. 28, the deployment hole 77 is located frontward of the slit 75.

As shown in FIG. 30, the shape former 80 has a curved section 81A formed so as to bend and extend downward along the upper portion of the left side frame 26 at the inner end of the shape former upper portion 81 (in the present embodiment, at the right end). Specifically, the shape former upper portion 81 has a body section 81B extending in the left-right direction and an extension section 81C extending downward from the inner end (right end) of the body section 81B. As shown in FIG. 32(A), an upper attachment section 85 is provided in the curved section 81A, more accurately, in the extension section 81C, and the shape former upper portion 81 is welded along the upper attachment section 85 to the upper left side surface of the side frame 26. The upper attachment section 85 is located frontward of the upper edge of the pan frame protrusion 32, enabling the pan frame protrusion 32 to cover the upper attachment section 85 from the rear to thereby protect the upper attachment section 85 from loads applied from the rear. A middle section to the outer end of the shape former upper portion 81 is aligned in the front-rear direction with the upper edge of the pan frame protrusion 32; that is, the middle section of the shape former upper portion 81 extends in the left-right direction along the upper edge of the pan frame protrusion 32 in the rear view.

As shown in FIG. 29, the shape former center portion 82 includes an upper half portion 82A extending downward from the left end of the shape former upper portion 81 and extending along the outer side edge (i.e., left edge) of the pan frame protrusion 32, and a lower half portion 82B extending downward from the lower end of the upper half portion 82A. The upper half portion 82A extends from the vertical position of the upper edge to the lower edge of the pan frame protrusion 32, and the lower end of the upper half portion 82A, i.e., the upper end of the lower half portion 82B, is aligned in the front-rear direction with the lower and outer edge of the pan frame protrusion 32. The upper half portion 82A and the lower half portion 82B are located on the outer side (i.e., left side) of the left side frame 26. As shown in FIG. 33, a gap space W is formed in the left-right direction between the lower half portion 82B and the outer (left side) of the left side frame 26.

In the present embodiment, the upper half portion 82A of the shape former center portion 82 is coupled to the left edge of the pan frame protrusion 32. More specifically, as shown in FIG. 32(B), the upper half portion 82A is welded and coupled to the left edge of the pan frame protrusion 32 at two points.

As shown in FIG. 32(A), the shape former lower portion 83 includes a body section 86 extending generally straight down to the right from the lower end of the shape former center portion 82, and a lower attachment section 87 extending from the lower end of the body section 86 and welded to the left side surface of the left side frame 26. The body section 86 is inclined down to the right (inward in the left-right direction). The shape former 80 has a shape former curved section 88 formed so as to bend and extend downward and inward at the connection between the lower half portion 82B of the shape former center portion 82 and the body section 86. The lower attachment section 87 is provided at the lower end of the shape former 80, the lower attachment section being bent slightly downward along the left side frame 26. As shown in FIGS. 27, 32(B) and 33, the shape former curved section 88 is located above the frame bend section 30 and the lower attachment section 87 is located below the frame bend section 30. The upper part of the body section 86 is located on the left side with respect to the left side frame 26, and a gap space V is formed in the left-right direction between the upper part of the body section 86 and the left side frame 26.

In this way, as shown in FIGS. 32(B) and 33, the lower half portion 82B of the shape former center portion 82 and the shape former lower portion 83 connect the lower edge of the pan frame protrusion 32 and the lower portion of the left side frame 26. That is, the shape former 80 includes a portion extending between the lower edge of pan frame protrusion 32 and the lower portion of left side frame 26. In addition, a through-hole space X, which is formed to extend in the front-rear direction, is defined by the right edge of the lower half portion 82B of the shape former center portion 82, the right edge of the shape former lower portion 83, the lower edge of the pan frame protrusion 32, and the lower left edge of the left side frame 26.

In the present embodiment, as shown in FIG. 33, at least a part of the shape former center portion 82 (in this case, the entire area of the shape former center portion 82, including the upper half portion 82A and the lower half portion 82B) extends along the outer surface (i.e., left side) of the airbag module 23 in the rear view.

The pan frame protrusion 32 covers the upper part (the upper half in the present embodiment) of the airbag module 23 from the rear. Thus, when the pad member 21 and the skin cover 22 are not provided, the lower part (the lower half) of the airbag module 23 is visible from the rear through the through-hole space X, as shown in FIGS. 32(B) and 33. As shown in FIG. 33, the lower edge of the pan frame protrusion 32 is positioned above the two fastening points P1 and P2. At least when the pad member 21 and the skin cover 22 are not provided, both the two fastening points P1 and P2 are visible through the through-hole space X, and are accessible by a fastening tool (e.g., universal wrench) through the through-hole space X from the rear.

The skin cover 22 is formed by the connection of a plurality of sheet-shaped members such as cloth and leather. As shown in FIG. 28, the skin cover 22 includes: a front skin cover 91 for covering the front surface of the front pad member 70 and the front left side of the side pad member 71; a left side skin cover 92 (outer skin cover) for covering the rear left side of the side pad member 71; a rear skin cover 93 for covering the rear surface of the rear pad member 72 and the rear surface of the pan frame 20; and an upper skin cover 94 (FIG. 33) for covering the upper surface of the upper pad member 73. The front, left, and rear edges of the upper skin cover 94 are sewn to the upper edges of the front skin cover 91, the left skin cover 92; and the rear skin cover 93, respectively.

As shown in FIG. 28, the left edge of the front skin cover 91 and the front edge of the left side skin cover 92 are stitched to each other to form a stitching line 95. The stitching line 95 serves as a breakable line in the skin cover 22 that can break under a smaller load than other stitches (e.g., the stitching line between the front edge of upper skin cover 94 and the top edge of front skin cover 91). The stitching line 95 extends vertically and is accommodated within the deployment hole 77 in the front of the side pad member 71.

As shown in FIG. 35, the fastener receiving recess 98 is located to the left of opening end 75A. In other words, the fastener receiving recess 98 does not reach the right edge of the rear pad member 72, and the fastener receiving recess 98 and the opening end 75A are provided at different positions. This configuration can increase the stiffness of a portion of the rear pad member 72 near the opening end 75A of the slit 75, compared to the case where the fastener receiving recess 98 overlaps the opening end 75A, which can prevent breakage of the pad member 21.

As shown in FIG. 30, the bracket base 42 has hang holes 100 at the top and bottom thereof, the hang holes 100 extending through it in the thickness direction, i.e., in the left-right direction. A cloth-hook wire 102 is latched into the hang holes 100. The cloth-hook wire 102 is formed by the bending of a round metal bar into a predetermined shape. As shown in FIG. 28, the cloth-hook wire 102 includes a pair of upper and lower hooks 104 configured to be latched into or hung onto a corresponding hang hole 100 and located at both ends thereof, a pair of upper and lower wire coupling sections 106 extending frontward from the lower hooks 104 beyond the front end of the airbag module 23, and a hook section 108 connecting the front ends of the upper and lower wire coupling sections 106. The cloth-hook wire 102 is engagedly coupled to the frame bracket 34 by the lower hooks 104 at both two ends, each hook 104 being configured to be latched into or hung onto the hang holes 100 of the frame bracket 34. The upper and lower wire coupling sections 106 are L-shaped sections, which extend frontward from the lower hooks 104, passing between the bracket base 42 and the retainer base 50 to the front, to reach bend points frontward of and on the right (inner) side of the airbag module 23, at which points, the wire coupling sections 106 bend to extend outward (to the left). As shown in FIG. 34, the wire coupling sections 106 extend between the bracket base 42 and the retainer base 50, where, when being assembled, the wire coupling sections 106 are pressed against the bracket base 42 by the airbag module 23. This feature holds the cloth-hook wire 102 between the frame bracket 34 and the module bracket 36 to restrict the movement thereof.

As shown in FIG. 28, the vehicle seat 1 is provided with a stay cloth 110 for tearing open the skin cover 22 under the force of the bag inflation and deployment of the airbag 61. The stay cloth 110 is formed of a sheet-like material that is less elastic than the skin cover 22. One end of the stay cloth 110 is stitched to the front skin cover 91 and the left side skin cover 92 at the stitching line 95. The stay cloth 110 extends from the one end toward the hook section 108 of the cloth-hook wire 102. The other end of the stay cloth 110 is provided with one or more J-shaped hooks 112, which are configured to be hung onto the hook section 108 of the cloth-hook wire 102.

Next, a method for assembling the vehicle seat 1 will be described. After welding the frame bracket 34 and the shape former 80 to the seatback frame outer portion 19, an assembling worker places the pad member 21 on the seatback frame outer portion 19, the frame bracket 34 and the shape former 80, as shown in FIG. 36(A). The rear surface of the front skin cover 91 and the right surface of the left side skin cover 92 are preferably pre-coupled (glued) to the front surface of the front pad member 70 and the left surface of the side pad member 71, respectively.

Next, the worker grasps the lower end of the rear pad member 72 and pulls it outward (i.e., rightward) to thereby open the slit 75. As shown in FIG. 36(B), the load applied to the rear pad member 72 also opens the auxiliary slit 76. As a result, the pad member 21 is bent along the slit 75 and the auxiliary slit 76.

Then, while pulling the lower end of the rear pad member 72 outward (leftward), the worker inserts the airbag module 23 fastened to the module bracket 36 through the slit 75 between the left side frame 26 and the pad member 21. Then, the worker pushes the airbag module 23 upward to thereby position the airbag module 23 in the housing space Y.

Next, while pulling the lower end of the rear pad member 72 outward, the worker places the airbag module 23 so that the module bracket 36 is aligned with the frame bracket 34, and inserts the stud bolts 48 into the bolt holes 52. As shown in FIG. 36(B), while pulling the lower end of the rear pad member 72 outward, the worker pulls and bends the pad member 21 along the slit 75 and the auxiliary slit 76. As a result, the slit 75 and the auxiliary slit 76 open, which ensures that the two fastening points P1 and P2 are more visible and accessible through the through-hole space X. The worker inserts the fastening tool into the through-hole space X and tightens the nuts 49, thereby fastening the module bracket 36 to the frame bracket 34. As a result, the airbag module 23 is coupled to the left side frame 26 via the module bracket 36 and the frame bracket 34

The worker then positions the rear skin cover 93 along the rear surface of the rear pad member 72 and the rear surface of the pan frame 20, and couples the outer side edge of the rear skin cover 93 to the rear edge of the left side skin cover 92 using the slide fastener 97. In this way, the assembly of the vehicle seat 1 is completed.

Next, effects or technical benefits of the vehicle seat 1 will be described.

As in the present embodiment, the seatback 5 of the vehicle seat 1 may be provided with an airbag module 23 that accommodates an airbag 61. The airbag module 23 is preferably fixed to the seatback frame outer portion 19 so that the airbag module 23 can resist a reaction force during deployment of the airbag 61.

In some cases, the pad members 21 may be provided to extend over the front, left and right sides, and rear of the seatback frame outer portion 19 to make the front, left and right sides, and rear of the seatback 5 are cushioned. In such cases, when the pad member 21 is assembled to the seatback frame outer portion 19, there the seatback frame outer portion 19 of the seatback frame is covered by the pad member 21, which causes the difficulty in assembling the airbag module 23 to the seatback frame outer portion 19. When the shape former 80 is attached to the seatback frame outer portion 19 as in the present embodiment, the airbag module 23 needs to be placed frontward of the shape former 80, which makes the assembly of the airbag module 23 to the seatback frame outer portion 19 more difficult.

Figure 36:
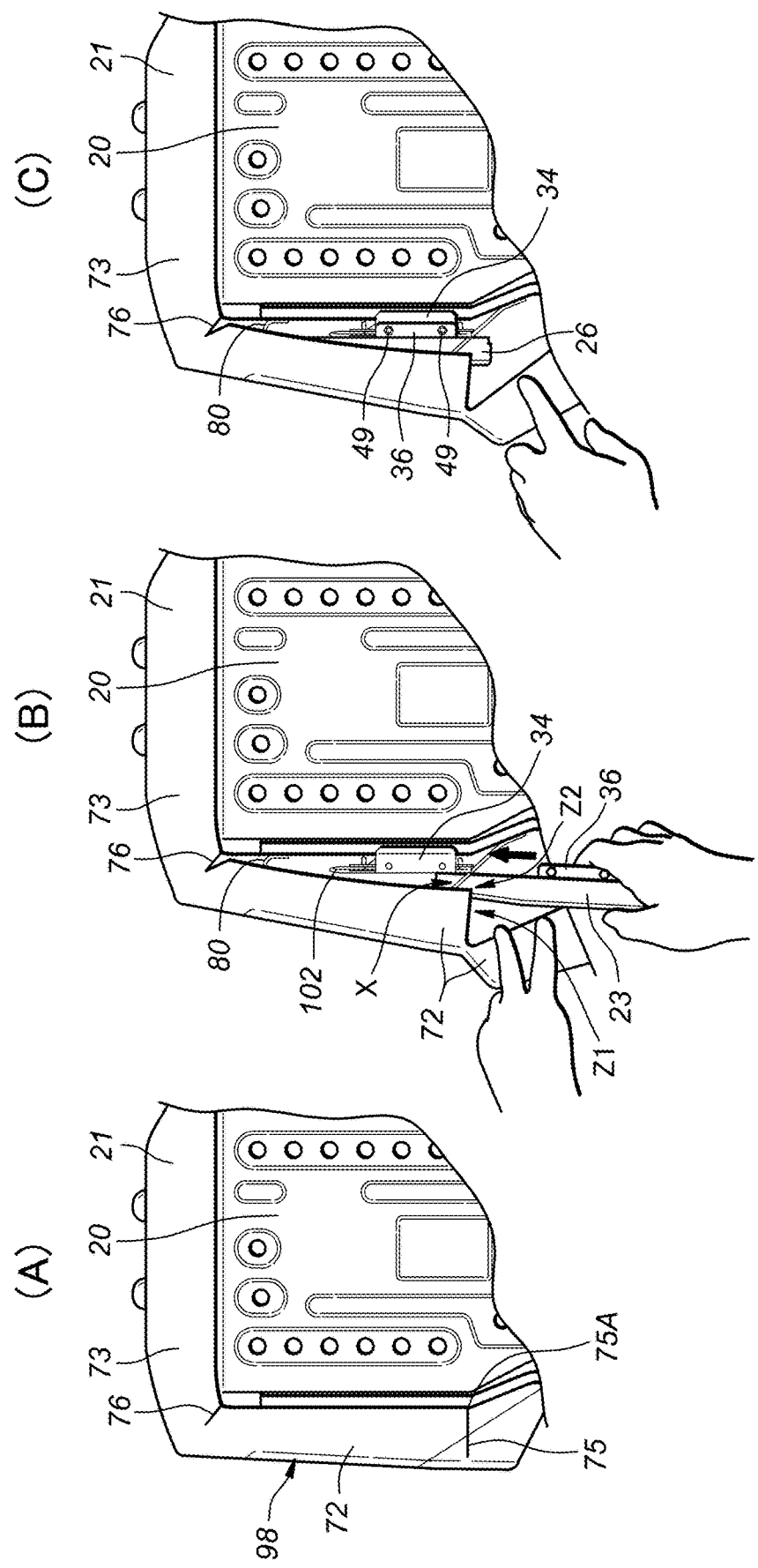
FIG. 36 is an explanatory diagram showing assembly of the airbag module, and (A), (B), and (C) illustrate before assembly, during assembly, and after assembly, respectively.

As a solution to resolve the above-described problems, a slit 75 is formed in the rear pad member 72 in the present embodiment. As shown in FIG. 36, an assembling worker is allowed to open the slit 75 by pulling the lower end part of the rear pad member 72 to the left. Thus, this configuration allows the worker to easily insert the airbag module 23 between the left side frame 26 and the pad member 21 through the opened slit 75. Even when the shape former 80 is provided as in the present embodiment, by opening the slit 75 as necessary, the worker is enabled to move the airbag module 23 to a location frontward of the shape former 80 and insert the airbag module 23 between the left side frame 26 and the pad member 21. In this way, forming the slit 75 in the rear pad member 72 allows the worker to easily assemble the airbag module 23 to the side frame 26.

In addition, a rear pad member 72 is provided rearward of the airbag module 23. Thus, the airbag module 23 is covered by the rear pad member 72 from the rear. As a result, the backside of the seatback 5 is made cushioned, which improves the comfort of the vehicle seat 1.

As shown in FIG. 33, the slit 75 is in a form of a straight line and thus can be made simple. The slit 75 extends in a substantially horizontal direction and is located below the frame bracket 34, which enables a worker to easily move the airbag module 23 to the proper position by inserting and pushing the airbag module 23 upward in a direction orthogonal to the slit 75. This allows the worker to easily determine the movement direction w of the airbag module 23 during assembly work. Since the slit 75 extends horizontally, the slit 75 can be easily opened by pushing the lower end of the rear pad member 72 to the outside, which improves the efficiency of the work of assembling the airbag module 23.

In the present embodiment, the slit 75 is formed to have a lateral width L1 that is greater than the left-to-right width L2 of the airbag module 23, which facilitates the insertion of the airbag module 23. A slit-overlapping part of the shape former overlaps the slit 75 in the front-rear direction, and the lateral distance L3 between the left end R1 (the outer side end) of the slit-overlapping part and the left end R2 (the outer side end) of the slit 75 is greater than the lateral width L2 of the airbag module 23. Furthermore, a hole space Z2, which is laterally wider than the lateral width L2 of the airbag module 23, may be formed between the left end R2 of the slit 75 and the shape former 80. This configuration allows a worker to easily insert the airbag module 23 into the hole space Z2 to thereby move the airbag module 23 at a point frontward of the shape former 80.

The slit 75 is located below the upper end Q1 of the shape former 80 and above the lower end Q2 of the shape former 80. This feature allows an assembling worker to insert the airbag module 23 through the slit 75 to a point near the shape former 80, and thus place the airbag module 23 in a quick and proper manner.

The slit 75 is formed so as to overlap the shape former lower portion 83 in the front-rear direction. The shape former lower portion 83 is inclined so as to be closer to the seatback frame outer portion 19 toward the lower (i.e., inclined to the right). Thus, when the airbag module 23 is inserted from the lower side of the slit 75, the upward movement of the airbag module 23 is less likely to be obstructed by the shape former 80 compared to the case e.g. where the shape former lower portion 83 extends downward and then horizontally to the right. This configuration facilitates the assembly of the airbag module 23.

Fifth Embodiment

A vehicle seat 470 according to a fifth embodiment of the present inventions is different from the vehicle seat 1 of the fourth embodiment only in that a slit 475 has a different shape from that of the fourth embodiment. The other features of the fifth embodiment are similar to those of the fourth embodiment. Thus, in the following description, the same reference numerals as the fourth embodiment are retained for corresponding features and the description of the features except the slit 475 will be not repeated here.

Figure 37:
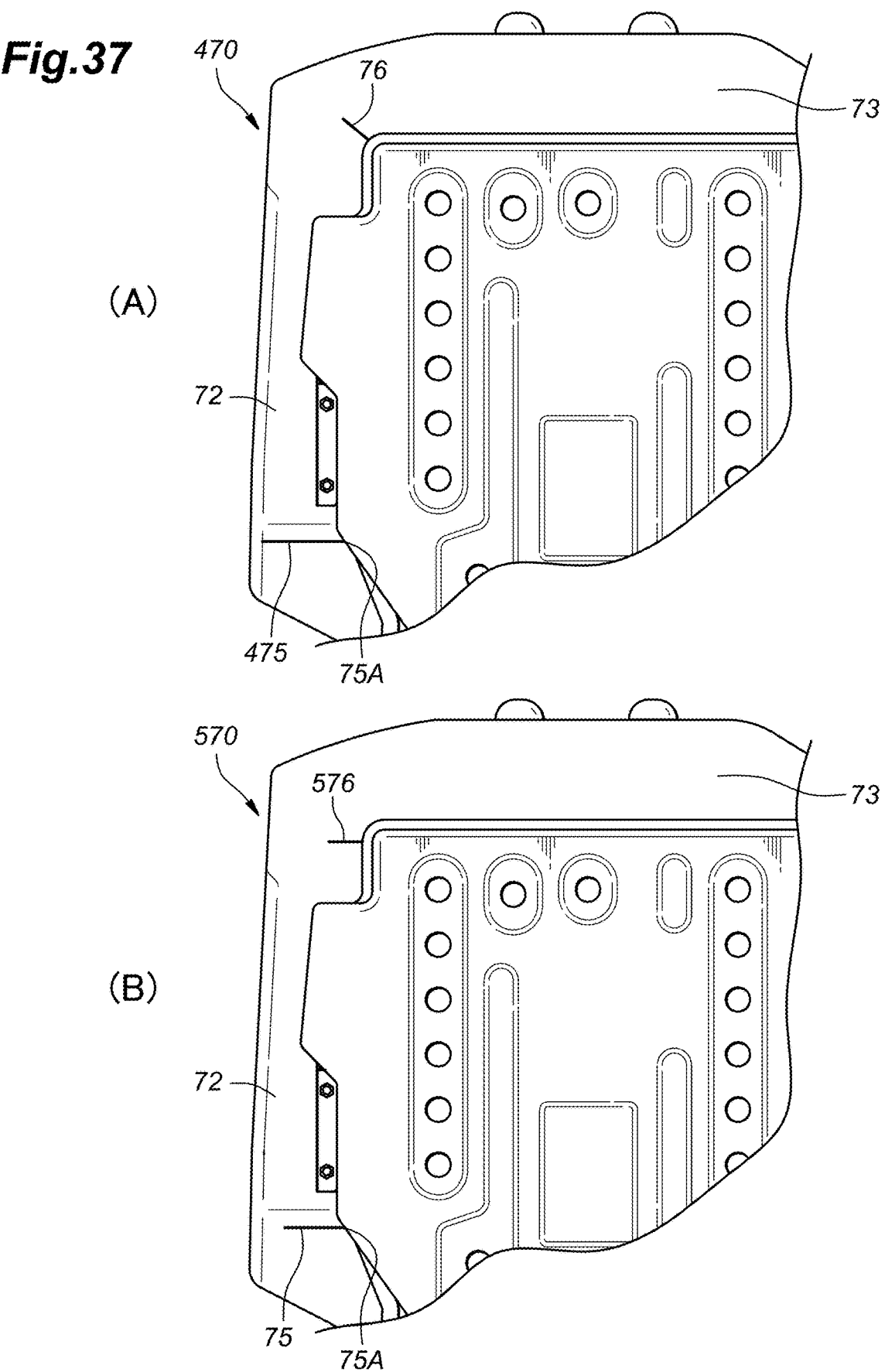
FIG. 37 is a rear view of each vehicle seat when the skin cover is removed, and (A) and (B) illustrate the vehicle seats according to fifth and sixth embodiments of the present invention, respectively.

As shown in FIG. 37(A), the slit 475 is formed in the rear pad member 72 and extends horizontally from the inner edge (right edge) to the outer edge (left edge) part thereof. In other words, the outer edge of the rear pad member 72 is the left edge thereof, and the rear pad member 72 is divided vertically by the slit 475.

Next, effects or technical benefits of the so configured vehicle seat 470 will be described. When the slit 475 extends horizontally from the right edge to the left edge of the rear pad member 72, the slit 475 is opened more easily compared to the case where When the slit does not extend to the left edge (e.g., the fourth embodiment). This configuration allows a worker to insert the airbag module 23 more easily, which facilitates the assembly of the airbag module 23.

Sixth Embodiment

A vehicle seat 570 according to a sixth embodiment of the present inventions is different from the vehicle seat 1 of the fourth embodiment only in that an auxiliary slit 576 has a different shape from that of the fourth embodiment. The other features of the sixth embodiment are similar to those of the fourth embodiment. Thus, in the following description, the same reference numerals as the fourth embodiment are retained for corresponding features and the description of the features except the auxiliary slit 576 will be not repeated here.

As shown in FIG. 37(B), the rear pad member 72 has the auxiliary slit 576 extends therethrough in the front-rear diction. In the present embodiment, the auxiliary slit 576 is formed in an upper part of the rear pad member 72 and extends outward (to the left) from the right edge to reach generally a center point in the left-right direction.

Next, effects or technical benefits of the so configured vehicle seat 570 will be described. When a worker moves the lower end of the rear pad member 72 to the left, the auxiliary slit 576 is opened in the same manner as the fourth embodiment. This configuration allows the worker to insert the airbag module 23 more easily, which facilitates the assembly of the airbag module 23.

Specific embodiments of the present invention are described above. However, those embodiments are non-limiting, and various modifications may be made to the embodiments without departing from the scope of the present invention. Although the embodiments in which a seat of the present invention is used as a seat in the second row of rear seats are described, those embodiments are non-limiting and the seat may be used as a seat in the third or subsequent rows of rear seats.

In the above-described embodiments, the stay cloth 110 is provided with the J-shaped hooks 112 configured to be hung onto the cloth-hook wire 102. However, these embodiments are non-limiting. For example, as shown in FIG. 38(A), the stay cloth 110 may be provided with loop-shaped strings 612 stitched at an edge as hanger loops. In this case, when the cloth-hook wire 102 is passed through the loops of the loop-shaped strings 612, the stay cloth 110 is coupled to the cloth-hook wire 102.

Alternatively, as shown in FIG. 38(B), an edge of the stay cloth 110 may be folded back on itself and stitched to form a wire-passing tube 613 along the edge. In this case, when the cloth-hook wire 102 is passed through the wire-passing tube 613, the stay cloth 110 is coupled to the cloth-hook wire 102.

In the above-described embodiments, the airbag module 23 is provided on the left side of the seatback frame outer portion 19. However, these embodiments are non-limiting. In some embodiments, a frame bracket 34 may be coupled to the right side of the seatback frame outer portion 19, and a module bracket 36 may be configured to hold the airbag module 23 may be fastened to the frame bracket 34.

In the above-described embodiments, the frame bracket 34 is configured as a sheet metal member separate from the side frames 26. However, these embodiments are non-limiting. In some embodiments, a frame bracket 34 may be integrally combined with other members to form a side frame 26 and function as part of a seatback frame 18.

Figure 39:
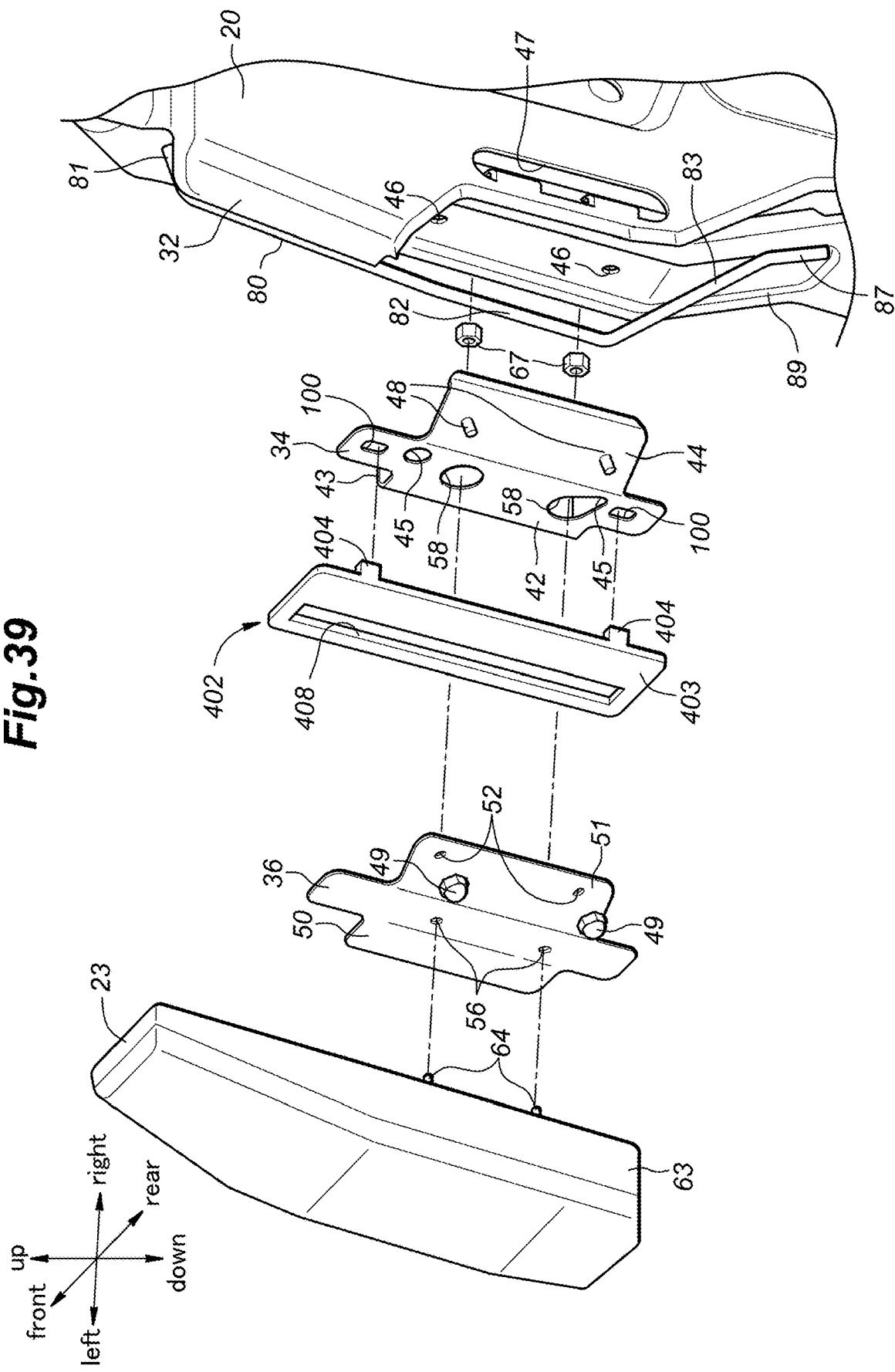
FIG. 39 is an exploded perspective view of the structure for coupling the airbag module to the side frame in which a cloth-hook member according to a variant of the above-described embodiments is used.

In the above-described embodiments, the cloth-hook wire 102 is used as a cloth-hook member. However, these embodiments are non-limiting. In some embodiments, as shown in FIG. 39, a cloth-hook member may be a stay cloth bracket 402, which is a bracket to which the stay cloth 110 is attached. The stay cloth bracket 402 may include a plate-shaped body 403 having main opposing surfaces facing to the left and the right, a pair of hook-shaped portions 404 (coupling portions) extending from the plate-shaped body 403 and configured to be hung onto the hang holes 100, and a hook section 408 (cloth-hook section) defined as a through-hole extending in the left-right direction into which the hooks 112 of the stay cloth 110 can be latched.

In the fourth to sixth embodiments, the stay cloth 110 is provided with the hooks 112. However, these embodiments are non-limiting. For example, an edge of the stay cloth 110 may be folded back on itself and stitched to form a wire-passing tube along the edge such that, when the cloth-hook wire 102 is passed through the wire-passing tube, the stay cloth 110 is coupled to the cloth-hook wire 102.

In the fourth to sixth embodiments, the stay cloth 110 is provided with the J-shaped hooks 112. However, these embodiments are non-limiting. In some embodiments, as shown in FIG. 40(A), hooks 611 are loop-shaped strings that are used as hanger loops. Alternatively, as shown in FIG. 40(B), an edge of the stay cloth 110 may be folded back on itself and stitched to form a wire-passing tube 613 along the edge so that when the cloth-hook wire 102 is passed through the wire-passing tube 613, the stay cloth 110 is coupled to the cloth-hook wire 102.

In the above-described embodiments, the airbag module 23 is provided on the left side of the seatback 5. However, these embodiments are non-limiting. For example, when a vehicle compartment side wall is provided on the right side of the vehicle seat 1 or when the seatback is designed such that the inflated airbag 61 deploys between the vehicle seat 1 and a seat next to the vehicle seat 1, the airbag module 23 is provided on the right side of the seatback 5.

Glossary 1 vehicle seat
19 seatback frame outer portion
23 airbag module
32 pan frame protrusion
34 frame bracket
36 module bracket
80 shape former
81 shape former upper portion
82 shape former center portion 82A upper half (of a shape former)
82B lower half (of a shape former)
83 shape former lower portion
P1, P2 fastening points
S gap space
X through-hole space

The invention claimed is:

1. A vehicle seat comprising:
an outer frame of a seatback frame, the outer frame forming a framework of a seatback of the vehicle seat;
a frame bracket coupled to a coupling location of the outer frame, the coupling location being located on a coupling side, which is either of the left or right side, of the outer frame;
a module bracket fastened to the frame bracket at one or more fastening points and configured to support an airbag module;
a pan frame coupled to the rear side of the outer frame; and
a shape former coupled to the outer frame on the coupling side, and configured to form an outer shape of the seatback,
wherein the pan frame includes a protrusion section protruding from an upper portion of the pan frame on the coupling side such that the fastening points are located below the protrusion section,
wherein at least part of the airbag module is positioned frontward of the protrusion section along the front-rear direction of the vehicle seat,
wherein the shape former is coupled to the protrusion section,
wherein the outer frame comprises two side frames on the left and right sides, and an upper frame connecting the two side frames,
wherein the frame bracket is coupled to a side frame, one of the two side frames on the coupling side, at points in front and rear edges of the side frame,
wherein the shape former is a curved wire member having a shape former upper portion, a shape former lower portion, and a shape former center portion connecting the shape former upper portion and the shape former lower portion,
wherein the shape former is coupled to the side frame so that the shape former protrudes outward from the side frame,
wherein the shape former center portion includes an upper half portion which extends along an outer edge of the protrusion section of the pan frame and a lower half portion which extends downward from a lower end of the upper half portion, and
wherein a through-hole space extending in the front-rear direction is defined by the shape former, the protrusion section, and the side frame, the through-hole space being formed rearward of the fastening points.

2. The vehicle seat as claimed in claim 1, wherein the protrusion section and the airbag module are arranged to be spaced apart from each other in the front-rear direction, thereby forming a gap space therebetween.

3. The vehicle seat as claimed in claim 1, wherein the shape former is coupled to the outer frame such that the shape former is positioned frontward of the protrusion section.

4. The vehicle seat as claimed in claim 1, wherein a top edge of the protrusion section is located below a top edge of the outer frame.

5. The vehicle seat as claimed in claim 1, wherein, when the airbag module is assembled to the vehicle seat, an outer edge of the protrusion section on the coupling side extends along an outer edge of the airbag module, as viewed from the rear.

6. The vehicle seat as claimed in claim 1, wherein the frame bracket and the pan frame are formed of respective sheet metal members, and
wherein the sheet metal member forming the frame bracket has a greater thickness than that forming the pan frame.

7. A vehicle seat comprising:
an outer frame of a seatback frame, the outer frame forming a framework of a seatback of the vehicle seat;
a frame bracket coupled to a coupling location of the outer frame, the coupling location being located on a coupling side, which is either of the left or right side, of the outer frame;
a module bracket fastened to the frame bracket at one or more fastening points and configured to support an airbag module; and
a pan frame coupled to the rear side of the outer frame,
wherein the pan frame includes a protrusion section protruding from an upper portion of the pan frame on the coupling side such that the fastening points are located below the protrusion section,
wherein at least part of the airbag module is positioned frontward of the protrusion section along the front-rear direction of the vehicle seat, and
wherein the protrusion section does not overlap the fastening points as viewed from the rear.

8. The vehicle seat as claimed in claim 7, wherein the protrusion section and the airbag module are arranged to be spaced apart from each other in the front-rear direction, thereby forming a gap space therebetween.

9. The vehicle seat as claimed in claim 7, further comprising a shape former coupled to the outer frame on the coupling side, and configured to form an outer shape of the seatback, and
wherein the shape former is coupled to the protrusion section.

10. The vehicle seat as claimed in claim 9, wherein the shape former is coupled to the outer frame such that the shape former is positioned frontward of the protrusion section.

11. The vehicle seat as claimed in claim 9, wherein the outer frame comprises two side frames on the left and right sides, and an upper frame connecting the two side frames, and
wherein the frame bracket is coupled to a side frame, one of the two side frames on the coupling side, at points in front and rear edges of the side frame.

12. The vehicle seat as claimed in claim 11, wherein the shape former is a curved wire member having a shape former upper portion, a shape former lower portion, and a shape former center portion connecting the shape former upper portion and the shape former lower portion,
wherein the shape former is coupled to the side frame so that the shape former protrudes outward from the side frame,
wherein the shape former center portion includes an upper half portion which extends along an outer edge of the protrusion section of the pan frame and a lower half portion which extends downward from a lower end of the upper half portion, and
wherein a through-hole space extending in the front-rear direction is defined by the shape former, the protrusion section, and the side frame, the through-hole space being formed rearward of the fastening points.

13. The vehicle seat as claimed in claim 7, wherein a top edge of the protrusion section is located below a top edge of the outer frame.

14. The vehicle seat as claimed in claim 7, wherein, when the airbag module is assembled to the vehicle seat, an outer edge of the protrusion section on the coupling side extends along an outer edge of the airbag module, as viewed from the rear.

15. The vehicle seat as claimed in claim 7, wherein the frame bracket and the pan frame are formed of respective sheet metal members, and
   wherein the sheet metal member forming the frame bracket has a greater thickness than that forming the pan frame.

\* \* \* \* \*